United States Patent
Matsuda et al.

(10) Patent No.: US 10,647,921 B2
(45) Date of Patent: *May 12, 2020

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Naoko Matsuda, Chiba (JP); Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 15/560,485

(22) PCT Filed: Feb. 18, 2016

(86) PCT No.: PCT/JP2016/054695
§ 371 (c)(1),
(2) Date: Sep. 22, 2017

(87) PCT Pub. No.: WO2016/152340
PCT Pub. Date: Sep. 29, 2016

(65) Prior Publication Data
US 2018/0057747 A1 Mar. 1, 2018

(30) Foreign Application Priority Data

Mar. 24, 2015 (JP) ................. 2015-061521

(51) Int. Cl.
| | |
|---|---|
| *C09K 19/12* | (2006.01) |
| *C09K 19/56* | (2006.01) |
| *C09K 19/14* | (2006.01) |
| *C09K 19/32* | (2006.01) |
| *C09K 19/20* | (2006.01) |
| *C08F 2/44* | (2006.01) |
| *C09K 19/30* | (2006.01) |
| *C09K 19/54* | (2006.01) |
| *C09K 19/34* | (2006.01) |
| *G02F 1/13* | (2006.01) |
| *G02F 1/1337* | (2006.01) |

(Continued)

(52) U.S. Cl.
CPC ............ *C09K 19/56* (2013.01); *C08F 2/44* (2013.01); *C09K 19/12* (2013.01); *C09K 19/14* (2013.01); *C09K 19/20* (2013.01); *C09K 19/30* (2013.01); *C09K 19/3003* (2013.01); *C09K 19/3028* (2013.01); *C09K 19/3068* (2013.01); *C09K 19/32* (2013.01); *C09K 19/322* (2013.01); *C09K 19/34* (2013.01); *C09K 19/3402* (2013.01); *C09K 19/52* (2013.01); *C09K 19/54* (2013.01); *G02F 1/13* (2013.01); *G02F 1/1337* (2013.01); *G02F 1/133788* (2013.01); *C09K 2019/0448* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/308* (2013.01); *C09K 2019/3009* (2013.01); *C09K 2019/3016* (2013.01); *C09K 2019/3019* (2013.01); *C09K 2019/3021* (2013.01); *C09K 2019/3025* (2013.01); *C09K 2019/3036* (2013.01); *C09K 2019/3037* (2013.01); *C09K 2019/3075* (2013.01); *C09K 2019/3077* (2013.01); *C09K 2019/3083* (2013.01); *C09K 2019/3422* (2013.01); *C09K 2019/548* (2013.01); *G02F 2001/133742* (2013.01)

(58) Field of Classification Search
CPC ........................................ C09K 19/12
See application file for complete search history.

(56) References Cited

U.S. PATENT DOCUMENTS

| | | |
|---|---|---|
| 2011/0095229 A1 | 4/2011 | Lee et al. |
| 2012/0032112 A1 | 2/2012 | Czanta et al. |

(Continued)

FOREIGN PATENT DOCUMENTS

| | | |
|---|---|---|
| JP | H09-255621 | 9/1997 |
| JP | 2006-502264 | 1/2006 |

(Continued)

OTHER PUBLICATIONS

"International Search Report (Form PCT/ISA/210) of PCT/JP2016/054695", dated May 24, 2016, with English translation thereof, pp. 1-7.

(Continued)

*Primary Examiner* — Chanceity N Robinson
(74) *Attorney, Agent, or Firm* — JCIPRNET

(57) ABSTRACT

A liquid crystal composition includes a polymerizable compound (or polymer) and a polar compound, where the homeotropic alignment of liquid crystal molecules can be achieved by the action of these compounds, and a liquid crystal display device includes such a composition. A nematic liquid crystal composition has positive dielectric anisotropy and includes a polymerizable compound as a first additive and a polar compound as a second additive, and the composition may include a specific liquid crystal compound having a large positive dielectric anisotropy and a specific liquid crystal compound having a high maximum temperature or a small viscosity, and a liquid crystal display device includes such a composition.

17 Claims, No Drawings

(51) Int. Cl.
*C09K 19/52* (2006.01)
*C09K 19/04* (2006.01)

(56) References Cited

U.S. PATENT DOCUMENTS

| | | | |
|---|---|---|---|
| 2013/0062559 A1* | 3/2013 | Hattori | C09K 19/12 |
| | | | 252/299.61 |
| 2013/0182202 A1* | 7/2013 | Graziano | C09K 19/42 |
| | | | 349/86 |
| 2013/0207038 A1 | 8/2013 | Haensel et al. | |
| 2013/0314655 A1* | 11/2013 | Archetti | C09K 19/3003 |
| | | | 349/124 |
| 2014/0198291 A1* | 7/2014 | Saito | C09K 19/20 |
| | | | 349/183 |
| 2014/0293213 A1* | 10/2014 | Kurisawa | C09K 19/12 |
| | | | 349/183 |
| 2015/0252265 A1 | 9/2015 | Archetti et al. | |
| 2015/0301368 A1* | 10/2015 | Archetti | C09K 19/063 |
| | | | 349/139 |
| 2015/0344784 A1* | 12/2015 | Goto | C09K 19/12 |
| | | | 252/299.61 |
| 2017/0029698 A1 | 2/2017 | Sudo et al. | |

FOREIGN PATENT DOCUMENTS

| | | | | |
|---|---|---|---|---|
| JP | 2011-525553 | | 9/2011 | |
| JP | 2013-166936 | | 8/2013 | |
| JP | 2013166936 A | * | 8/2013 | C09K 19/062 |
| JP | 2013-543526 | | 12/2013 | |
| JP | 2013543526 A | * | 12/2013 | |
| JP | 2014-513150 | | 5/2014 | |
| JP | 2015-168826 | | 9/2015 | |
| WO | 2004033584 | | 4/2004 | |
| WO | 2010089092 | | 8/2010 | |
| WO | 2013022088 | | 2/2013 | |
| WO | WO-2013022088 A1 | * | 2/2013 | C09K 19/12 |
| WO | 2013080855 | | 6/2013 | |
| WO | 2013088980 | | 6/2013 | |
| WO | WO-2013088980 A1 | * | 6/2013 | C09K 19/20 |
| WO | 2013161576 | | 10/2013 | |
| WO | WO-2013161576 A1 | * | 10/2013 | C09K 19/12 |
| WO | 2014094959 | | 6/2014 | |
| WO | WO-2014094959 A1 | * | 6/2014 | C09K 19/063 |
| WO | 2015098661 | | 7/2015 | |

OTHER PUBLICATIONS

"Office Action of Taiwan Counterpart Application," with English translation thereof, dated Oct. 2, 2019, p. 1-p. 29.

* cited by examiner

LIQUID CRYSTAL COMPOSITION AND LIQUID CRYSTAL DISPLAY DEVICE

CROSS-REFERENCE TO RELATED APPLICATION

This application is a 371 application of the International PCT application serial no. PCT/JP2016/054695, filed on Feb. 18, 2016, which claims the priority benefit of Japan application no. 2015-061521, filed on Mar. 24, 2015. The entirety of each of the abovementioned patent applications is hereby incorporated by reference herein and made a part of this specification.

TECHNICAL FIELD

The invention relates to a liquid crystal composition, a liquid crystal display device including this composition and so forth. It relates especially to a liquid crystal composition having positive dielectric anisotropy and including a polar compound and a polymerizable compound (or its polymer), where the homeotropic alignment of liquid crystal molecules can be achieved by the action of these compounds, and to a liquid crystal display device.

TECHNICAL BACKGROUND

In a liquid crystal display device, a classification based on an operating mode for liquid crystal molecules includes modes such as PC (phase change), TN (twisted nematic), STN (super twisted nematic), ECB (electrically controlled birefringence), OCB (optically compensated bend), IPS (in-plane switching), VA (vertical alignment), FFS (fringe field switching) and FPA (field-induced photo-reactive alignment). A classification based on a driving mode in the device includes PM (passive matrix) and AM (active matrix). The PM is classified into static, multiplex and so forth, and the AM is classified into TFT (thin film transistor), MIM (metal-insulator-metal) and so forth. The TFT is further classified into amorphous silicon and polycrystal silicon. The latter is classified into a high temperature type and a low temperature type depending on the production process. A classification based on a light source includes a reflection type utilizing natural light, a transmission type utilizing a backlight and a semi-transmission type utilizing both natural light and a backlight.

The liquid crystal display device includes a liquid crystal composition having a nematic phase. This composition has suitable characteristics. An AM device having good characteristics can be obtained by an improvement of the characteristics of this composition. Table 1 below summarizes the relationship between these two characteristics. The characteristics of the composition will be further explained on the basis of a commercially available AM device. The temperature range of a nematic phase relates to the temperature range in which the device can be used. A desirable maximum temperature of the nematic phase is approximately 70° C. or higher and a desirable minimum temperature of the nematic phase is approximately −10° C. or lower. The viscosity of the composition relates to the response time of the device. A short response time is desirable for displaying moving images on the device. Response time that is one millisecond shorter than that of the other devices is desirable. Thus, a small viscosity of the composition is desirable. A small viscosity at a low temperature is more desirable. The elastic constant of the composition relates to the contrast ratio of the device. A large elastic constant of the composition is desirable for increasing the contrast ratio of the device.

TABLE 1

Characteristics of Compositions and AM Devices

| No. | Characteristics of Compositions | Characteristics of AM Devices |
|---|---|---|
| 1 | a wide temperature range of a nematic phase | a wide temperature range in which the device can be used |
| 2 | a small viscosity | a short response time |
| 3 | a suitable optical anisotropy | a large contrast ratio |
| 4 | a large positive or negative dielectric anisotropy | a low threshold voltage and low power consumption, a large contrast ratio |
| 5 | a large specific resistance | a large voltage holding ratio and a large contrast ratio |
| 6 | a high stability to ultraviolet light and heat | a long service life |
| 7 | a large elastic constant | a large contrast ratio and a short response time |

The optical anisotropy of the composition relates to the contrast ratio of the device. A large optical anisotropy or a small optical anisotropy, namely a suitable optical anisotropy, is necessary depending on the mode of the device. The product (Δn×d) of the optical anisotropy (Δn) of the composition and the cell gap (d) of the device is designed so as to maximize the contrast ratio. A suitable value of the product depends on the type of operating mode. A suitable value is approximately 0.45 micrometers for a device having a mode such as TN. In this case, a composition having a large optical anisotropy is desirable for a device having a small cell gap. A large dielectric anisotropy of the composition contributes to a low threshold voltage, low power consumption and a large contrast ratio of the device. A large dielectric anisotropy is thus desirable. A large specific resistance of the composition contributes to a large voltage holding ratio and a large contrast ratio of the device. It is thus desirable that a composition should have a large specific resistance at a temperature close to the maximum temperature of a nematic phase as well as at room temperature in the initial stages. It is desirable that a composition should have a large specific resistance at a temperature close to the maximum temperature of a nematic phase as well as at room temperature, after it has been used for a long time. The stability of the composition to ultraviolet light or heat relates to the service life of the device. The device has a long service life when the stability is high. Characteristics of this kind are desirable for an AM device used for a liquid crystal projector, a liquid crystal television and so forth.

In a conventional liquid crystal display device, the homeotropic alignment of liquid crystal molecules is achieved by a specific polyimide alignment film. The effect of a polymer is utilized for a liquid crystal display device with a polymer sustained alignment (PSA) type. First, a composition to which a small amount of a polymerizable compound has been added is poured into a device. Next, the composition is irradiated with ultraviolet light, while a voltage is applied between the substrates of this device. The polymerizable compound is polymerized to give a network structure of a polymer in the composition. In this composition, the polymer makes it possible to adjust the alignment of liquid crystal molecules, and thus the response time of the device is decreased and image burn-in is improved. Such effect of the polymer can be expected for a device having a mode such as TN, ECB, OCB, IPS, VA, FFS or FPA.

In contrast, a liquid crystal composition including a polymer and a polar compound is used for a liquid crystal display device without alignment films. First, a composition to which a small amount of polymerizable compound and a small amount of polar compound have been added is poured into a device, where the polar compound is absorbed on the substrate surface and arranged. Liquid crystal molecules are aligned according to the arrangement. Next, the composition is irradiated with ultraviolet light, where the polymerizable compound is polymerized to stabilize the alignment of the liquid crystal molecules. In this composition, the alignment of the liquid crystal molecules can be adjusted by the polymer and the polar compound, and thus the response time of the device is decreased and image burn-in is improved. Furthermore, a step for forming an alignment film is not necessary to the device having no alignment films. Electric resistance of the device is not decreased by the interaction of the alignment film and the composition, because of the absence of the alignment film. Such effect caused by the polymer and the polar compound can be expected for a device having a mode such as TN, ECB, OCB, IPS, VA, FFS or FPA.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device with a polymer sustained alignment type. Examples of the liquid crystal composition having positive dielectric anisotropy are disclosed in the following patent documents No. 1 to No. 3.

PRIOR ART

Patent Document

Patent document No. 1: JP 2006-502264 A.
Patent document No. 2: WO 2010-089092 A.
Patent document No. 3: JP 2011-525553 A.

SUMMARY OF THE INVENTION

Subject to be Solved by the Invention

One of the aims of the invention is to provide a liquid crystal composition that includes a polymerizable compound (or its polymer) and a polar compound, where the homeotropic alignment of liquid crystal molecules can be achieved by the action of these compounds. Another aim is to provide a liquid crystal composition that satisfies at least one of characteristics such as a high maximum temperature of a nematic phase, a low minimum temperature of a nematic phase, a small viscosity, a suitable optical anisotropy, a large positive dielectric anisotropy, a large specific resistance, a high stability to ultraviolet light, a high stability to heat and a large elastic constant. Another aim is to provide a liquid crystal composition that is suitably balanced between at least two of the characteristics. Another aim is to provide a liquid crystal display device including such a composition. Another aim is to provide an AM device that has characteristics such as a short response time, a large voltage holding ratio, a low threshold voltage, a large contrast ratio and a long service life.

Means for Solving the Subject

The invention concerns a liquid crystal composition that has positive dielectric anisotropy and includes at least one polymerizable compound selected from the group of compounds represented by formula (1) as a first additive, and at least one polar compound as a second additive, and concerns a liquid crystal display device including this composition:

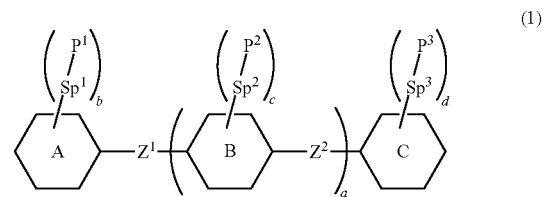

in formula (1), ring A and ring C are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; ring B is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^1$ and $Z^2$ are independently a single bond or alkylene having 1 to 10 carbons, and in the alkylene at least one —$CH_2$— may be replaced by —O—, —CO—, —COO— or —OCO—, and at least one —$CH_2$—$CH_2$— may be replaced by —CH=CH—, —C($CH_3$)=CH—, —CH=C($CH_3$)— or —C($CH_3$)=C($CH_3$)—, and in these groups at least one hydrogen may be replaced by fluorine or chlorine; $P^1$, $P^2$ and $P^3$ are a polymerizable group; $Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH=CH— or —C≡C—, and in these groups at least one hydrogen may be replaced by fluorine or chlorine; a is 0, 1 or 2; and b, c and d are independently 0, 1, 2, 3 or 4, with the proviso that a is 1 or 2 when ring A and ring C are phenyl, and that $Sp^1$ and $Sp^3$ are a single bond when a is 1.

Effect of the Invention

One of the advantages of the invention is to provide a liquid crystal composition that includes a polymerizable compound (or its polymer) and a polar compound, where the homeotropic alignment of liquid crystal molecules can be achieved by the action of these compounds. Another advantage is to provide a liquid crystal composition that satisfies at least one of characteristics such as a high maximum temperature of a nematic phase, a low minimum temperature of a nematic phase, a small viscosity, a suitable optical anisotropy, a large positive dielectric anisotropy, a large specific resistance, a high stability to ultraviolet light, high stability to heat and a large elastic constant. Another advantage is to provide a liquid crystal composition that is suitably balanced between at least two of the characteristics. Another advantage is to provide a liquid crystal display device including such a composition. Another advantage is to provide an AM device that has characteristics such as a short response time, a large voltage holding ratio, a low threshold voltage, a large contrast ratio and a long service life.

Embodiment to Carry Out the Invention

The usage of the term in the specification and claims is as follows. The terms "liquid crystal composition" and "liquid crystal display device" are sometimes abbreviated to "composition" and "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, and for a compound having no liquid crystal phases but being mixed to a composition for the purpose of adjusting the characteristics, such as the temperature range of a nematic phase, the viscosity and the dielectric anisotropy. This compound has a six-membered ring such as 1,4-cyclohexylene or 1,4-phenylene, and its molecular structure is rod-like. "Polymerizable compound" is a compound that is added to a composition in order to form a polymer in it.

A liquid crystal composition is prepared by mixing a plurality of liquid crystal compounds. An additive such as an optically active compound, an antioxidant, an ultraviolet light absorber, a coloring matter, an antifoaming agent, a polymerizable compound, a polymerization initiator, a polymerization inhibitor and a polar compound is added to this liquid crystal composition as required. The liquid crystal compounds or the additive is added according to this procedure. Even if an additive is added, the ratio of a liquid crystal compound (content) is expressed as a percentage by weight (% by weight) based on the weight of the liquid crystal composition excluding the additive. The ratio of the additive (added amount) is expressed as a percentage by weight (% by weight) based on the weight of the liquid crystal composition excluding the additive. Weight parts per million (ppm) is sometimes used. The ratio of the polymerization initiator and the polymerization inhibitor is exceptionally expressed on the basis of the weight of the polymerizable compound.

"The upper limit of the temperature range of a nematic phase" is sometimes abbreviated to "the maximum temperature." "A lower limit of the temperature range of a nematic phase" is sometimes abbreviated to "the minimum temperature." That "specific resistance is large" means that a composition has a large specific resistance at a temperature close to the maximum temperature as well as at room temperature in the initial stages, and that the composition has a large specific resistance at a temperature close to the maximum temperature as well as at room temperature, after it has been used for a long time. That "a voltage holding ratio is large" means that a device has a large voltage holding ratio at a temperature close to the maximum temperature as well as at room temperature in the initial stages, and that the device has a large voltage holding ratio at a temperature close to the maximum temperature as well as at room temperature, after it has been used for a long time. In compositions or devices, characteristics before or after a long-term test (including an accelerated aging test) are sometimes studied. The expression "increase the dielectric anisotropy" means that its value increases positively when the composition has positive dielectric anisotropy, and that its value increases negatively when the composition has negative dielectric anisotropy.

A compound represented by formula (1) is sometimes abbreviated to "compound (1)." A compound selected from the group of compounds represented by formula (1) is sometimes abbreviated to "compound (1)." "Compound (1)" means one compound, a mixture of two compounds or a mixture of three or more compounds represented by formula (1). This applies to a compound represented by another formula. The expression "at least one 'A'" means that the number of 'A' is arbitrary. The expression "at least one 'A' may be replaced by 'B'" means that the position of 'A' is arbitrary when the number of 'A' is one, and the positions can also be selected without restriction when the number of 'A' is two or more. This rule also applies to the expression "at least one 'A' has been replaced by 'B'."

The symbol for the terminal group, $R^1$, is used for a plurality of compounds in the chemical formulas of component compounds. In these compounds, two groups represented by two arbitrary $R^1$ may be the same or different. In one case, for example, $R^1$ of compound (2-1) is ethyl and $R^1$ of compound (2-2) is ethyl. In another case, $R^1$ of compound (2-1) is ethyl and $R^1$ of compound (2-2) is propyl. The same rule applies to symbols such as other terminal groups. In formula (2), two of ring D are present when a is 2. In this compound, two groups represented by two of ring D may be the same or different. The same rule applies to arbitrary two of ring D, when a is greater than 2. The same rule also applies to other symbols. The same rule also applies to two -$Sp^2$-$P^2$ group in compound (1-11), for instance.

The symbol such as A, B, C or D surrounded by a hexagon corresponds to a ring such as ring A, ring B, ring C or ring D, respectively, and represents a ring such as a six-membered ring or a condensed ring. In formula (1), an oblique line crossing a hexagon means that arbitrary hydrogen on the ring may be replaced by a group such as -$Sp^1$-$P^1$. A subscript such as 'b' shows the number of a group that has been replaced. There is no replacement when the subscript 'b' is 0 (zero). A plurality of -$Sp^1$-$P^1$ are present on ring A when the subscript 'b' is 2 or more. A plurality of groups represented by -$Sp^1$-$P^1$ may be the same or different.

2-Fluoro-1,4-phenylene means the two divalent groups described below. Fluorine may be facing left (L) or facing right (R) in a chemical formula. The same rule also applies to an asymmetric divalent group formed from a ring by removing two hydrogens, such as tetrahydropyran-2,5-diyl. The same rule also applies to a bonding group such as carbonyloxy (—COO— and —OCO—).

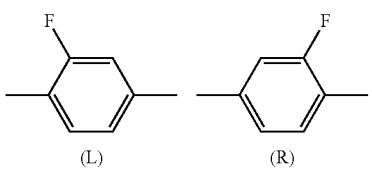

(L)  (R)

An expression such as "at least one —CH$_2$— may be replaced by —O—" is used in this specification. In this case, —CH$_2$—CH$_2$—CH$_2$— may be transformed to —O—CH$_2$—O— by replacement of nonadjacent —CH$_2$— with —O—. However, adjacent —CH$_2$— should not be replaced by —O—. This is because of the formation of —O—O—CH$_2$— (peroxide) by this replacement. That is to say, the expression means both "one —CH$_2$— may be replaced by —O—" and "at least two nonadjacent —CH$_2$— may be replaced by —O—". The same rule applies to the replacement by a divalent group such as —CH=CH— or —COO— as well as the replacement by —O—. In formula (5), R$^4$ is alkyl having 4 to 20 carbons, and in the alkyl at least one —CH$_2$— may be replaced by —CH=CH— or the like. The number of carbons is increased by this replacement. In this case, the maximum number of carbons is 30. The same rule applies to alkylene, cycloalkylene or the like.

Alkyl of a liquid crystal compound is straight-chain or branched-chain, and does not include cycloalkyl. Straight-chain alkyl is preferable to branched-chain alkyl. This applies to a terminal group such as alkoxy and alkenyl. With regard to the configuration of 1,4-cyclohexylene, trans is preferable to cis for increasing the maximum temperature. Halogen means fluorine, chlorine bromine and iodine. Desirable halogen is fluorine or chlorine. More desirable halogen is fluorine.

The invention includes the following items.

Item 1. A liquid crystal composition having positive dielectric anisotropy and including at least one polymerizable compound selected from the group of compounds represented by formula (1) as a first additive, and at least one polar compound as a second additive:

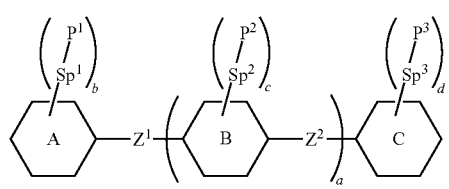

(1)

in formula (1), ring A and ring C are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; ring B is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^1$ and $Z^2$ are independently a single bond or alkylene having 1 to 10 carbons, and in the alkylene at least one —CH$_2$— may be replaced by —O—, —CO—, —COO— or —OCO—, and at least one —CH$_2$—CH$_2$— may be replaced by —CH=CH—, —C(CH$_3$)=CH—, —CH=C(CH$_3$)— or —C(CH$_3$)=C(CH$_3$)—, and in these groups at least one hydrogen may be replaced by fluorine or chlorine; $P^1$, $P^2$ and $P^3$ are a polymerizable group; $Sp^1$, $Sp^2$ and $Sp^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH=CH— or —C≡C—, and in these groups at least one hydrogen may be replaced by fluorine or chlorine; a is 0, 1 or 2; and b, c and d are independently 0, 1, 2, 3 or 4, with the proviso that a is 1 or 2 when ring A and ring C are phenyl and that $Sp^1$ and $Sp^3$ are a single bond when a is 1.

Item 2. The liquid crystal composition according to item 1, wherein formula (1) according to item 1, $P^1$, $P^2$ and $P^3$ are independently a polymerizable group selected from the group of groups represented by formula (P-1) to formula (P-5):

(P-1)

(P-2)

(P-3)

(P-4)

(P-5)

in formula (P-1) to formula (P-5), $M^1$, $M^2$ and $M^3$ are independently hydrogen, fluorine, alkyl having 1 to 5 carbons or alkyl having 1 to 5 carbons in which at least one hydrogen has been replaced by fluorine or chlorine.

Item 3. The liquid crystal composition according to item 1 or 2, wherein the first additive is at least one polymerizable compound selected from the group of compounds represented by formula (1-1) to formula (1-12):

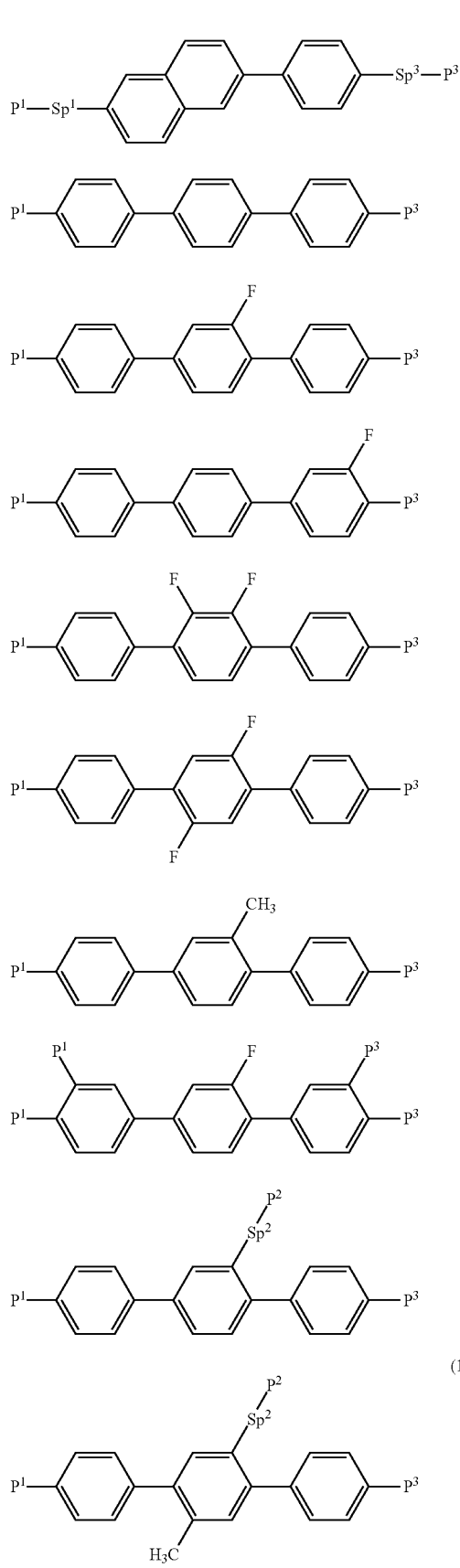

(1-1)
(1-2)
(1-3)
(1-4)
(1-5)
(1-6)
(1-7)
(1-8)
(1-9)
(1-10)

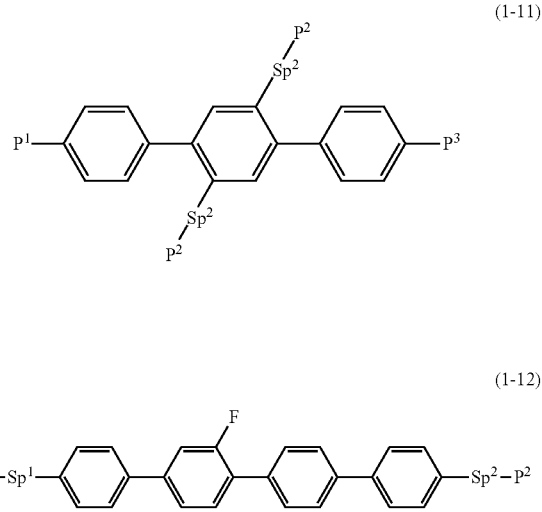

(1-11)

(1-12)

in formula (1-1) to formula (1-12), $P^1$, $P^2$ and $P^3$ are independently a polymerizable group selected from the group of groups represented by formula (P-1) to formula (P-3), where $M^1$, $M^2$ and $M^3$ are independently hydrogen, fluorine, alkyl having 1 to 5 carbons or alkyl having 1 to 5 carbons in which at least one hydrogen has been replaced by fluorine or chlorine; and

(P-1)

(P-2)

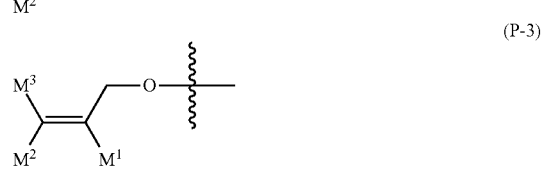

(P-3)

$Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH=CH— or —C≡C—, and in these groups at least one hydrogen may be replaced by fluorine or chlorine.

Item 4. The liquid crystal composition according to any one of items 1 to 3, wherein the ratio of the first additive is in the range of 0.03% by weight to 10% by weight based on the weight of the liquid crystal composition.

Item 5. The liquid crystal composition according to any one of items 1 to 4, including at least one compound selected from the group of compounds represented by formula (2) as the first component:

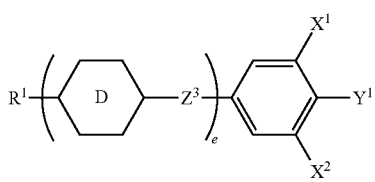
(2)

in formula (2), $R^1$ is alkyl having 1 to 12 carbons, alkoxy having 1 to 12 carbons or alkenyl having 2 to 12 carbons or alkenyl having 2 to 12 carbons in which at least one hydrogen has been replaced by fluorine or chlorine; ring D is 1,4-cyclohexylene, 1,4-phenylene, 2-fluoro-1,4-phenylene, 2,3-difluoro-1,4-phenylene, 2,6-difluoro-1,4-phenylene, 3,5-difluoro-1,4-phenylene, pyrimidine-2,5-diyl, 1,3-dioxane-2,5-diyl or tetrahydropyran-2,5-diyl; $Z^3$ is a single bond, —CH₂CH₂—, —CH₂O—, —OCH₂—, —COO—, —COC—, —CF₂O— or —OCF₂—; $X^1$ and $X^2$ are independently hydrogen or fluorine; $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine; and e is 1, 2, 3 or 4.

Item 6. The liquid crystal composition according to any one of items 1 to 5, including at least one compound selected from the group of compounds represented by formula (2-1) to formula (2-46) as the first component:

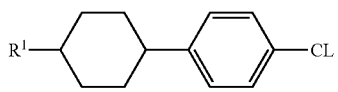
(2-1)

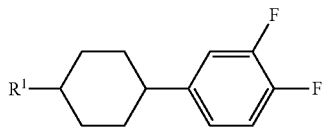
(2-2)

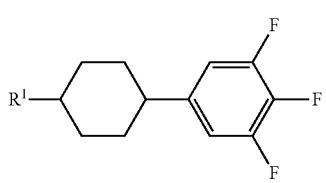
(2-3)

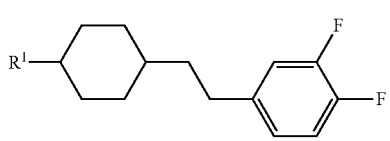
(2-4)

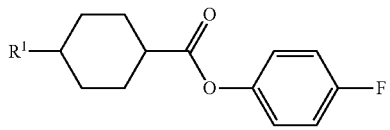
(2-5)

-continued

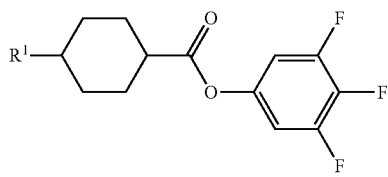
(2-6)

(2-7)

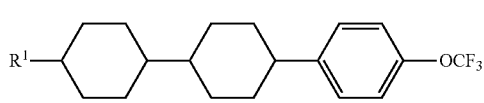
(2-8)

(2-9)

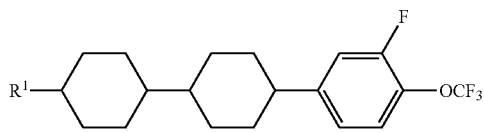
(2-10)

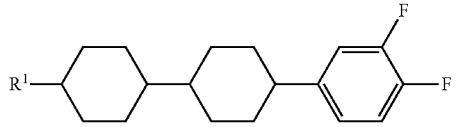
(2-11)

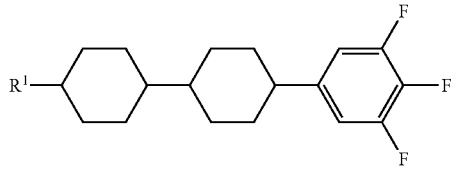
(2-12)

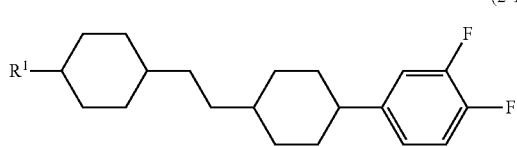
(2-13)

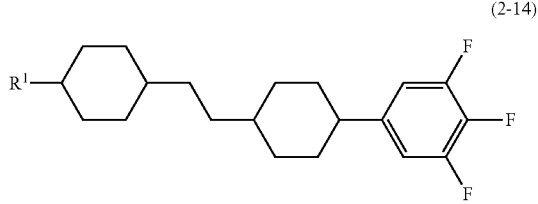
(2-14)

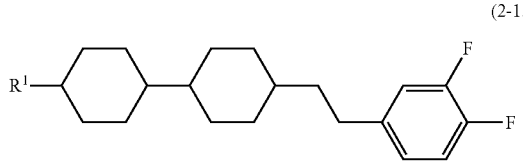
(2-15)

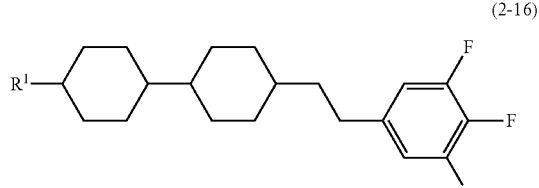
(2-16)
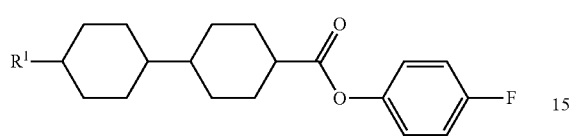
(2-17)
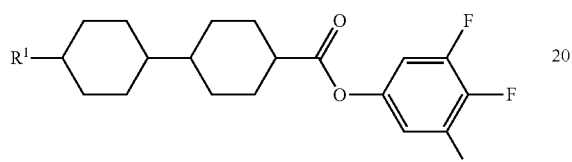
(2-18)
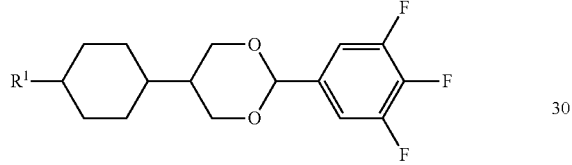
(2-19)
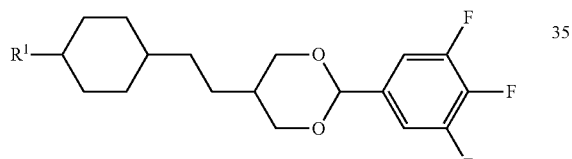
(2-20)
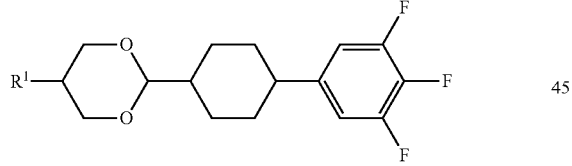
(2-21)
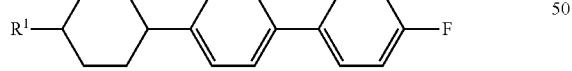
(2-22)
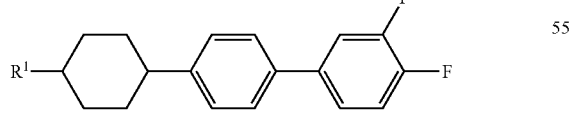
(2-23)
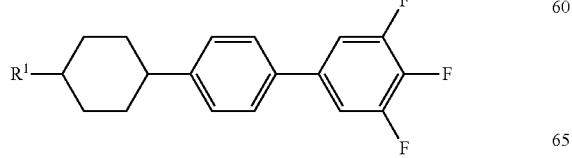
(2-24)
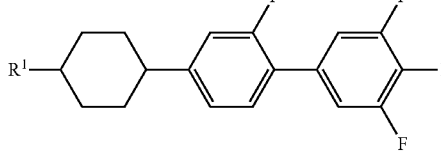
(2-25)
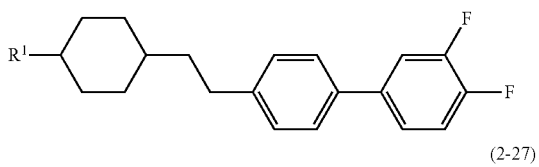
(2-26)
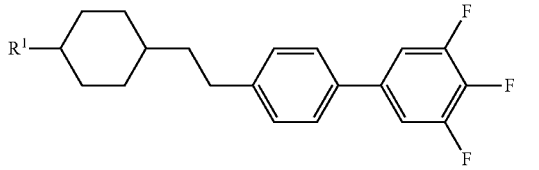
(2-27)
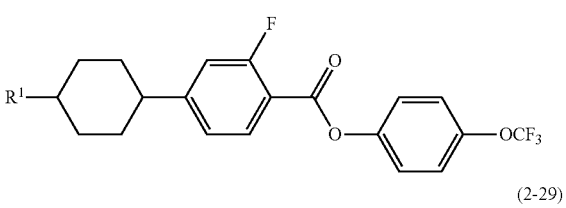
(2-28)
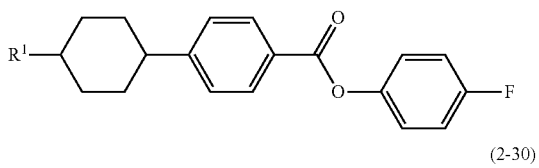
(2-29)
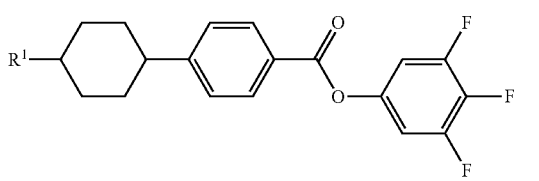
(2-30)
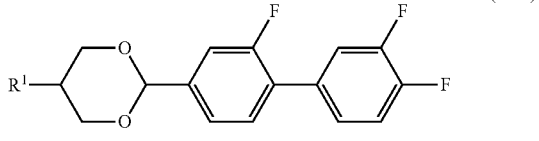
(2-31)
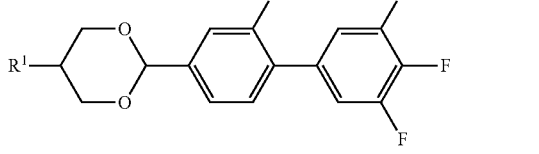
(2-32)
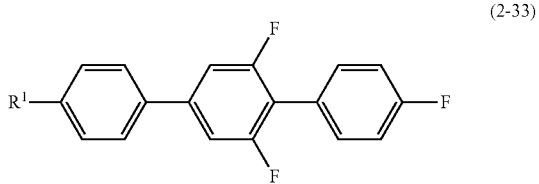
(2-33)

(2-34)
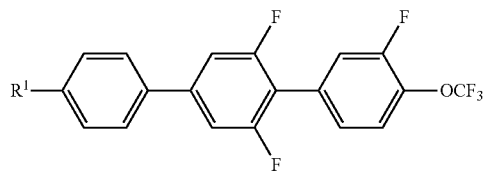

(2-35)
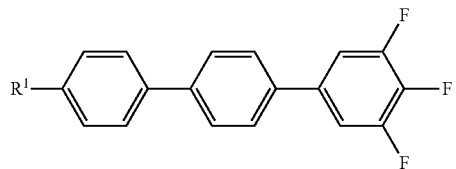

(2-36)
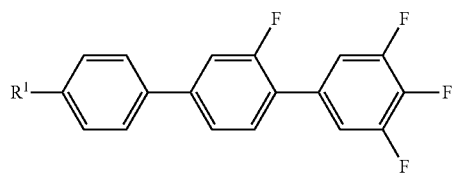

(2-37)
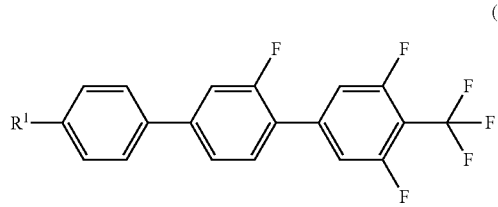

(2-38)
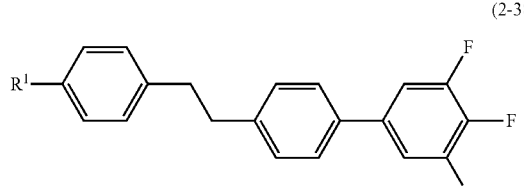

(2-39)
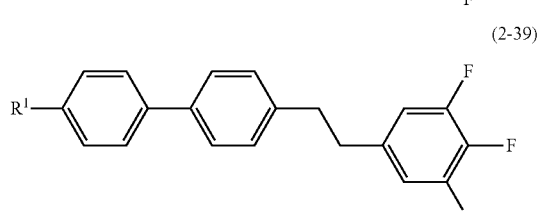

(2-40)
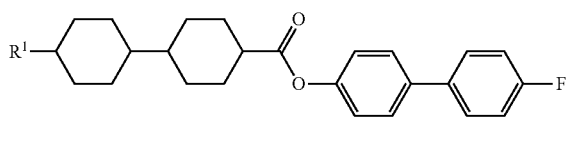

(2-41)
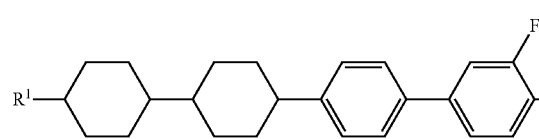

(2-42)
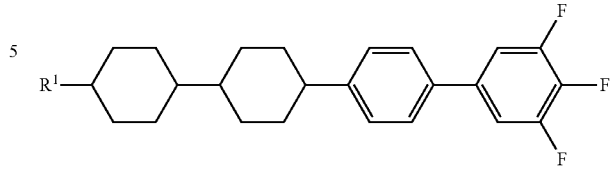

(2-43)

(2-44)

(2-45)

(2-46)

in formula (2-1) to formula (2-46), $R^1$ is alkyl having 1 to 12 carbons, alkoxy having 1 to 12 carbons, alkenyl having 2 to 12 carbons or alkenyl having 2 to 12 carbons in which at least one hydrogen has been replaced by fluorine or chlorine.

Item 7. The liquid crystal composition according to item 5 or 6, wherein the ratio of the first component is in the range of 10% by weight to 90% by weight based on the weight of the liquid crystal composition.

Item 8. The liquid crystal composition according to any one of items 1 to 7, including at least one compound selected from the group of compounds represented by formula (3) as a second component:

(3)
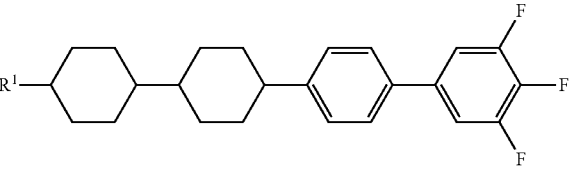

in formula (3), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine; ring E and ring F are independently 1,4-cyclohexylene, 1,4-phenylene, 2-fluoro-1,4-phenylene or 2,5-difluoro-1,4-phenylene; $Z^4$ is a single bond, —CH$_2$CH$_2$—, —CH$_2$O—, —OCH$_2$—, —COO— or —OCO—; and f is 1, 2 or 3.

Item 9. The liquid crystal composition according to any one of items 1 to 8, including at least one compound selected from the group of compounds represented by formula (3-1) to formula (3-13) as the second component:

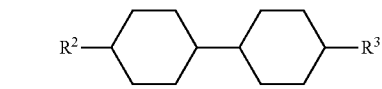
(3-1)

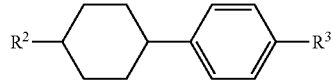
(3-2)

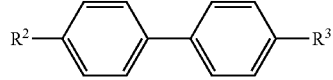
(3-3)

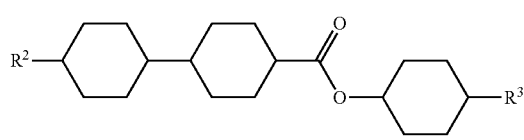
(3-4)

(3-5)

(3-6)

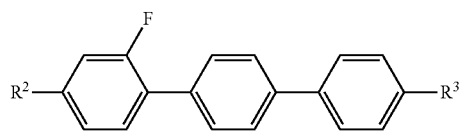
(3-7)

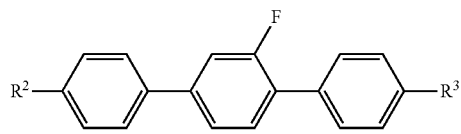
(3-8)

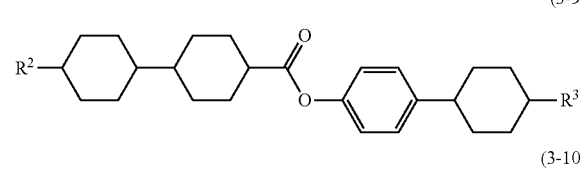
(3-9)

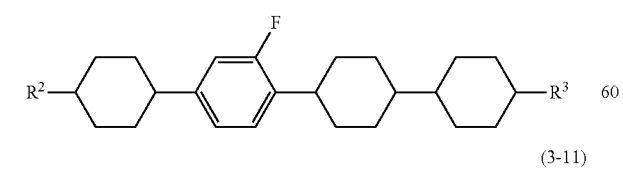
(3-10)

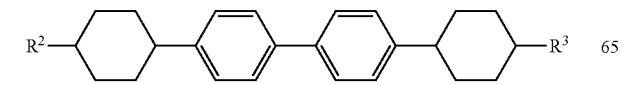
(3-11)

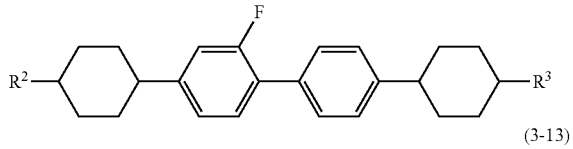
(3-12)

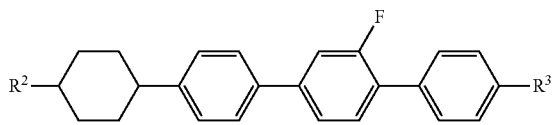
(3-13)

in formula (3-1) to formula (3-13), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine.

Item 10. The liquid crystal composition according to item 8 or 9, wherein the ratio of the second component is in the range of 10% by weight to 90% by weight based on the weight of the liquid crystal composition.

Item 11. The liquid crystal composition according to any one of items 1 to 10, including at least one compound selected from the group of compounds represented by formula (4) as a third component:

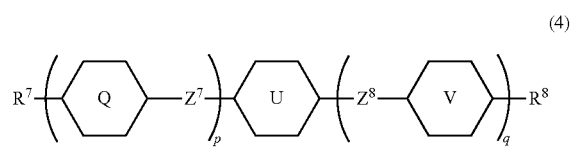
(4)

in formula (4), $R^7$ and $R^8$ are independently alkyl having 1 to 12 carbons, alkoxy having 1 to 12 carbons, alkenyl having 2 to 12 carbons or alkenyloxy having 2 to 12 carbons; ring Q and ring V are independently 1,4-cyclohexylene, 1,4-cyclohexenylene, 1,4-phenylene, 1,4-phenylene in which at least one hydrogen has been replaced by fluorine or chlorine or tetrahydropyran-2,5-diyl; ring U is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^7$ and $Z^8$ are independently a single bond, —CH$_2$CH$_2$—, —CH$_2$O—, —OCH$_2$—, —COO— or —OCO—; p is 1, 2 or 3, q is 0 or 1; and the sum of p and q is 3 or less.

Item 12. The liquid crystal composition according to any one of items 1 to 11, including at least one compound selected from the group of compounds represented by formula (4-1) to formula (4-21) as the third component:

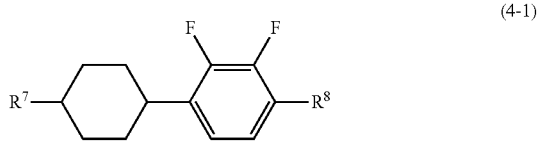
(4-1)

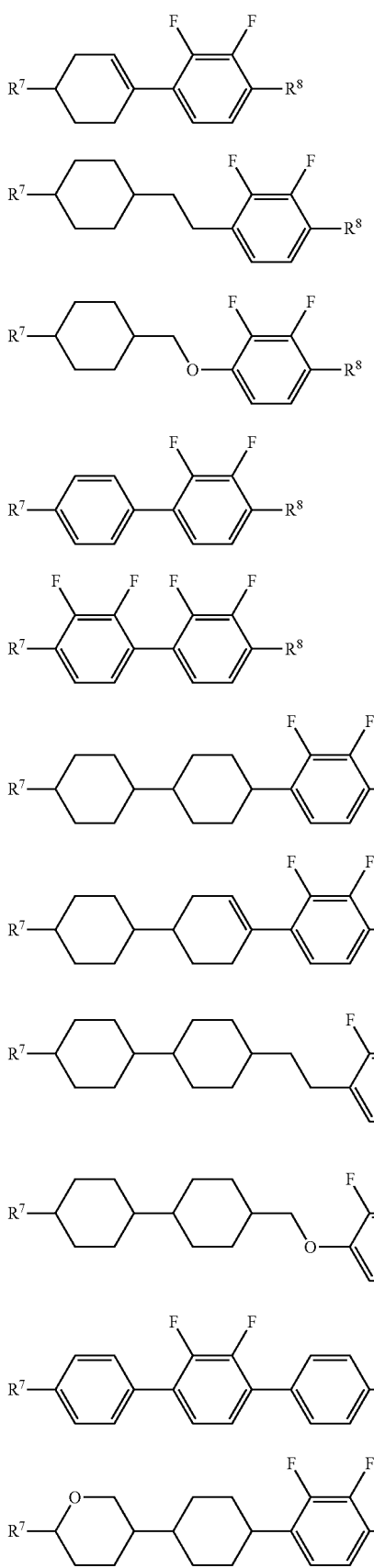
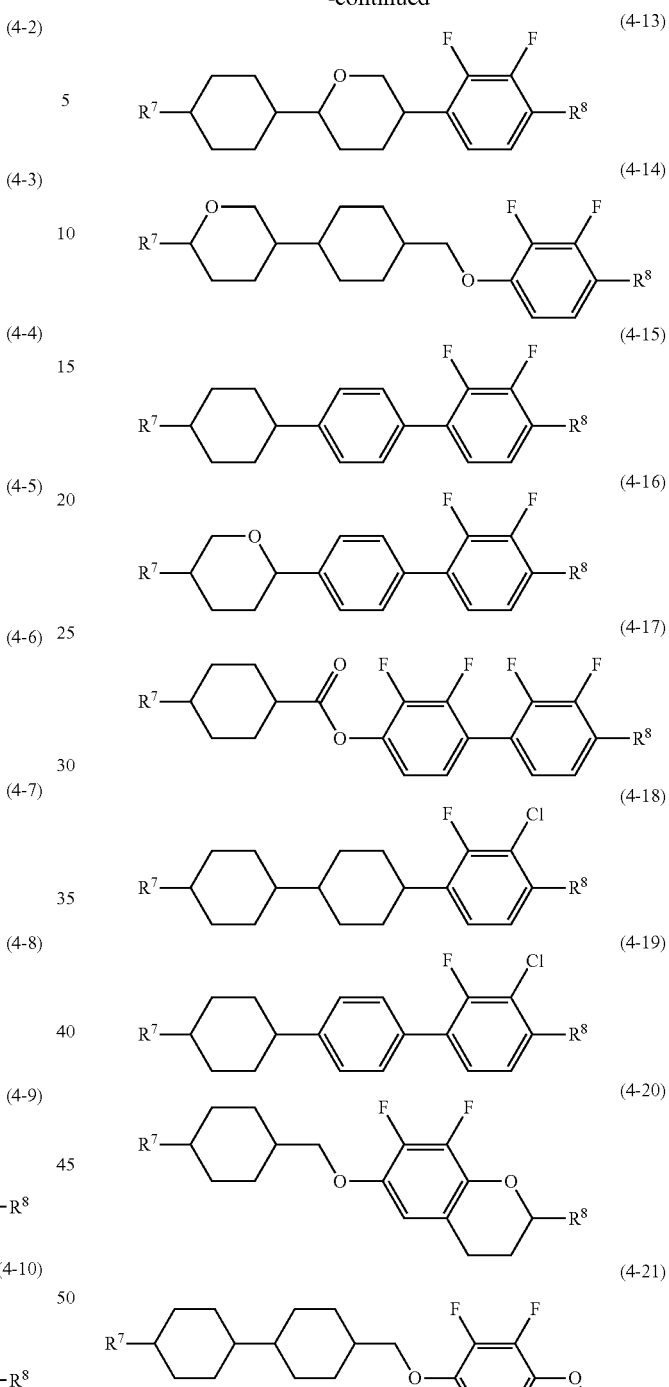

in formula (4-1) to formula (4-21), $R^7$ and $R^8$ are independently alkyl having 1 to 12 carbons, alkoxy having 1 to 12 carbons, alkenyl having 2 to 12 carbons or alkenyloxy having 2 to 12 carbons.

Item 13. The liquid crystal composition according to item 11 or 12, wherein the ratio of the third component is in the range of 3% by weight to 25% by weight based on the weight of the liquid crystal composition.

Item 14. The liquid crystal composition according to any one of items 1 to 13, wherein the second additive is a polar compound having a polar group that contains a heteroatom selected from nitrogen, oxygen, sulfur and phosphorus.

Item 15. The liquid crystal composition according to any one of items 1 to 11, including at least one polar compound selected from the group of compounds represented by formula (5) and formula (6) as the second additive:

$$\text{MES-R}^5 \tag{5}$$

$$(R^4)_g\text{—R}^5 \tag{6}$$

in formula (5), MES is a mesogenic group having at least one ring; in formula (6), $R^4$ is alkyl having 4 to 20 carbons, and in the alkyl at least one —$CH_2$— may be replaced by —CH═CH—, —CF═CH—, —CH═CF—, —C≡C— or cycloalkylene having 3 to 8 carbons, and in these groups at least one hydrogen may be replaced by fluorine or chlorine; in formula (5) and formula (6), $R^5$ is a polar group containing at least one of an oxygen atom of a OH moiety, a sulfur atom of an SH moiety and a nitrogen atom of primary, secondary or tertiary amine moiety; and g is 1 or 2.

Item 16. The liquid crystal composition according to any one of items 1 to 15, including at least one compound selected from the group of compounds represented by formula (5-1) as the second additive:

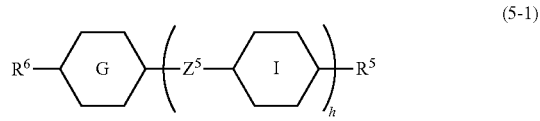
$$\tag{5-1}$$

in formula (5-1), ring G and ring I are independently an aromatic group having 6 to 25 carbons, a heteroaromatic group having 5 to 25 carbons, an alicyclic group having 3 to 25 carbons or a heteroalicyclic group having 4 to 25 carbons and these groups may be a condensed ring, and in these groups at least one hydrogen may be replaced by group T, where group T is —OH, —$(CH_2)_i$—OH, halogen, —CN, —$NO_2$, —NCO, —NCS, —OCN, —SCN, —C(═O) $N(R^0)_2$, —C(═O)$R^0$, —$N(R^0)_2$, —$(CH_2)_i$—$N(R^0)_2$, aryl having 6 to 20 carbons, heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy having 2 to 25 carbons or alkoxycarbonyloxy having 2 to 25 carbons, in these groups at least one hydrogen may be replaced by fluorine or chlorine, where $R^0$ is hydrogen or alkyl having 1 to 12 carbons, i is 1, 2, 3 or 4; $Z^5$ is —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_i$—, —CF$_2$CH$_2$—, —CH$_2$CF$_2$—, —(CF$_2$)$_i$—, —CH═CH—, —CF═CF—, —C≡C—, —CH═CH—COO—, —OCO—CH═CH—, —C($R^0$)$_2$ or a single bond, where $R^0$ is hydrogen or alkyl having 1 to 12 carbons, and i is 1, 2, 3 or 4; $R^5$ is alkyl having 1 to 25 carbons, and in the alkyl at least one —CH$_2$— may be replaced by —NR$^0$—, —O—, —S—, —CO—, —COO—, —OCO—, —OCOO— or cycloalkylene having 3 to 8 carbons, where $R^0$ is hydrogen or alkyl having 1 to 12 carbons, at least one tertiary carbon (>CH—) may be replaced by nitrogen (>N—), and at least one hydrogen may be replaced by fluorine or chlorine, with the proviso that $R^5$ has at least one of an oxygen atom of a OH moiety, a sulfur atom of an SH moiety and a nitrogen atom of primary, secondary or tertiary amine moiety; $R^6$ is hydrogen, halogen, alkyl having 1 to 25 carbons, and in the alkyl at least one —CH$_2$— may be replaced by —NR$^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in these groups at least one hydrogen may be replaced by fluorine or chlorine, where $R^0$ is hydrogen or alkyl having 1 to 12 carbons; and h is 0, 1, 2, 3, 4 or 5.

Item 17. The liquid crystal composition according to any one of items 1 to 15, including at least one polar compound selected from the group of compounds represented by formula (6-1) as the second additive:

$$R^4\text{-}R^5 \tag{6-1}$$

in formula (6-1), $R^4$ is alkyl having 4 to 20 carbons, and in the alkyl at least one —CH$_2$— may be replaced by —CH═CH—, —CF═CH—, —CH═CF—, —C≡C— or cycloalkylene having 3 to 8 carbons, and in these groups at least one hydrogen may be replaced by fluorine or chlorine; and $R^5$ is alkyl having 1 to 25 carbons, and in the alkyl at least one —CH$_2$— may be replaced by —NR$^0$—, —O—, —S—, —CO—, —COO—, —OCO—, —OCOO— or cycloalkylene having 3 to 8 carbons, wherein $R^0$ is hydrogen or alkyl having 1 to 12 carbons, at least one tertiary carbon (>CH—) may be replaced by nitrogen (>N—), and at least one hydrogen may be replaced by fluorine or chlorine, with the proviso that $R^5$ has at least one of an oxygen atom of a OH moiety, an sulfur atom of an SH moiety and a nitrogen atom of primary, secondary or tertiary amine moiety.

Item 18. The liquid crystal composition according to any one of items 15 to 17, wherein in formula (5) and formula (6) according to item 15, $R^5$ is a group represented by any one of formula (A1) to formula (A4):

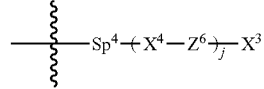
$$\tag{A1}$$

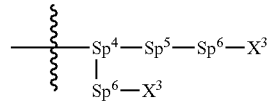
$$\tag{A2}$$

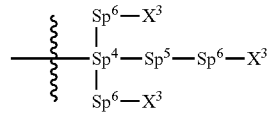
$$\tag{A3}$$

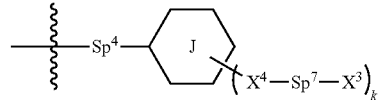
$$\tag{A4}$$

in formula (A1) to formula (A4), $Sp^4$, $Sp^6$ and $Sp^7$ are independently a single bond or group (-Sp"-X"—), where Sp" is alkylene having 1 to 20 carbons, and in the alkylene at least one —CH$_2$— may be replaced by —O—, —S—, —NH—, —N($R^0$)—, —CO—, —CO—O—, —O—CO, —O—CO—O—, —S—CO—, —CO—S—, —N($R^0$)—CO—O—, —O—CO—N($R^0$)—, —N($R^0$)—CO—N ($R^0$)—, —CH═CH— or —C≡C—, and in these groups at least one hydrogen may be replaced by fluorine, chlorine or —CN, and X" is —O—, —S—, —CO—, —CO—O—, —O—CO—, —O—CO—O—, —CO—N($R^0$)—, —N($R^0$)—CO—, —N($R^0$)—CO—N($R^0$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, where R$^0$ is hydrogen or alkyl having 1 to 12 carbons, and Y$^2$ and Y$^3$ are independently hydrogen, fluorine, chlorine or —CN; Sp$^5$ is a trivalent group or a tetravalent group (namely, >CH—, >CR$^{11}$—, >N—, >C<); X$^3$ is —OH, —OR$^{11}$, —COOH, —NH$_2$, —NHR$^{11}$, —N(R$^{11}$)$_2$, —SH, —SR$^{11}$,

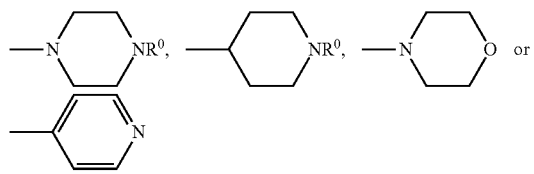

where R$^0$ is hydrogen or alkyl having 1 to 12 carbons; X$^4$ is —O—, —CO—, —NH—, —NR$^{11}$—, —S— or a single bond; Z$^6$ is alkylene having 1 to 15 carbons, an alicyclic group having 5 or 6 carbons, or any combination of these, and in these groups at least one hydrogen may be replaced by —OH, —OR$^{11}$, —COOH, —NH$_2$, —NHR$^{11}$, —N(R$^{11}$)$_2$, fluorine or chlorine; R$^{11}$ is alkyl having 1 to 15 carbons, and in the alkyl at least one —CH$_2$— may be replaced by —C≡C—, —CH=CH—, —COO—, —OCO—, —CO— or —O—, in these groups at least one hydrogen may be replaced by fluorine or chlorine; ring J is an aromatic group having 6 to 25 carbons or an alicyclic group having 3 to 25 carbons, and these groups may be a condensed ring, and in these groups one to three hydrogens may be replaced by R$^L$; R$^L$ is —OH, —(CH$_2$)$_i$—OH, fluorine, chlorine, —CN, —NO$_2$, —NCO, —NCS, —OCN, —SCN, —C(=O)N(R$^0$)$_2$, —C(=O)R$^0$, —N(R$^0$)$_2$, —(CH$_2$)$_i$—N(R$^0$)$_2$, —SH, —SR$^0$, aryl having 6 to 20 carbons, heteroaryl having 6 to 20 carbons, alkyl having 1 to 25 carbons, alkoxy having 1 to 25 carbons, alkylcarbonyl having to 25 carbons, alkoxycarbonyl having 2 to 25 carbons, alkylcarbonyloxy having 2 to 25 carbons or alkoxycarbonyloxy having 2 to 25 carbons, and in these groups at least one hydrogen may be replaced by fluorine or chlorine, where R$^0$ is hydrogen or alkyl having 1 to 12 carbons, i is 1, 2, 3 or 4; j is 0, 1, 2 or 3; and k is 2, 3, 4 or 5.

Item 19. The liquid crystal composition according to item 16, wherein the second additive is at least one compound selected from the group of compounds represented by formula (5-1-1) to formula (5-1-4):

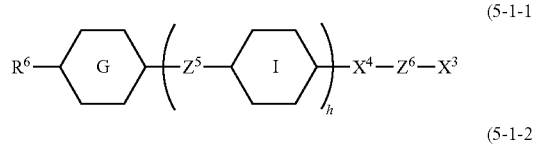

(5-1-1)

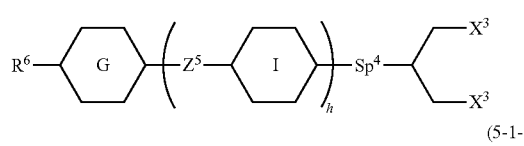

(5-1-2)

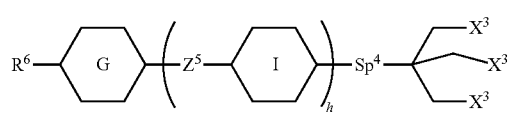

(5-1-3)

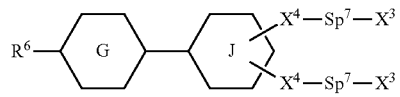

(5-1-4)

in formula (5-1-1) to formula (5-1-4), ring G and ring I are independently 1,4-cyclohexylene, 1,4-phenylene, 2-fluoro-1,4-phenylene, 2-fluoro-1,3-phenylene, 2-ethyl-1,4-phenylene, 2,6-diethyl-1,4-phenylene, 2-trifluoromethyl-1,4-phenylene, 2,3-difluoro-1,4-phenylene, 2,5-difluoro-1,4-phenylene, 2,6-difluoro-1,4-phenylene or 2,3,5,6-tetrafluoro-1,4-phenylene; ring J is cyclohexyl or phenyl; Z$^5$ is a single bond, —CH$_2$CH$_2$—, —COO— or —OCO—; Z$^6$ is a single bond, alkylene having 1 to 15, an alicyclic group having 5 to 6 carbons or any combination of these, and in these groups at least one hydrogen may be replaced by —OH, —OR$^1$, —COOH, —NH$_2$, —NHR$^{11}$, —N(R$^{11}$)$_2$, fluorine or chlorine, R$^{11}$ is alkyl having 1 to 15 carbons, and in the alkyl at least one —CH$_2$— may be replaced by —C≡C—, —CH=CH—, —COO—, —OCO—, —CO—, —O— or —NH—, and in these groups at least one hydrogen may be replaced by fluorine or chlorine; Sp$^4$ is a single bond, ethylene, propylene or methyleneoxy; Sp$^7$ is a single bond or alkylene having 1 to 5 carbons, and in the alkylene —CH$_2$— may be replaced by —O— or —NH—; R$^6$ is alkyl having 1 to 8 carbons or fluorine; h is 0, 1, 2, 3, 4 or 5; X$^3$ is —OH, —COOH, —SH, —OCH$_3$ or —NH$_2$; and X$^4$ is a single bond or —O—.

Item 20. The liquid crystal composition according to item 17, wherein the second additive is at least one compound selected from the group of compounds represented by formula (6-1-1) to formula (6-1-29):

(6-1-1)

(6-1-2)

(6-1-3)

(6-1-4)

(6-1-5)

(6-1-6)

(6-1-7)

(6-1-8)

(6-1-9)

-continued

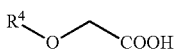 (6-1-10)

 (6-1-11)

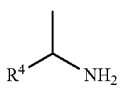 (6-1-12)

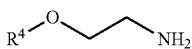 (6-1-13)

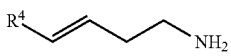 (6-1-14)

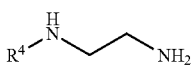 (6-1-15)

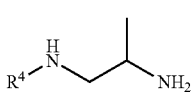 (6-1-16)

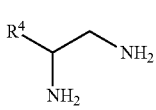 (6-1-17)

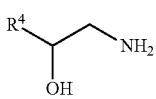 (6-1-18)

 (6-1-19)

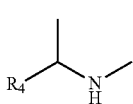 (6-1-20)

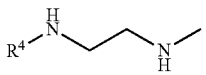 (6-1-21)

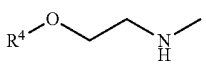 (6-1-22)

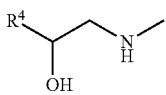 (6-1-23)

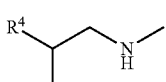 (6-1-24)

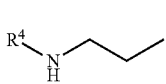 (6-1-25)

(6-1-26)

-continued

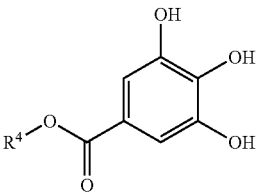 (6-1-27)

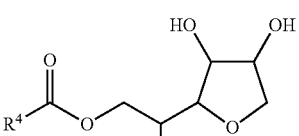 (6-1-28)

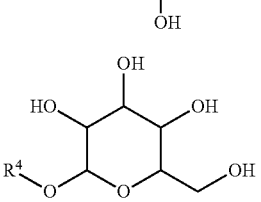 (6-1-29)

in formula (6-1-1) to formula (6-1-29), $R^4$ is alkyl having 4 to 20 carbons, and in the alkyl at least one —$CH_2$— may be replaced by —CH=CH—, —CF=CH—, —CH=CF—, —C≡C— or cycloalkylene having 3 to 8 carbons, and in these groups at least one hydrogen may be replaced by fluorine or chlorine.

Item 21. The liquid crystal composition according to any one of items 1 to 20, wherein the ratio of the second additive is less than 10% by weight based on the weight of the liquid crystal composition.

Item 22. A liquid crystal display device including the liquid crystal composition according to any one of items 1 to 21.

Item 23. The liquid crystal display device according to item 22, wherein the operating mode of the liquid crystal display device is an IPS mode, a TN mode, an FFS mode or an FPA mode, and the driving mode of the liquid crystal display device is an active matrix mode.

Item 24. A liquid crystal display device with a polymer sustained alignment type including a liquid crystal composition according to any one of items 1 to 21, where the polymerizable compound in the liquid crystal composition has been polymerized.

Item 25. A liquid crystal display device having no alignment films and including a liquid crystal composition according to any one of items 1 to 21, where the polymerizable compound in the liquid crystal composition has been polymerized.

Item 26. Use of the liquid crystal composition according to any one of items 1 to 21 for the liquid crystal display device.

Item 27. Use of the liquid crystal composition according to any one of items 1 to 21 for the liquid crystal display device with a polymer sustained alignment type.

Item 28. Use of the liquid crystal composition according to any one of items 1 to 21 for the liquid crystal display device having no alignment films.

The invention further includes the following items. (a) A method for producing a liquid crystal display device described above, wherein a liquid crystal composition described above is placed between the two substrates, and the composition is irradiated with light under the conditions of an applied voltage, and a polymerizable compound included in the composition is polymerized. (b) The liquid crystal composition described above, wherein the maximum temperature of a nematic phase is 70° C. or higher, the optical anisotropy (measured at 25° C.) at a wavelength of 589 nanometers is 0.08 or more, and the dielectric anisotropy (measured at 25° C.) at a frequency of 1 kHz is 2 or more.

The invention further includes the following items. (c) The composition described above including at least two of polymerizable compound (1) described above. (d) The composition described above, further including a polymerizable compound that is different from polymerizable compound (1) described above. (e) The composition described above, including one, two or at least three of additives such as an optically active compound, an antioxidant, an ultraviolet light absorber, a coloring matter, an antifoaming agent, a polymerizable compound, a polymerization initiator, a polymerization inhibitor and a polar compound. (f) An AM device including the composition described above. (g) A device including the composition described above and having a mode of TN, ECB, OCB, IPS, FFS, VA or FPA. (h) A transmission-type device including the composition described above. (i) Use of the composition described above, as a composition having a nematic phase. (j) Use of the composition prepared by the addition of an optically active compound to the composition described above, as an optically active composition.

The composition of the invention will be explained in the following order: First, the structure of the composition will be explained. Second, the main characteristics of the component compounds and the main effects of these compounds on the composition will be explained. Third, a combination of the components in the composition, a desirable ratio of the components and its basis will be explained. Fourth, a desirable embodiment of the component compounds will be explained. Fifth, desirable component compounds will be explained. Sixth, additives that may be added to the composition will be explained. Seventh, methods for synthesizing the component compounds will be explained. Last, the use of the composition will be explained.

First, the structure of the composition will be explained. The compositions of the invention are classified into composition A and composition B. Composition A may further include any other liquid crystal compound, an additive and so forth, in addition to liquid crystal compounds selected from compound (2), compound (3) and compound (4). "Any other liquid crystal compound" is a liquid crystal compound that is different from compound (2), compound (3) and compound (4). Such a compound is mixed with the composition for the purpose of further adjusting the characteristics. The additive includes an optically active compound, an antioxidant, an ultraviolet light absorber, a coloring matter, an antifoaming agent, a polymerizable compound, a polymerization initiator, a polymerization inhibitor and a polar compound.

Composition B consists essentially of liquid crystal compounds selected from compound (2), compound (3) and compound (4). The term "essentially" means that the composition may include an additive, but does not include any other liquid crystal compound. Composition B has a smaller number of components than composition A. Composition B is preferable to composition A in view of cost reduction. Composition A is preferable to composition B in view of the fact that characteristics can be further adjusted by mixing with any other liquid crystal compound.

Second, the main characteristics of the component compounds and the main effects of these compounds on the characteristics of the composition will be explained. Table 2 summarizes the main characteristics of the component compounds based on the effects of the invention. In Table 2, the symbol L stands for "large" or "high", the symbol M stands for "medium", and the symbol S stands for "small" or "low." The symbols L, M and S mean a classification based on a qualitative comparison among the component compounds, and the symbol 0 means that the value is zero or close to zero.

TABLE 2

| Characteristics of Compounds | | | |
|---|---|---|---|
| Characteristics | Compound (2) | Compound (3) | Compound (4) |
| Maximum Temperature | S-L | S-L | S-M |
| Viscosity | M-L | S-M | L |
| Optical Anisotropy | M-L | M-L | M-L |
| Dielectric Anisotropy | S-L[1] | 0 | L[2] |
| Specific Resistance | L | L | L |

[1] The value of dielectric anisotropy is positive, and the symbol expresses the magnitude of the absolute value.
[2] The value of dielectric anisotropy is negative, and the symbol expresses the magnitude of the absolute value.

The main effects of the component compounds on the characteristics of the composition upon mixing the component compounds with the composition are as follows. Compound (1) gives a polymer by polymerization. This polymer decreases the response time of a device, and improves image burn-in, since it stabilizes the alignment of liquid crystal molecules. Compound (2) increases the dielectric anisotropy, and decreases the minimum temperature. Compound (3) decreases the viscosity. Compound (4) increases the dielectric constant in the minor axis direction. Compound (5) and Compound (6) are absorbed on the substrate surface by the action of a polar group, and adjust the alignment of liquid crystal molecules. A polymer of compound (1) is effective in view of the alignment of liquid crystal molecules. Compound (5) or compound (6) is also effective. A combination of compound (1) and compound (5) or compound (1) and compound (6) is more effective. A synergistic effect can be expected by the combination. The combination is expected to have a better long-term stability in comparison with compound (5) alone or compound (6) alone.

Third, a combination of the components in the composition, a desirable ratio of the components and its basis will be explained. A desirable combination of the components in the composition is compound (1) plus compound (2) plus compound (5), compound (1) plus compound (2) plus compound (3) plus compound (5), compound (1) plus compound (2) plus compound (3) plus compound (4) plus compound (5), compound (1) plus compound (2) plus compound (6), compound (1) plus compound (2) plus compound (3) plus compound (6), compound (1) plus compound (2) plus compound (3) plus compound (4) plus compound (6), compound (1) plus compound (2) plus compound (5) plus compound (6), compound (1) plus compound (2) plus compound (3) plus compound (5) plus compound (6) or compound (1) plus compound (2) plus compound (3) plus compound (4) plus compound (5) plus compound (6). A more desirable combination is compound (1) plus compound (2) plus compound (3) plus compound (5).

Compound (1) is added to the composition for the purpose of adjusting to device with a polymer sustained alignment type. A desirable ratio of compound (1) is approximately 0.03% by weight or more for improving the long-term reliability of the device, and approximately 10% by weight or less for preventing a poor display of the device. A more desirable ratio is in the range of approximately 0.1% by weight to approximately 2% by weight. An especially desirable ratio is in the range of approximately 0.2% by weight to approximately 1.0% by weight.

A desirable ratio of compound (2) is approximately 10% by weight or more for increasing the dielectric anisotropy, and approximately 90% by weight or less for decreasing the minimum temperature or for decreasing the viscosity. A more desirable ratio is in the range of approximately 15% by weight to approximately 75% by weight. An especially desirable ratio is in the range of approximately 20% by weight to approximately 65% by weight.

A desirable ratio of compound (3) is approximately 10% by weight or more for increasing the maximum temperature or for decreasing the viscosity, and approximately 90% by weight or less for increasing the dielectric anisotropy. A more desirable ratio is in the range of approximately 20% by weight to approximately 85% by weight. An especially desirable ratio is in the range of approximately 30% by weight to approximately 80% by weight.

A desirable ratio of compound (4) is approximately 3% by weight or more for increasing the dielectric anisotropy, and approximately 25% by weight or less for decreasing the minimum temperature. A more desirable ratio is in the range of approximately 5% by weight to approximately 20% by weight. An especially desirable ratio is in the range of approximately 5% by weight to approximately 15% by weight.

Compound (5) or compound (6) is added to the composition for the purpose of adjusting the alignment of liquid crystal molecules. A desirable ratio of compound (5) or compound (6) is approximately 0.05% by weight or more for aligning liquid crystal molecules, and approximately 10% by weight or less for preventing a poor display of the device. A more desirable ratio is in the range of approximately 0.1% by weight to approximately 7% by weight. An especially desirable ratio is in the range of approximately 0.5% by weight to approximately 5% by weight.

Fourth, a desirable embodiment of the component compounds will be explained. In formula (1), $P^1$, $P^2$ and $P^3$ are independently a polymerizable group. Desirable $P^1$, $P^2$ or $P^3$ is a polymerizable group selected from the group of groups represented by formula (P-1) to formula (P-5). More desirable $P^1$, $P^2$ or $P^3$ is a group represented by formula (P-1), formula (P-2) or formula (P-3). Especially desirable $P^1$, $P^2$ or $P^3$ is a group represented by formula (P-1) or formula (P-2). The most desirable $P^1$, $P^2$ or $P^3$ is a group represented by formula (P-1). A desirable group represented by formula (P-1) is —OCO—CH=CH$_2$ or —OCO—C(CH$_3$)=CH$_2$. A wavy line in group (P-1) to group (P-5) shows a binding site.

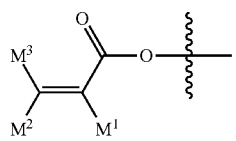
(P-1)

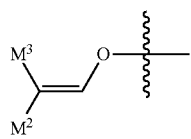
(P-2)

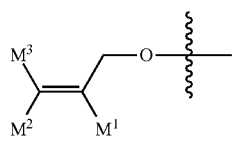
(P-3)

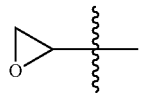
(P-4)

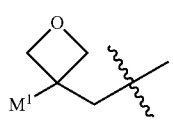
(P-5)

In formula (P-1) to formula (P-5), $M^1$, $M^2$ and $M^3$ are independently hydrogen, fluorine, alkyl having 1 to 5 carbons or alkyl having 1 to 5 carbons in which at least one hydrogen has been replaced by fluorine or chlorine. Desirable $M^1$, $M^2$ or $M^3$ is hydrogen or methyl for increasing the reactivity. More desirable $M^1$ is hydrogen or methyl, and more desirable $M^2$ or $M^3$ is hydrogen.

$Sp^1$, $Sp^2$ and $Sp^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH=CH— or —C≡C—, and in these groups at least one hydrogen may be replaced by fluorine or chlorine. Desirable $Sp^1$, $Sp^2$ or $Sp^3$ is a single bond, —CH$_2$CH$_2$—, —CH$_2$O—, —OCH$_2$—, —COO—, —OCO—, —CO—CH=CH— or —CH=CH—CO—. More desirable $Sp^1$, $Sp^2$ or $Sp^3$ is a single bond, with the proviso that $Sp^1$ and $Sp^3$ is a single bond when ring A and ring C are phenyl.

Ring A and ring C are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine. Desirable ring A or ring C is phenyl. Ring B is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine. Desirable ring B is 1,4-phenylene or 2-fluoro-1,4-phenylene.

$Z^1$ and $Z^2$ are independently a single bond or alkylene having 1 to 10 carbons, and in the alkylene at least one —CH$_2$— may be replaced by —O—, —CO—, —COO— or —OCO—, and at least one —CH$_2$—CH$_2$— may be replaced by —CH=CH—, —C(CH$_3$)=CH—, —CH=C(CH$_3$)— or —C(CH$_3$)=C(CH$_3$)—, and in these groups at least one hydrogen may be replaced by fluorine or chlorine. Desirable $Z^1$ or $Z^2$ is a single bond, —CH$_2$CH$_2$—, —CH$_2$O—, —OCH$_2$—, —COO— or —OCO—. More desirable $Z^1$ or $Z^2$ is a single bond.

a is 0, 1 or 2. Desirable a is 0 or 1. b, c and d are independently 0, 1, 2, 3 or 4, and the sum of b, c and d is 1 or more. Desirable b, c and d is 1 or 2, with the proviso that a is 1 or 2 when ring A and ring C are phenyl. Thus, a polymerizable compound that has a biphenyl skeleton is excluded.

In formula (2), formula (3) and formula (4), $R^1$ is alkyl having 1 to 12 carbons, alkoxy having 1 to 12 carbons, alkenyl having 2 to 12 carbons or alkenyl having 2 to 12 carbons in which at least one hydrogen has been replaced by fluorine or chlorine. Desirable $R^1$ is alkyl having 1 to 12 carbons for increasing the stability to ultraviolet light or heat. $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine. Desirable $R^2$ or $R^3$ is alkenyl having 2 to 12 carbons for decreasing the viscosity, and alkyl having 1 to 12 carbons for increasing the stability. $R^7$ and $R^8$ are independently alkyl having 1 to 12 carbons, alkoxy having 1 to 12 carbons, alkenyl having 2 to 12 carbons or alkenyloxy having 2 to 12 carbons. Desirable $R^7$ or $R^8$ is alkyl having 1 to 12 carbons for increasing the stability, and alkoxy having 1 to 12 carbons for increasing the dielectric anisotropy.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. A desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity, for instance. Cis is preferable in the alkenyl such as 2-butenyl, 2-pentenyl and 2-hexenyl.

Desirable alkenyloxy is vinyloxy, allyloxy, 3-butenyloxy, 3-pentenyloxy or 4-pentenyloxy. More desirable alkenyloxy is allyloxy or 3-butenyloxy for decreasing the viscosity.

Desirable examples of alkyl in which at least one hydrogen has been replaced by fluorine or chlorine are fluoromethyl, 2-fluoroethyl, 3-fluoropropyl, 4-fluorobutyl, 5-fluoropentyl, 6-fluorohexyl, 7-fluoroheptyl or 8-fluorooctyl. More desirable examples are 2-fluoroethyl, 3-fluoropropyl, 4-fluorobutyl or 5-fluoropentyl for increasing the dielectric anisotropy.

Desirable examples of alkenyl in which at least one hydrogen has been replaced by fluorine or chlorine are 2,2-difluorovinyl, 3,3-difluoro-2-propenyl, 4,4-difluoro-3-butenyl, 5,5-difluoro-4-pentenyl or 6,6-difluoro-5-hexenyl. More desirable examples are 2,2-difluorovinyl or 4,4-difluoro-3-butenyl for decreasing the viscosity.

Ring D is 1,4-cyclohexylene, 1,4-phenylene, 2-fluoro-1,4-phenylene, 2,3-difluoro-1,4-phenylene, 2,6-difluoro-1,4-phenylene, pyrimidine-2,5-diyl, 1,3-dioxane-2,5-diyl or tetrahydropyran-2,5-diyl. Desirable ring D is 1,4-phenylene or 2-fluoro-1,4-phenylene for increasing the optical anisotropy.

Ring E and ring F are independently 1,4-cyclohexylene, 1,4-phenylene, 2-fluoro-1,4-phenylene or 2,5-difluoro-1,4-phenylene. Desirable ring E and ring F is 1,4-cyclohexylene for decreasing the viscosity or for increasing the maximum temperature, and 1,4-phenylene for decreasing the minimum temperature.

Ring Q and ring V are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl. Desirable ring Q or ring V is 1,4-cyclohexylene for decreasing the viscosity, and tetrahydropyran-2,5-diyl for increasing the dielectric anisotropy, and 1,4-phenylene for increasing the optical anisotropy. Ring U is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Desirable ring U is 2,3-difluoro-1,4-phenylene for increasing the dielectric anisotropy. Tetrahydropyran-2,5-diyl is

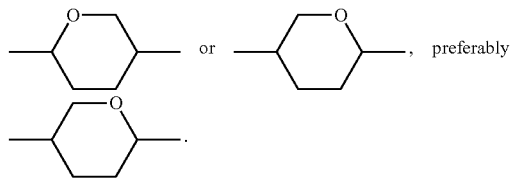

$Z^3$ is a single bond, —CH$_2$CH$_2$—, —CH$_2$O—, —OCH$_2$—, —COO—, —OCO—, —CF$_2$O— or —OCF$_2$—. Desirable $Z^3$ is a single bond for decreasing the viscosity. $Z^4$ is a single bond, —CH$_2$CH$_2$—, —CH$_2$O—, —OCH$_2$—, —COO— or —OCO—. Desirable $Z^4$ is a single bond for decreasing the viscosity, and —CH$_2$CH$_2$— for decreasing the minimum temperature, and —COO— or —OCO— for increasing the maximum temperature. $Z^7$ and $Z^8$ are independently a single bond, —CH$_2$CH$_2$—, —CH$_2$O—, —OCH$_2$—, —COO— or —OCO—. Desirable $Z^7$ or $Z^8$ is a single bond for decreasing the viscosity, and methyleneoxy for increasing the dielectric anisotropy.

$X^1$ and $X^2$ are independently hydrogen or fluorine. Desirable $X^1$ or $X^2$ is fluorine for increasing the dielectric anisotropy.

$Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine. A desirable example of alkyl in which at least one hydrogen has been replaced by fluorine or chlorine is trifluoromethyl. A desirable example of alkoxy in which at least one hydrogen has been replaced by fluorine or chlorine is trifluoromethoxy. A desirable example of alkenyloxy in which at least one hydrogen has been replaced by fluorine or chlorine is trifluorovinyloxy. Desirable $Y^1$ is fluorine for decreasing the minimum temperature.

e is 1, 2, 3 or 4. Desirable e is 2 for decreasing the minimum temperature, and is 3 for increasing the dielectric anisotropy. f is 1, 2 or 3. Desirable f is 1 for decreasing the viscosity, and is 2 or 3 for increasing the maximum temperature. p is 1, 2 or 3, q is 0 or 1, and the sum of p and q is 3 or less. Desirable p is 1 for decreasing the viscosity, and is 2 or 3 for increasing the maximum temperature. Desirable q is 0 for decreasing the viscosity, and is 1 for decreasing the minimum temperature.

In formula (5) and formula (6), $R^5$ is a polar group. It is desirable that a polar compound having a polar group should be stable since it is added to the composition. It is desirable that the polar compound should not decrease the voltage holding ratio of the device when the compound is added to the composition. It is desirable that the polar compound should have a low volatility. Desirable molar mass is 130 g/mol or more. More desirable molar mass is in the range of 150 g/mol to 500 g/mol. Desirable polar compound does not have a polymerizable group such as acryloyloxy (—OCO—CH=CH$_2$) and methacryloyloxy (—OCO—(CH$_3$)C=CH$_2$).

The polar group has a noncovalent interaction with the surface of a glass substrate or a metal oxide film. A desirable polar group has a heteroatom selected from the group of nitrogen, oxygen, sulfur and phosphorus. A desirable polar group has at least one or at least two of these heteroatoms. A more desirable polar group is a monovalent group derived by excluding hydrogen from a compound selected from the group of alcohols, primary, secondary and tertiary amines, ketones, carboxylic acids, thiols, esters, ethers, thioethers, and any combination of these. The structure of these groups may be straight-chain, branched-chain, cyclic, or any combination of these. An especially desirable polar group has at least one oxygen of a OH moiety or a nitrogen atom of primary, secondary or tertiary amine moiety. The most desirable polar group is a hydroxy group (carbon-OH).

Examples of polar group $R^5$ include groups represented by formula (A1) to formula (A4).

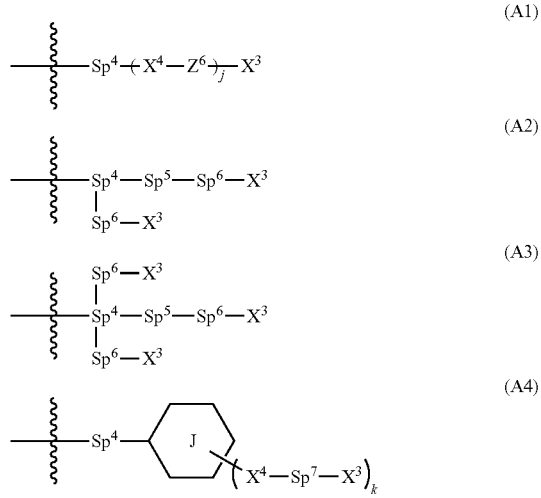

In formula (A1) to formula (A4), $Sp^4$, $Sp^6$ and $Sp^7$ are independently a single bond or group (-Sp"-X"—), and X" is bonded to a MES group or $R^4$. Sp" is alkylene having 1 to 20 carbons, preferably alkylene having 1 to 12 carbons, and in the alkylene at least one —CH$_2$— may be replaced by —O—, —S—, —NH—, —N(R$^0$)—, —CO—, —CO—O—, —O—CO—, —O—CO—O—, —S—CO—, —CO—S—, —N(R$^0$)—CO—O—, —O—CO—N(R$^0$)—, —N(R$^0$)—CO—N(R$^0$)—, —CH=CH— or —C≡C—, and in these groups at least one hydrogen may be replaced by fluorine, chlorine or —CN, X" is —O—, —S—, —CO—, —CO—O—, —O—CO—, —O—CO—O—, —CO—N(R$^0$)—, —N(R$^0$)—CO—, —N(R$^0$)—CO—N(R$^0$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, where R$^0$ is hydrogen or alkyl having 1 to 12 carbons, and Y$^2$ and Y$^3$ are independently hydrogen, fluorine, chlorine or —CN. Desirable X" is —O—, —S—, —CO—, —COO—, —OCO—, —O—COO—, —CO—NR$^0$—, —NR$^0$—CO—, —NR$^0$—CO—NR$^0$— or a single bond. $Sp^5$ is >CH—, >CR$^{11}$—, >N— or >C<. That is to say, $Sp^5$ in formula (A2) means >CH—, >CR$^{11}$— or >N—, and $Sp^5$ in formula (A3) means >C<.

Desirable Sp" is —(CH$_2$)$_{p1}$—, —(CH$_2$CH$_2$O)$_{q1}$—CH$_2$CH$_2$—, —CH$_2$CH$_2$—S—CH$_2$CH$_2$— or —CH$_2$CH$_2$—NHCH$_2$CH$_2$—, where p1 is an integer from 1 to 12, and q1 is an integer from 1 to 3. Desirable group (-Sp"-X"—) is —(CH$_2$)$_{p1}$—, —(CH$_2$)$_{p1}$—O—, —(CH$_2$)$_{p1}$—O—CO—, —(CH$_2$)$_{p1}$—O—CO—O—, where p1 and q1 have the same meanings as described above. More desirable group Sp" is ethylene, propylene, butylene, pentylene, hexylene, heptylene, octylene, nonylene, decylene, undecylene, dodecylene, octadecylene, ethyleneoxyethylene, methyleneoxyethylene, ethylenethioethylene, ethylene-N-methyliminoethylene, 1-methylalkylene, ethenylene, propenylene and butenylene.

$X^3$ is —NH$_2$, —NHR$^{11}$, —N(R$^{11}$)$_2$, —OR$^{11}$, —OH, —COOH, —SH, —SR$^{11}$,

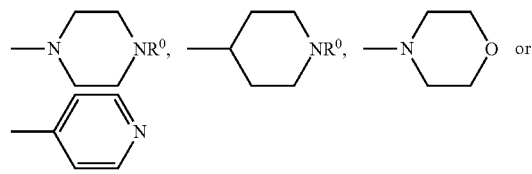

where $R^{11}$ is alkyl having 1 to 15 carbons, and in the alkyl at least one —CH$_2$— may be replaced by —C≡C—, —CH=CH—, —COO—, —OCO—, —CO— or —O—, and in these groups at least one hydrogen may be replaced by fluorine or chlorine, and R$^0$ is hydrogen or alkyl having 1 to 12 carbons.

$X^4$ is —O—, —CO—, —NH—, —NR$^{11}$—, —S— or a single bond, $Z^6$ is alkylene having 1 to 15 carbons, an alicyclic group having 5 to 6 carbons, or a combination of at least one ring and the alkylene, and in these groups at least one hydrogen may be replaced by —OH, —OR$^{11}$, —COOH, —NH$_2$, —NHR$^{11}$, —N(R$^{11}$)$_2$, fluorine or chlorine, where R$^{11}$ has the same meanings as described above. j is 0, 1, 2 or 3.

Especially desirable nitrogen-containing group $R^5$ is —NH$_2$, —NH—(CH$_2$)$_{n3}$H, —(CH$_2$)$_n$—NH$_2$, —(CH$_2$)$_n$—NH—(CH$_2$)$_{n3}$H, —NH—(CH$_2$)$_n$—NH$_2$, —NH—(CH$_2$)$_n$—NH—(CH$_2$)$_{n3}$H, —(CH$_2$)$_{n1}$—NH—(CH$_2$)$_{n2}$—NH$_2$, —(CH$_2$)$_{n1}$—NH—(CH$_2$)$_{n2}$—NH—(CH$_2$)$_{n3}$H, —O—(CH$_2$)$_n$—NH$_2$, —(CH$_2$)$_{n1}$—O—(CH$_2$)$_n$—NH$_2$, —(CH$_2$)$_{n1}$—NH—(CH$_2$)$_{n2}$—OH, —O—(CH$_2$)$_{n1}$—NH—(CH$_2$)$_{n2}$—NH$_2$, —O—(CH$_2$)$_{n1}$—NH—(CH$_2$)$_{n2}$—OH or —(CH$_2$)$_{n1}$—NH—(CH$_2$)$_{n2}$—NH—(CH$_2$)$_{n3}$H, where n, n1, n2 and n3 are independently an integer from 1 to 12, and preferably 1, 2, 3 or 4.

Especially desirable nitrogen-noncontaining group $R^5$ is —OH, —(CH$_2$)$_n$—OH, —O—(CH$_2$)$_n$—OH, —[O—(CH$_2$)$_{n1}$-]$_{n2}$—OH, —COOH, —(CH$_2$)$_n$—COOH, —O—(CH$_2$)$_n$—COOH or —[O—(CH$_2$)$_{n1}$-]$_{n2}$—COOH, where n, n1 and n2 are independently an integer from 1 to 12, and preferably 1, 2, 3 or 4.

It is especially desirable that $R^5$ should be —OH or —NH$_2$ in view of a high solubility in a liquid crystal composition. —OH is preferable to —O—, —CO— or —COO—, since it has a high anchor force. A group having a plurality of heteroatoms (nitrogen, oxygen) is especially desirable. A compound having such a polar group is effective even at low concentrations.

In formula (5), MES means a mesogenic group having at least one ring. The mesogenic group is well known to a person skilled in the art. The mesogenic group means a moiety contributing to the formation of a liquid crystal phase when a compound has the liquid crystal phase (mesophase). A desirable example of compound (5) is compound (5-1).

In formula (5-1), ring G and ring I are independently an aromatic group having 6 to 25 carbons, a heteroaromatic group having 5 to 25 carbons, an alicyclic group having 3 to 25 carbons or a heteroalicyclic group having 4 to 25 carbons, and these groups may be a condensed ring, and in these groups at least one hydrogen may be replaced by group T, and in these groups a desirable number of carbons is 4 to 25. The meanings of group T will be described in the last part of this paragraph. Desirable ring G or ring I is 1,4-phenylene, naphthalene-1,4-diyl, naphthalene-2,6-diyl (in these three groups, at least one tertiary carbon (>CH—) may be replaced by nitrogen (>N—)), 1,4-cyclohexylene (in this group, at least one —CH$_2$— may be replaced by —O— or —S—), 3,3'-bicyclobutylidene 1,4-cyclohexenylene, bicyclo[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl, octahydro-4,7-methanoindane-2,5-diyl or perhydrocyclopenta[a]phenanthrene-3,17-diyl (especially gonane-3,17-diyl), and in these groups at least one hydrogen may be replaced by group T, where group T is —OH, —(CH$_2$)$_i$—OH, halogen, —CN, —NO$_2$, —NCO, —NCS, —OCN, —SCN, —C(=O)N(R$^0$)$_2$, —C(=O)R, —N(R$^0$)$_2$, —(CH$_2$)$_i$—N(R$^0$)$_2$, aryl or heteroaryl having 6 to 20 carbons, alkyl or alkoxy having 1 to 25 carbons, or alkylcarbonyl, alkoxycarbonyl, alkylcarbonyloxy or alkoxycarbonyloxy having 2 to 25 carbons, and in these groups at least one hydrogen may be replaced by fluorine or chlorine, where R$^0$ is hydrogen or alkyl having 1 to 12 carbons and i is 1, 2, 3 or 4.

Z$^5$ is a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_i$—, —CF$_2$CH$_2$—, —CH$_2$CF$_2$—, —(CF$_2$)$_i$—, —CH=CH—, —CF=CF—, —C≡C—, —CH=CH—COO—, —OCO—CH=CH— or —C(R$^0$)$_2$—. R$^0$ is hydrogen or alkyl having 1 to 12 carbons and i is 1, 2, 3 or 4. Desirable Z$^5$ is a single bond.

R$^5$ is alkyl having 1 to 25 carbons, and in the alkyl at least one —CH$_2$— may be replaced by —NR$^0$—, —O—, —S—, —CO—, —COO—, —OCO—, —OCOO— or cycloalkylene having 3 to 8 carbons, wherein R$^0$ is hydrogen or alkyl having 1 to 12 carbons, at least one tertiary carbon (>CH—) may be replaced by nitrogen (>N—), and at least one hydrogen may be replaced by fluorine or chlorine, with the proviso that R$^5$ has at least one of an oxygen atom of a OH moiety, a sulfur atom of an SH moiety and a nitrogen atom of primary, secondary or tertiary amine moiety. Desirable R$^5$ has at least one of >NH, —OH or —SH. R$^6$ is hydrogen, halogen, alkyl having 1 to 25 carbons, and in the alkyl at least one —CH$_2$— may be replaced by —NR$^0$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in these groups at least one hydrogen may be replaced by fluorine or chlorine, where R$^0$ is hydrogen or alkyl having 1 to 12 carbons. Desirable R$^6$ is alkyl.

An aromatic group means aryl or substituted aryl. A heteroaromatic group means heteroaryl or substituted heteroaryl. The heteroaryl represents an aromatic group having at least one heteroatom. Aryl and heteroaryl may be a single ring or a plurality of rings. That is to say, these groups have at least one ring, and the ring may be condensed (for example, naphthyl), and two rings may be connected with a covalent bond (for example, biphenyl), or may have a combination of the condensed ring and connected rings. Desirable heteroaryl has at least one heteroatom selected from the group of nitrogen, oxygen, sulfur and phosphorus.

Desirable aryl or heteroaryl has 6 to 25 carbons, and may have a five-membered ring, a six-membered ring or a seven-membered ring. Desirable aryl or heteroaryl may be a single ring, or may be two rings or three rings. These groups may be a condensed ring, or may be substituted.

Desirable aryl includes a monovalent group derived by excluding one hydrogen from benzene, biphenyl, terphenyl, [1,1':3',1'']terphenyl, naphthalene, anthracene, binaphthyl, phenanthrene, pyrene, dihydropyrene, chrycene, perylene, tetracene, pentacene, benzopyrene, fluorene, indene, indenofluorene or spirobifluorene.

Desirable heteroaryl includes a monovalent group derived by excluding one hydrogen from a five-membered ring compound such as pyrrole, pyrazole, imidazole, 1,2,3-triazole, 1,2,4-triazole, tetrazole, furan, thiophene, selenophene, oxazole, isoxazole, 1,2-thiazol, 1,3-thiazol, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole and 1,3,4-thiadiazole, or from six-membered ring compound such as pyridine, pyridazine, pyrimidine, pyradine, 1,3,5-triazine, 1,2,4-triazine, 1,2,3-triazine, 1,2,4,5-tetrazine, 1,2,3,4-tetrazine and 1,2,3,5-tetrazine.

Desirable heteroaryl also includes a monovalent group derived by excluding one hydrogen from a condensed ring compound such as indole, isoindole, indolizine, indazole, benzoimidazole, benzotriazole, purine, naphthaimidazole, phenanthroimidazole, pyridimidazole, pyradineimidazole, qunoxaline-imidazole, benzoxazole, naphthoxazole, anthroxazole, phenanthrooxazole, isoxazole, benzothiazol, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthizine, azacarbazole, benzocarbazole, phenanthridine, phenanthroline, thieno[2,3b]thiophene, thieno[3,2b]thiophene, dithienothiophene, isobenzothiophene, dibenzothiophene and benzothiadiazothiophene. Desirable heteroaryl also includes a monovalent group derived by excluding one hydrogen from a ring formed by a combination of two rings selected from the five-membered ring, the six-membered ring and the condensed ring. These heteroaryl may be substituted by alkyl, alkoxy, thioalkyl, fluorine, fluoroalkyl, aryl or heteroaryl.

An alicyclic group and a heteroalicyclic group may be saturated or unsaturated. That is to say, these groups may have a single bond alone or a combination of a single bond a multiple bond. The saturated ring is preferable to the unsaturated ring. A desirable heteroalicyclic group has at least one heteroatom selected from nitrogen, oxygen, sulfur and phosphorus.

An alicyclic group and a heteroalicyclic group may have one ring or may have a plurality of rings. Desirable examples of these rings are one ring, two rings or three rings having 3 to 25 carbons, and these rings may be a condensed ring, these of which may be substituted. Desirable examples of these groups are a five-membered ring, a six-membered ring, a seven-membered ring or an eight-membered ring, and in these groups at least one carbon may be replaced by silicon, at least one >CH— may be replaced by >N—, and at least one —CH$_2$— may be replaced by —O— or —S—.

A desirable alicyclic and heteroalicyclic group is a divalent group derived by excluding two hydrogens from a five-membered ring such as cyclopentane, tetrahydrofuran, tetrahydrothiofuran and pyrrolidine, from a six-membered ring such as cyclohexane, cyclohexene, tetrahydropyran, tetrahydrothiopyran, 1,3-dioxane, 1,3-dithiane and piperidine, from a seven-membered ring such as cycloheptane, and from a condensed ring such as tetrahydronaphthalene, decahydronaphthalene, indane, bicyclo[1.1.1]pentane, bicyclo[2.2.2]octane, spiro[3.3]heptane and octahydro-4,7-methanoindane.

h is 0, 1, 2, 3, 4 or 5.

In formula (6), $R^4$ is alkyl having 4 to 20 carbons, and in the alkyl at least one —$CH_2$— may be replaced by —CH=CH—, —CF=CH—, —CH=CF—, —C≡C— or cycloalkylene having 3 to 8 carbons, and at least one hydrogen may be replaced by fluorine or chlorine. g is 1 or 2, and preferably 1.

Desirable $R^4$ is alkyl having 4 to 20 carbons. More desirable $R^4$ is alkyl having 6 to 18 carbons. At least one —$CH_2$— may be replaced by —CH=CH—, —CF=CH—, —CH=CF—, —C≡C— or —O—, and at least one hydrogen may be replaced by fluorine or chlorine.

Especially desirable compound (5-1) is selected from the following compounds.

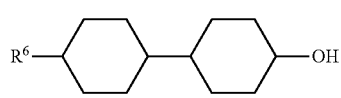
(5-1-1-1)

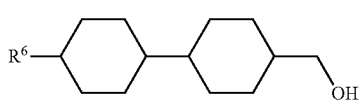
(5-1-1-2)

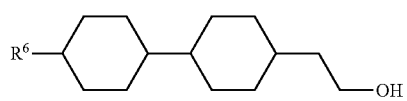
(5-1-1-3)

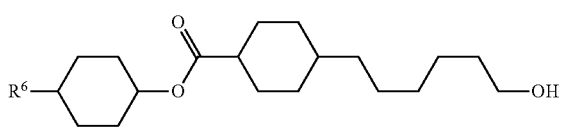
(5-1-1-4)

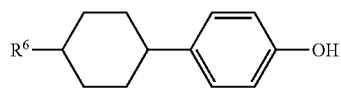
(5-1-1-5)

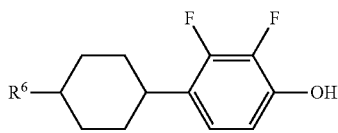
(5-1-1-6)

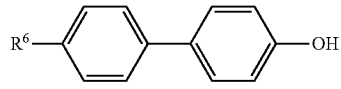
(5-1-1-7)

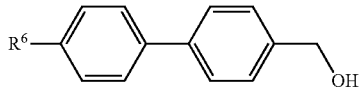
(5-1-1-8)

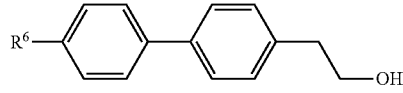
(5-1-1-9)

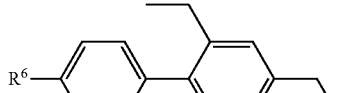
(5-1-1-10)

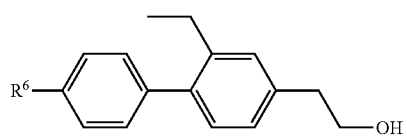
(5-1-1-11)

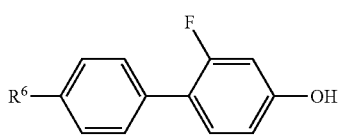
(5-1-1-12)

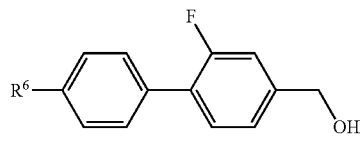
(5-1-1-13)

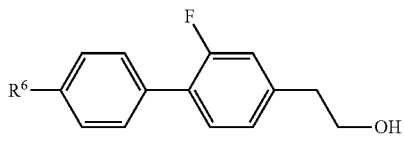
(5-1-1-14)

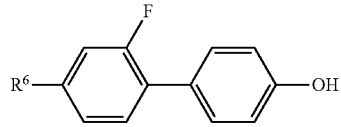
(5-1-1-15)

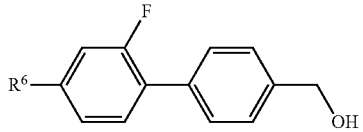
(5-1-1-16)

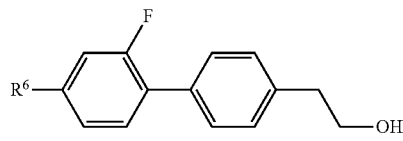
(5-1-1-17)

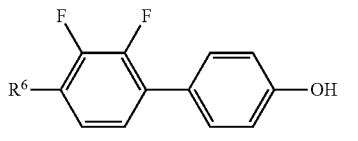
(5-1-1-18)

-continued
(5-1-1-19)
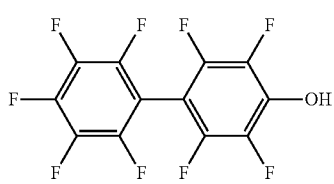
(5-1-1-20)
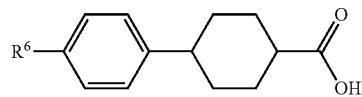
(5-1-1-21)
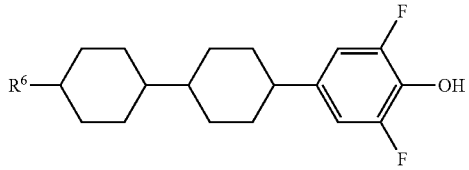
(5-1-1-22)
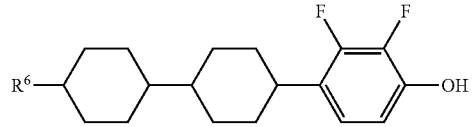
(5-1-1-23)
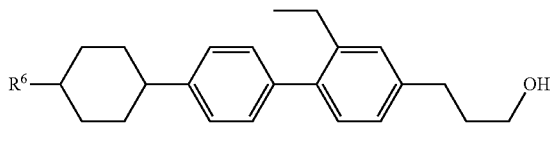
(5-1-1-24)
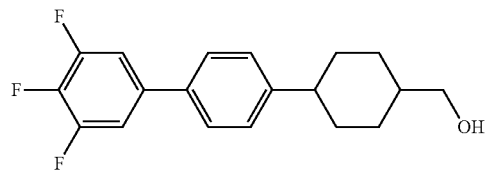
(5-1-1-25)
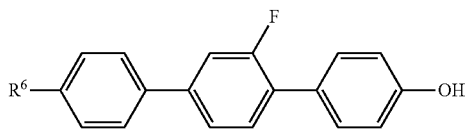
(5-1-1-26)
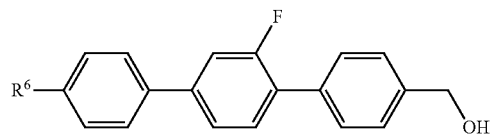
(5-1-1-27)
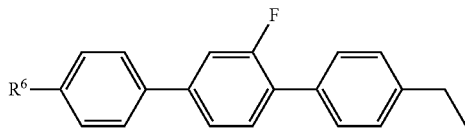
(5-1-1-28)
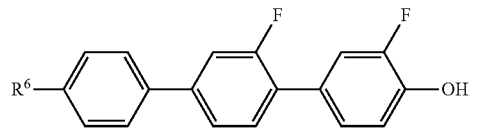
(5-1-1-29)
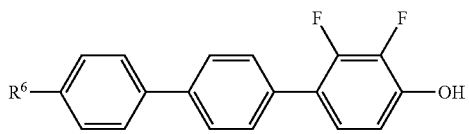
(5-1-1-30)
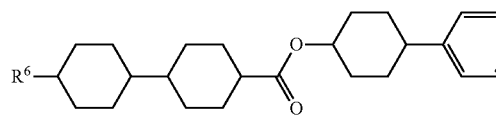
(5-1-1-31)
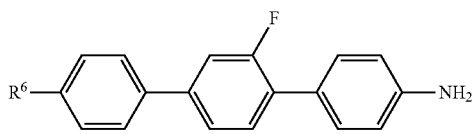
(5-1-1-32)
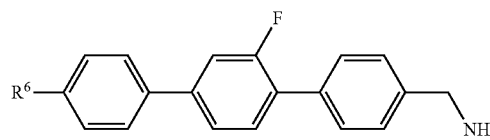
(5-1-1-33)
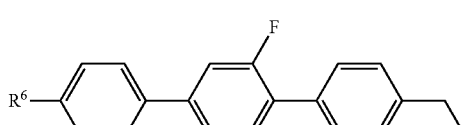
(5-1-1-34)
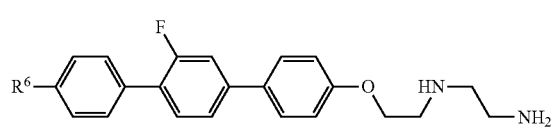
(5-1-1-35)
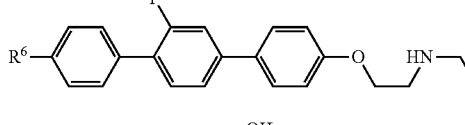
(5-1-1-36)
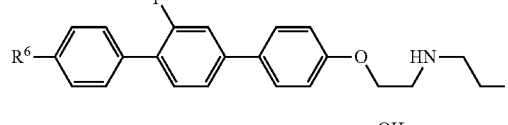
(5-1-2-1)
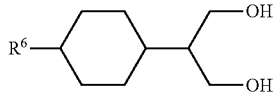
(5-1-2-2)

-continued
(5-1-2-3)
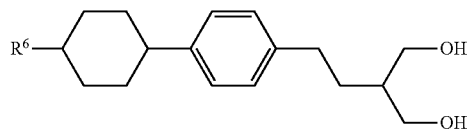
(5-1-2-4)
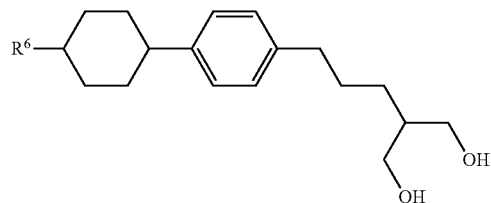
(5-1-2-5)
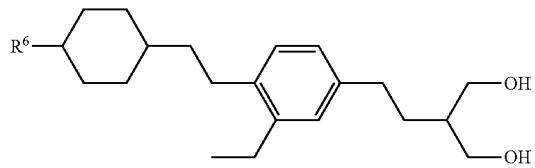
(5-1-2-6)
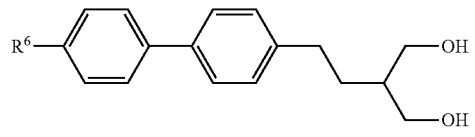
(5-1-2-7)
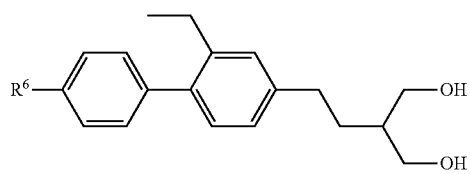
(5-1-2-8)
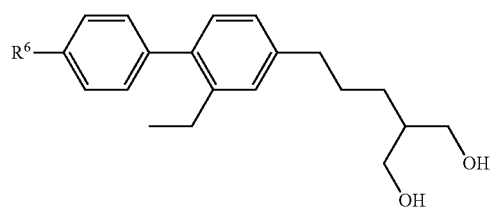
(5-1-2-9)
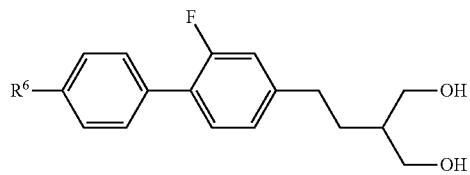
(5-1-2-10)
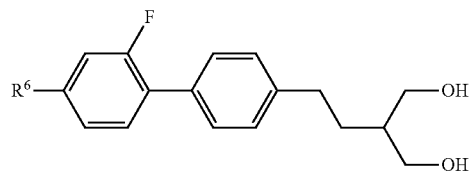
(5-1-2-11)
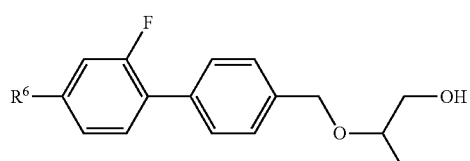
(5-1-2-12)
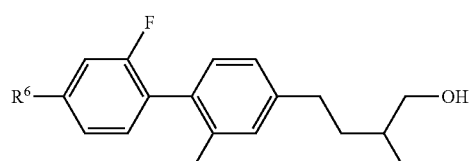
(5-1-2-13)
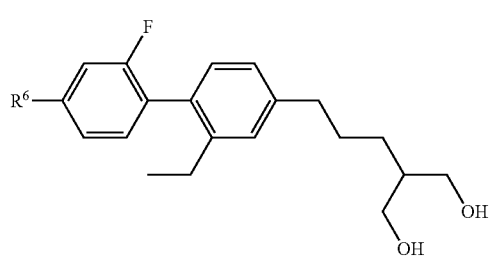
(5-1-2-14)
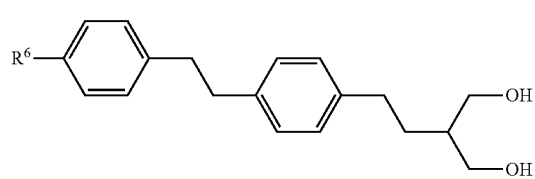
(5-1-2-15)
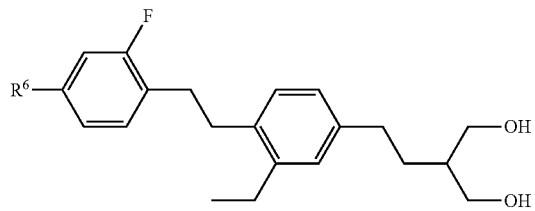
(5-1-2-16)
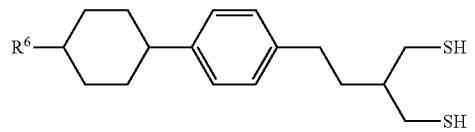

-continued
(5-1-2-17)
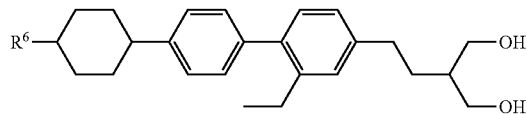
(5-1-2-18)
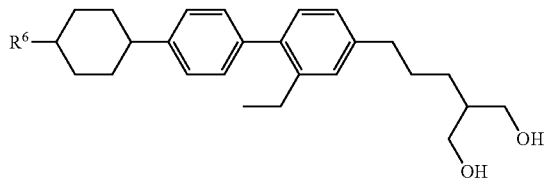
(5-1-2-19)
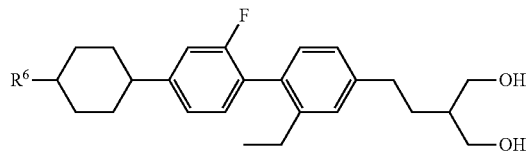
(5-1-2-20)
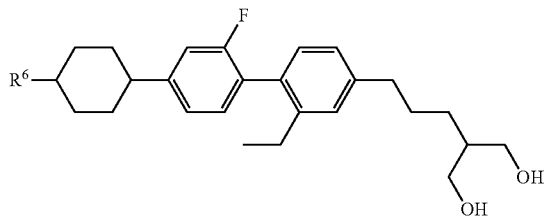
(5-1-2-21)
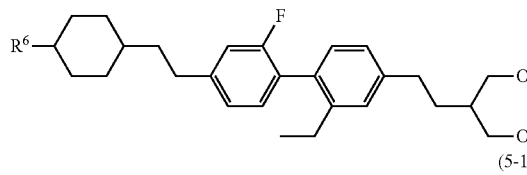
(5-1-2-22)
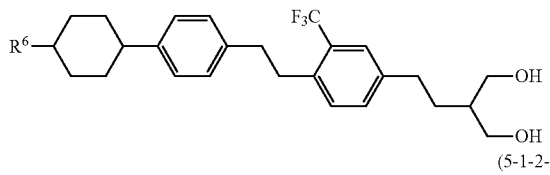
(5-1-2-23)
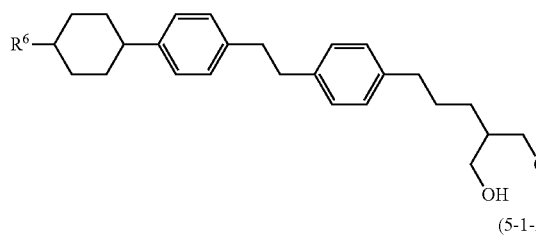
(5-1-2-24)
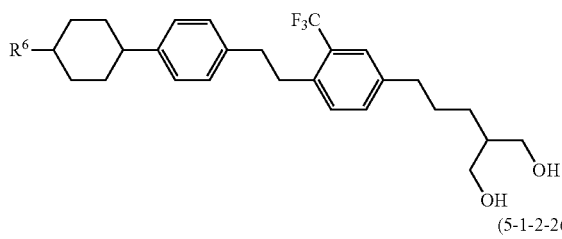
(5-1-2-25)
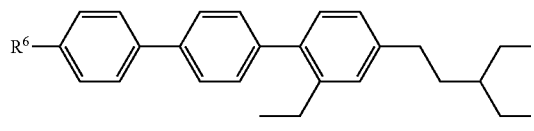
(5-1-2-26)
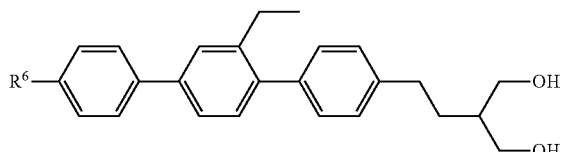
(5-1-2-27)
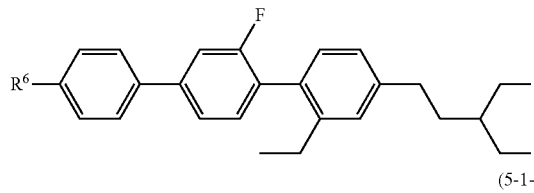
(5-1-2-28)
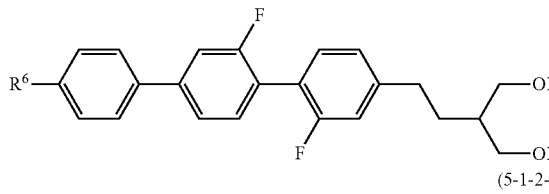
(5-1-2-29)
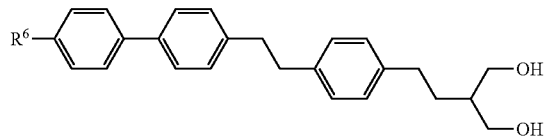
(5-1-2-30)
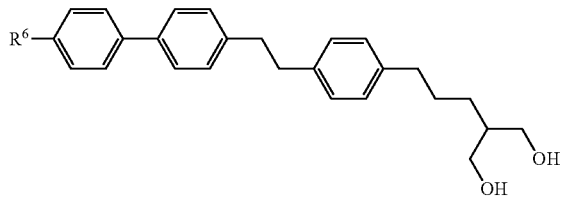
(5-1-2-31)
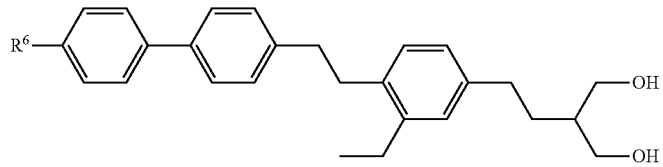

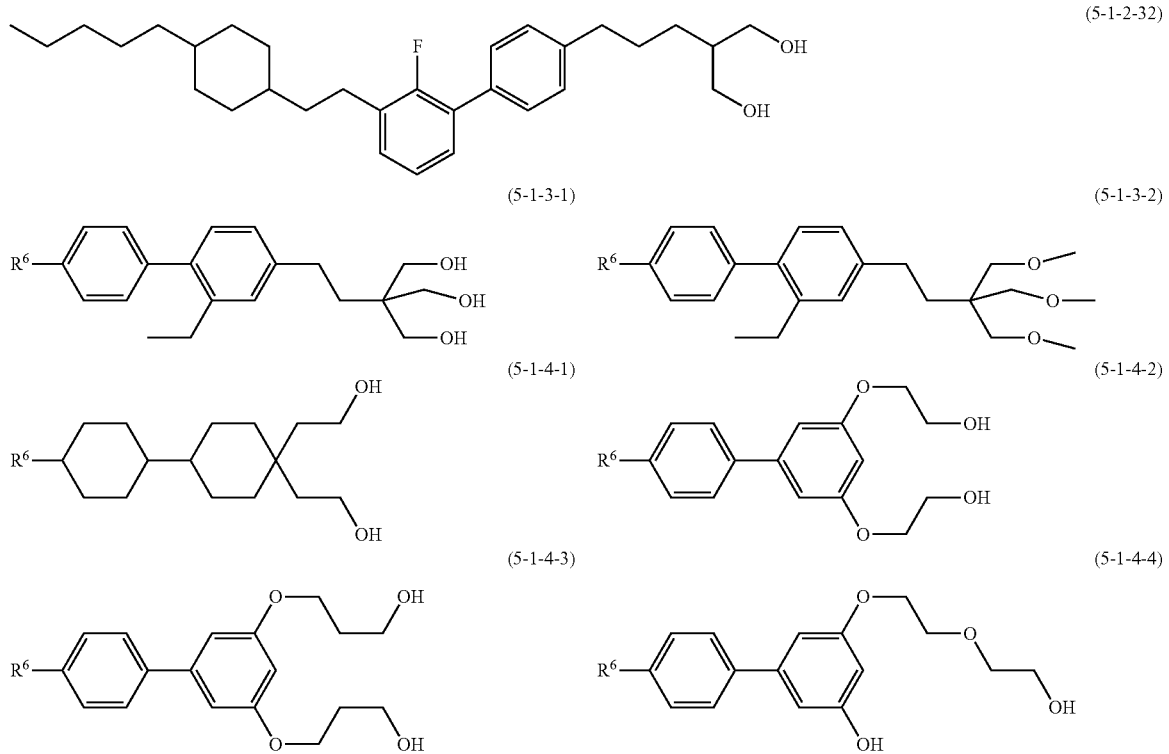
In formula (5-1-1-1) to formula (5-1-4-4), $R^6$ is alkyl having 1 to 8 carbons or fluorine.
Especially desirable compound (6-1) is selected from the following compound (6-1-1-1) to compound (6-1-29-1).
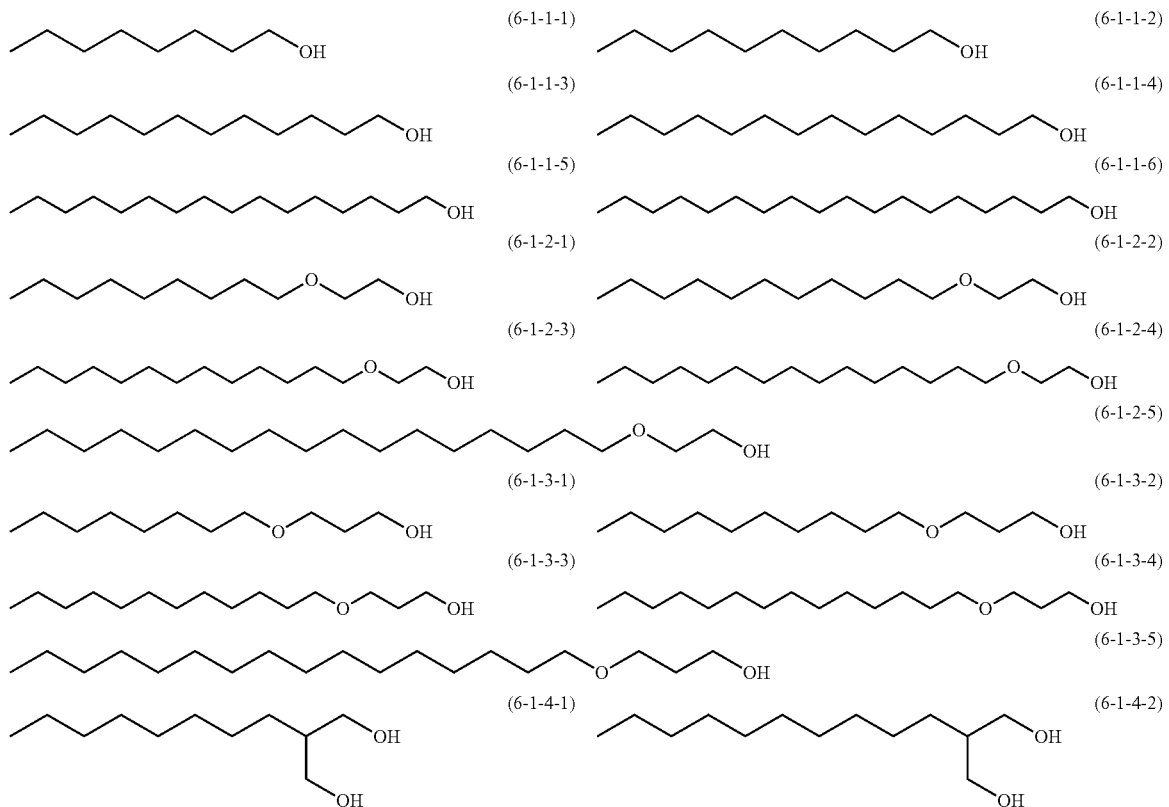

-continued
(6-1-4-3) 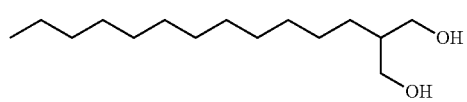
(6-1-4-4) 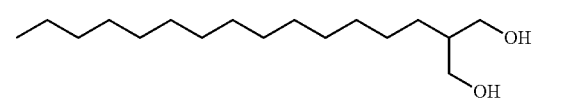
(6-1-4-5) 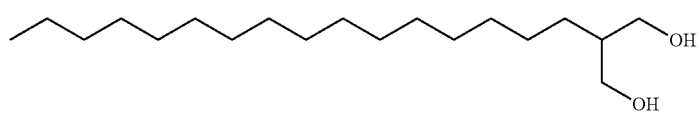
(6-1-4-6) 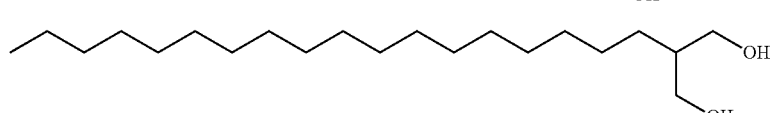
(6-1-5-1) 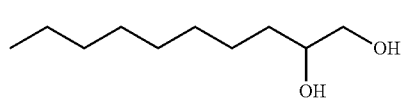
(6-1-5-2) 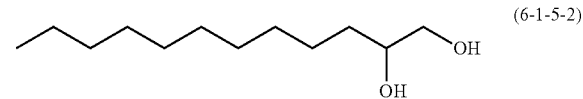
(6-1-5-3) 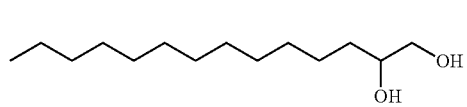
(6-1-5-4) 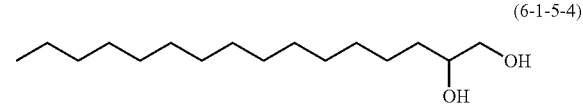
(6-1-5-5) 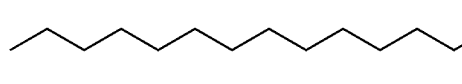
(6-1-6-1) 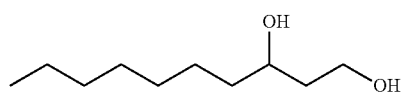
(6-1-6-2) 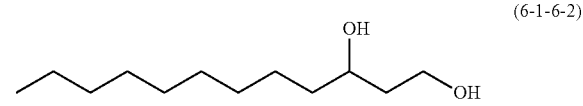
(6-1-6-3) 
(6-1-6-4) 
(6-1-6-5) 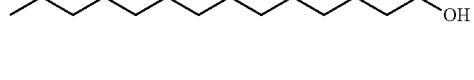
(6-1-6-6) 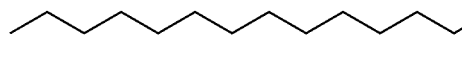
(6-1-7-1) 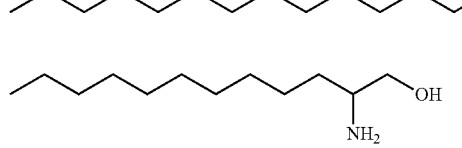
(6-1-7-2) 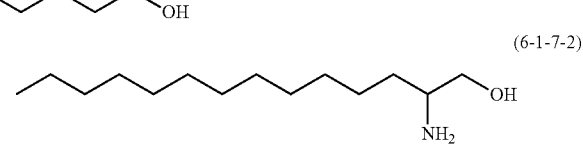
(6-1-7-3) 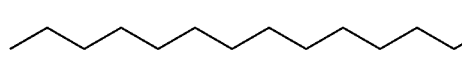
(6-1-7-4) 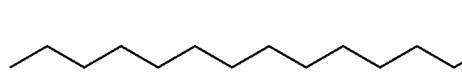
(6-1-7-5) 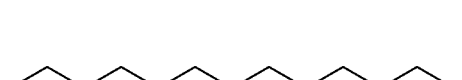
(6-1-8-1) 
(6-1-8-2) 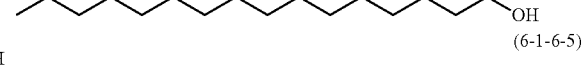

-continued
(6-1-8-3) 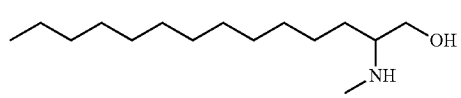
(6-1-8-4) 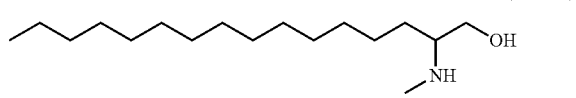
(6-1-8-5) 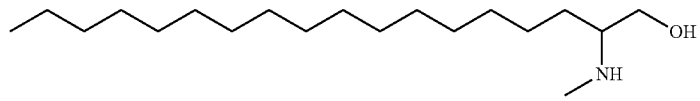
(6-1-8-6) 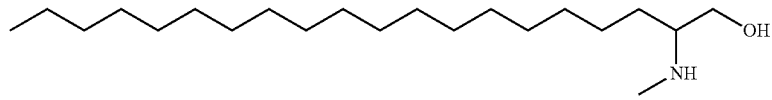
(6-1-9-1) 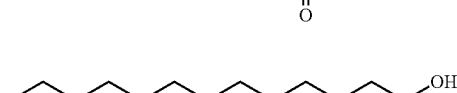
(6-1-9-2) 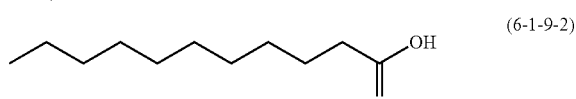
(6-1-9-3) 
(6-1-9-4) 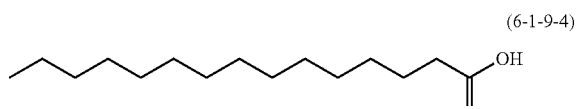
(6-1-9-5) 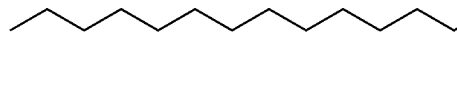
(6-1-9-6) 
(6-1-10-1) 
(6-1-10-2) 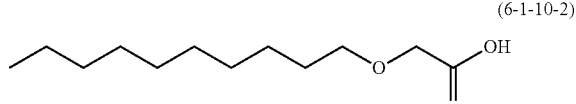
(6-1-10-3) 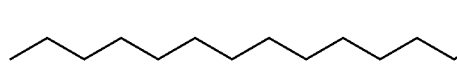
(6-1-10-4) 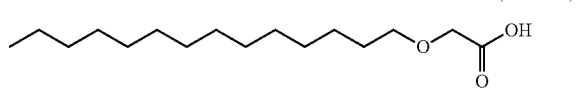
(6-1-10-5) 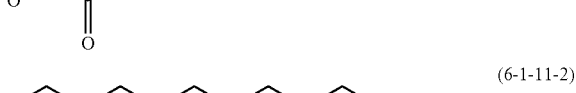
(6-1-11-1) 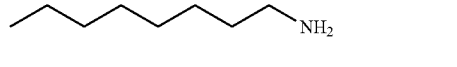
(6-1-11-2) 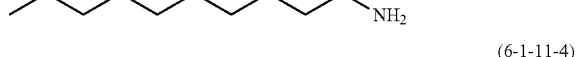
(6-1-11-3) 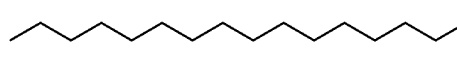
(6-1-11-4) 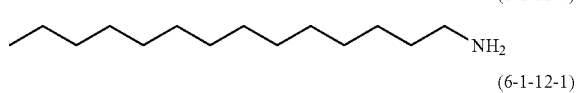
(6-1-11-5) 
(6-1-12-1) 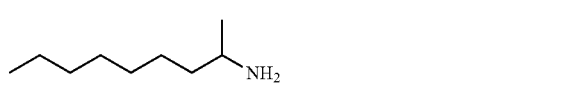
(6-1-12-2) 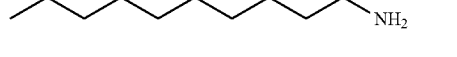
(6-1-12-3) 
(6-1-12-4) 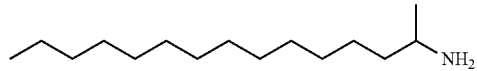
(6-1-12-5) 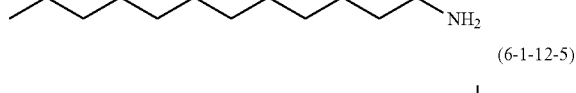

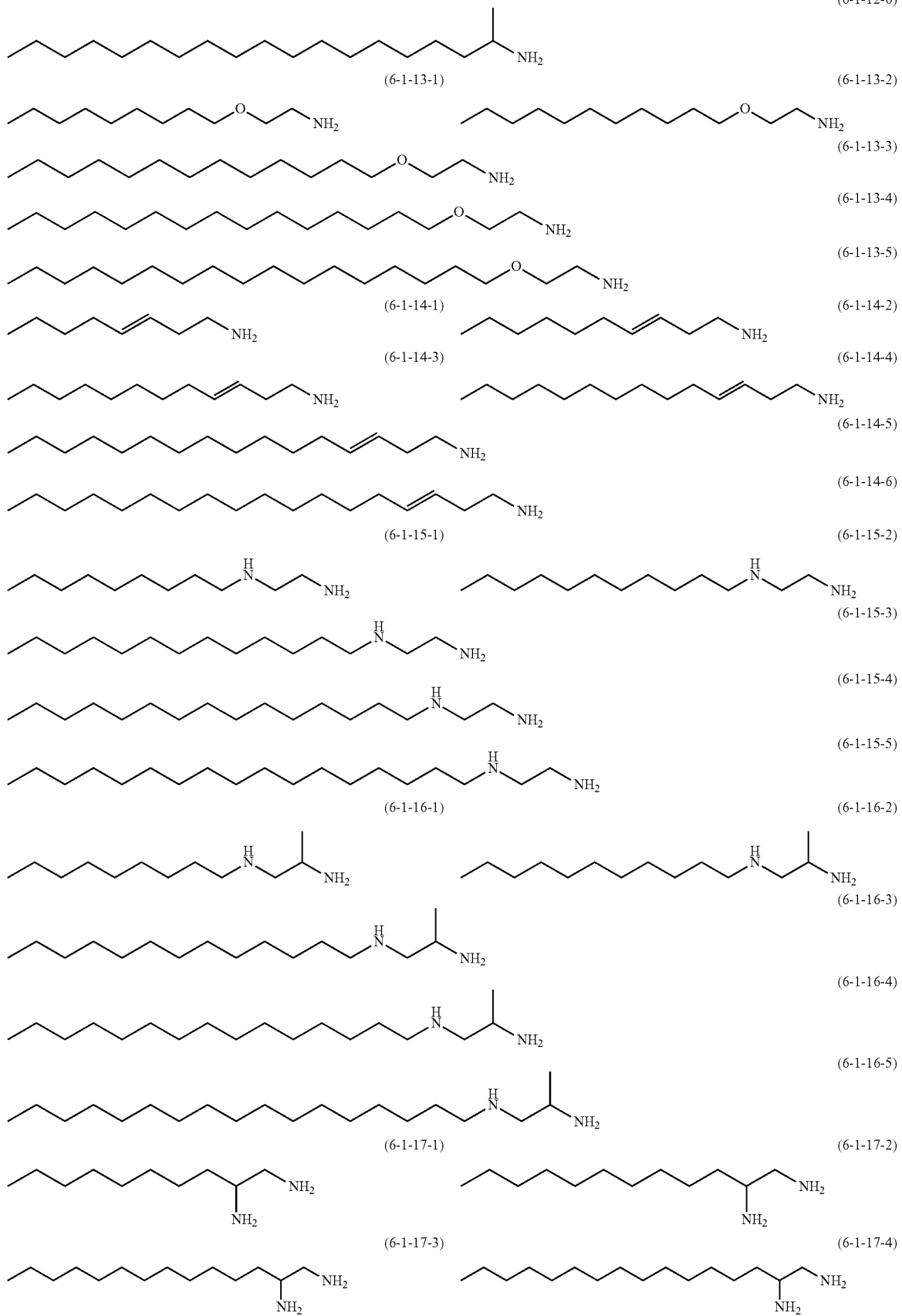

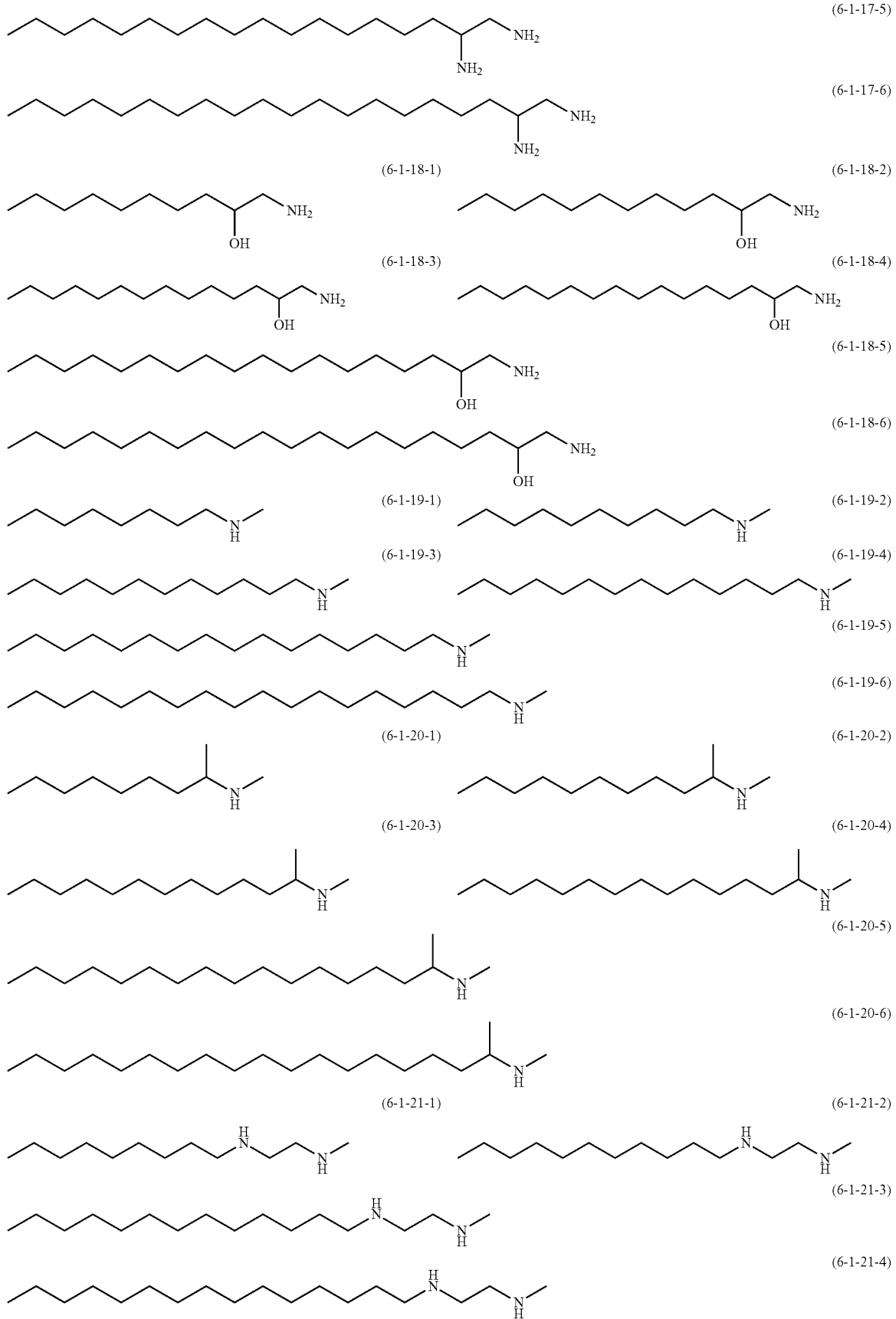

-continued
(6-1-21-5)
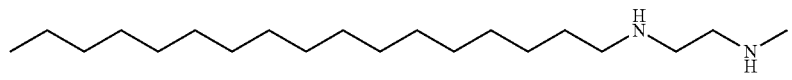
(6-1-22-1)
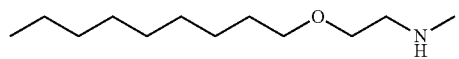
(6-1-22-2)
(6-1-22-3)
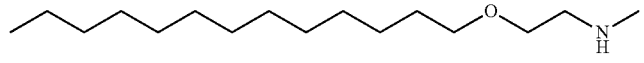
(6-1-22-4)
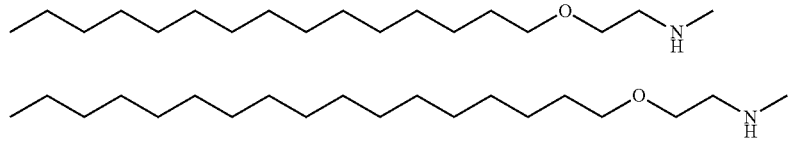
(6-1-22-5)
(6-1-23-1)
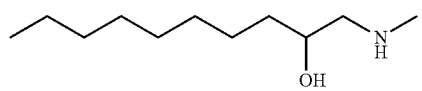
(6-1-23-2)
(6-1-23-3)
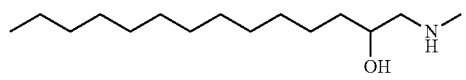
(6-1-23-4)
(6-1-23-5)
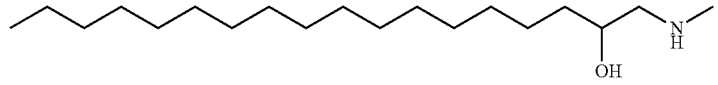
(6-1-23-6)
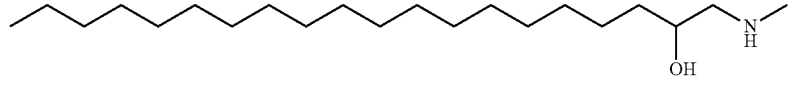
(6-1-24-1)
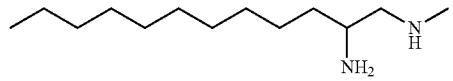
(6-1-24-2)
(6-1-24-3)
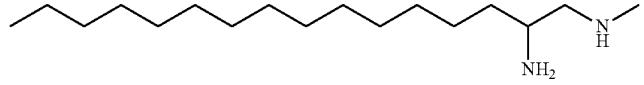
(6-1-24-4)
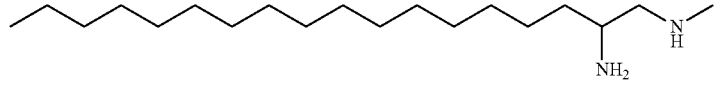
(6-1-24-5)
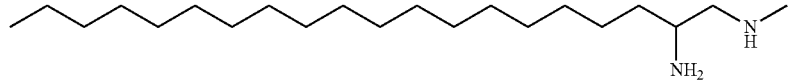
(6-1-25-1)
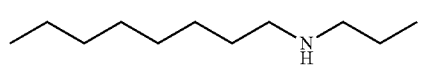
(6-1-25-2)
(6-1-25-3)
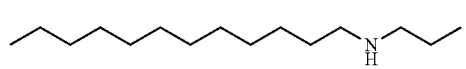
(6-1-25-4)
(6-1-25-5)
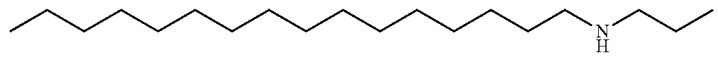
(6-1-25-6)
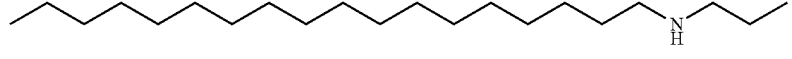

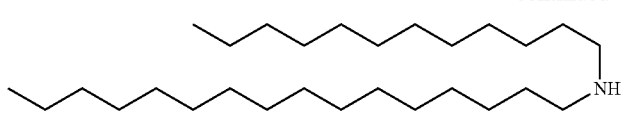
(6-1-26-1)

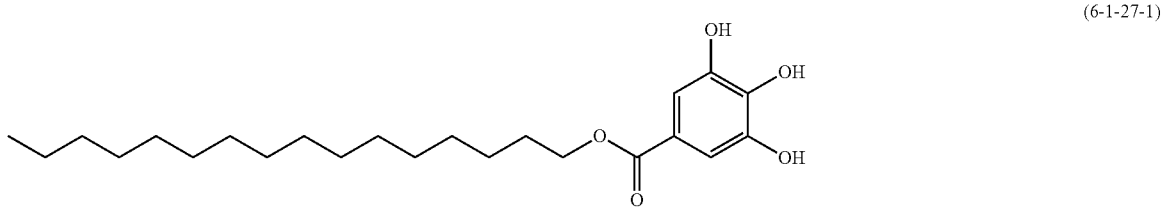
(6-1-27-1)

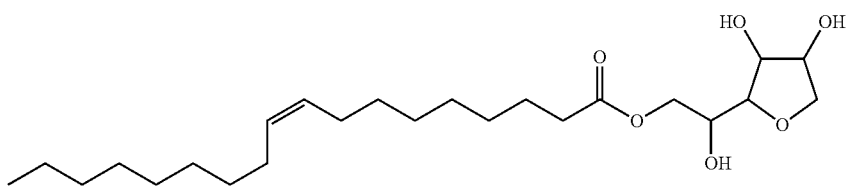
(6-1-28-1)

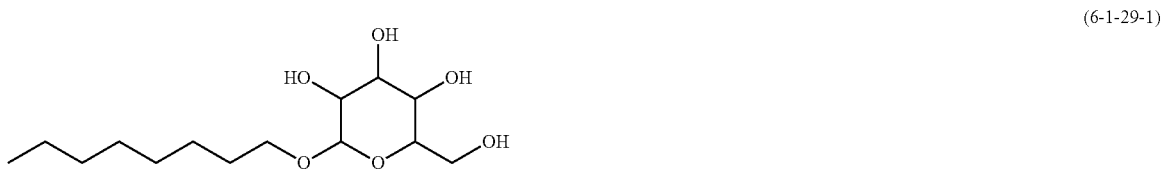
(6-1-29-1)

Fifth, desirable component compounds will be shown. Desirable compound (1) is compound (1-1) to compound (1-12) according to item 3. It is desirable that in these compounds, at least one of the first additive should be compound (1-7), compound (1-8), compound (1-9) or compound (1-10). It is desirable that at least two of the first additive should be a combination of compound (1-8) and compound (1-9) or compound (1-2) and compound (1-7).

Desirable compound (2) is compound (2-1) to compound (2-46) according to item 6. It is desirable that in these compounds, at least one of the first component is compound (2-1), compound (2-7), compound (2-11), compound (2-12), compound (2-22), compound (2-23), compound (2-24) or compound (2-36).

Desirable compound (3) is compound (3-1) to compound (3-13) according to item 9. It is desirable that in these compounds, at least one of the second component should be compound (3-1), compound (3-3), compound (3-5), compound (3-6), compound (3-7), compound (3-8), compound (3-9) or compound (3-13). It is desirable that at least two of the second component should be a combination of compound (3-1) and compound (3-3), compound (3-1) and compound (3-5) or compound (3-1) and compound (3-6).

Desirable compound (4) is compound (4-1) to compound (4-21) according to item 12. It is desirable that in these compounds, at least one of the third component should be compound (4-1), compound (4-4), compound (4-5), compound (4-7), compound (4-10) or compound (4-15). It is desirable that at least two of the third component should be a combination of compound (4-1) and compound (4-7), compound (4-1) and compound (4-15), compound (4-4) and compound (4-7), compound (4-4) and compound (4-15), compound (4-5) and compound (4-7) or compound (4-5) and compound (4-10).

Desirable compound (5) is compound (5-1) according to item 16. More desirable compound (5) is compound (5-1-1) to compound (5-1-4) according to item 19. Desirable compound (6) is compound (6-1) according to item 17. More desirable compound (6) is compound (6-1-1) to compound (6-1-29) according to item 20. Compound (5) is generally preferable to compound (6).

Sixth, additives that may be added to the composition will be explained. Such additives include an optically active compound, an antioxidant, an ultraviolet light absorber, a coloring matter, an antifoaming agent, a polymerizable compound, a polymerization initiator, a polymerization inhibitor and a polar compound. The optically active compound is added to the composition for the purpose of inducing the helical structure of liquid crystal molecules and giving a twist angle. Examples of such compounds include compound (7-1) to compound (7-5). A desirable ratio of the optically active compound is approximately 5% by weight or less, and a more desirable ratio is in the range of approximately 0.01% by weight to approximately 2% by weight.

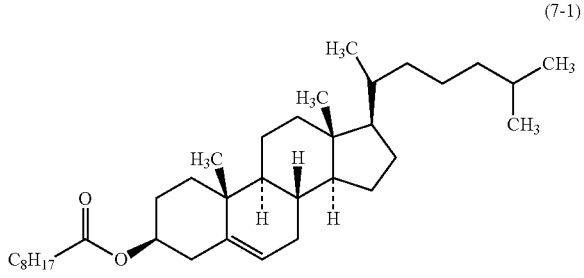
(7-1)

(7-2)

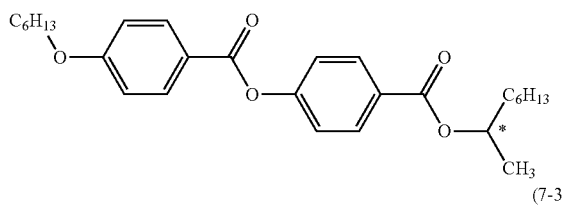

(7-3)

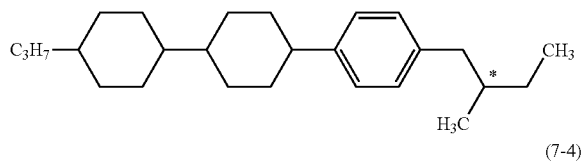

(7-4)

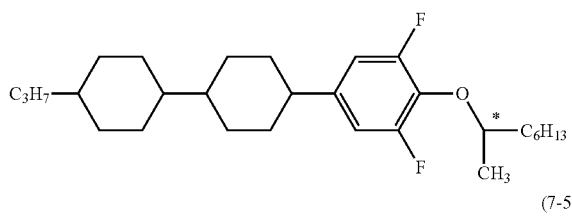

(7-5)

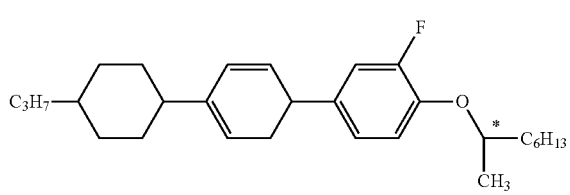

The antioxidant is added to the composition in order to prevent a decrease in specific resistance that is caused by heating under air, or to maintain a large voltage holding ratio at a temperature close to the maximum temperature as well as at room temperature, after the device has been used for a long time. A desirable example of the antioxidant is compound (8) where n is an integer from 1 to 9, for instance.

(8)

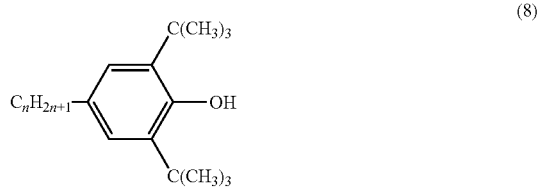

In compound (8), desirable n is 1, 3, 5, 7 or 9. More desirable n is 7. Compound (8) where n is 7 is effective in maintaining a large voltage holding ratio at a temperature close to the maximum temperature as well as at room temperature, after the device has been used for a long time, since it has a small volatility. A desirable ratio of the antioxidant is approximately 50 ppm or more for achieving its effect and is approximately 600 ppm or less for avoiding a decrease in the maximum temperature or avoiding an increase in the minimum temperature. A more desirable ratio is in the range of approximately 100 ppm to approximately 300 ppm.

Desirable examples of the ultraviolet light absorber include benzophenone derivatives, benzoate derivatives and triazole derivatives. A light stabilizer such as an amine having steric hindrance is also desirable. A desirable ratio of the ultraviolet light absorber or the light stabilizer is approximately 50 ppm or more for achieving its effect and is approximately 10,000 ppm or less for avoiding a decrease in the maximum temperature or avoiding an increase in the minimum temperature. A more desirable ratio is in the range of approximately 100 ppm to approximately 10,000 ppm.

A dichroic dye such as an azo dye or an anthraquinone dye is added to the composition for adjusting to a device having a guest host (GH) mode. A desirable ratio of the coloring matter is in the range of approximately 0.01% by weight to approximately 10% by weight. The antifoaming agent such as dimethyl silicone oil or methyl phenyl silicone oil is added to the composition for preventing foam formation. A desirable ratio of the antifoaming agent is approximately 1 ppm or more for achieving its effect and is approximately 1,000 ppm or less for preventing a poor display. A more desirable ratio is in the range of approximately 1 ppm to approximately 500 ppm.

The polymerizable compound is used for adjusting to a device with a polymer sustained alignment (PSA) type. Compound (1) is suitable for this purpose. Any other polymerizable compound that is different from compound (1) may be added to the composition, together with compound (1). Desirable examples of any other polymerizable compound include compounds such as acrylates, methacrylates, vinyl compounds, vinyloxy compounds, propenyl ethers, epoxy compounds (oxiranes, oxetanes) and vinyl ketones. More desirable examples are acrylate derivatives or methacrylate derivatives. A desirable ratio of compound (1) is approximately 10% by weight or more based on the total weight of the polymerizable compound. A more desirable ratio is approximately 50% by weight or more. An especially desirable ratio is approximately 80% by weight or more. An especially desirable ratio is also 100% by weight. The reactivity of the polymerizable compound or the pretilt angle of liquid crystal molecules can be adjusted by changing the type of compound (1) or by combining compound (1) with any other polymerizable compound in a suitable ratio. A short response time of the device can be achieved by optimizing the pretilt angle. A large contrast ratio or a long service life can be achieved, since the alignment of liquid crystal molecules is stabilized.

A polymerizable compound such as compound (1) is polymerized on irradiation with ultraviolet light. It may be polymerized in the presence of an initiator such as a photopolymerization initiator. Suitable conditions for polymerization, and a suitable type and amount of the initiator are known to a person skilled in the art, and are described in the literature. For example, Irgacure 651 (registered trademark; BASF), Irgacure 184 (registered trademark; BASF) or Darocur 1173 (registered trademark; BASF), each of which is a photopolymerization initiator, is suitable for radical polymerization. A desirable ratio of the photopolymerization initiator is in the range of approximately 0.1% by weight to approximately 5% by weight based on the total weight of the polymerizable compound. A more desirable ratio is in the range of approximately 1% by weight to approximately 3% by weight.

The polymerization inhibitor may be added in order to prevent the polymerization when a polymerizable compound such as compound (1) is kept in storage. The polymerizable compound is usually added to the composition without removing the polymerization inhibitor. Examples of the polymerization inhibitor include hydroquinone derivatives such as hydroquinone and methylhydroquinone, 4-t-butylcatechol, 4-methoxyphenol and phenothiazine.

Seventh, methods for synthesizing the component compounds will be explained. These compounds can be synthesized by known methods. The synthetic methods will be exemplified. Compound (1-2) is prepared by the method described in JP H07-101900 A (1995). Compound (2-2) and compound (2-7) is prepared by the method described in JP H02-233626 A (1990). Compound (3-5) is prepared by the method described in JP S57-165328 A (1982). Compound (4-1) and compound (4-7) is prepared by the method described in JP H02-503441 A (1990). Compound (5-1) is prepared by the method described in WO 2012-038026 A. A part of compound (6) is commercially available. A compound of formula (8) where n is 1 is available from Sigma-Aldrich Corporation. Compound (8) where n is 7, for instance, is synthesized according to the method described in U.S. Pat. No. 3,660,505.

Compounds whose synthetic methods are not described can be prepared according to the methods described in books such as "Organic Syntheses" (John Wiley & Sons, Inc.), "Organic Reactions" (John Wiley & Sons, Inc.), "Comprehensive Organic Synthesis" (Pergamon Press), and "Shin-Jikken Kagaku Kouza" (New experimental Chemistry Course, in English; Maruzen Co., Ltd., Japan). The composition is prepared according to known methods using the compounds thus obtained. For example, the component compounds are mixed and dissolved in each other by heating.

Last, the use of the composition will be explained. Most compositions have a minimum temperature of approximately −10° C. or lower, a maximum temperature of approximately 70° C. or higher, and an optical anisotropy in the range of approximately 0.07 to approximately 0.20. A composition having an optical anisotropy in the range of approximately 0.08 to approximately 0.25 may be prepared by adjusting the ratio of the component compounds or by mixing with any other liquid crystal compound. Furthermore, a composition having an optical anisotropy in the range of approximately 0.10 to approximately 0.30 may be prepared by trial and error. A device including this composition has a large voltage holding ratio. This composition is suitable for an AM device. This composition is suitable especially for an AM device having a transmission type. This composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, FFS, VA and FPA. It is especially desirable to use the composition for the AM device having a mode of TN, OCB, IPS or FFS. In the AM device having the IPS or FFS mode, the alignment of liquid crystal molecules may be parallel or perpendicular to the glass substrate, when no voltage is applied. These devices may be of a reflection type, a transmission type or a semi-transmission type. It is desirable to use the composition for a device having the transmission type. The composition can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a three-dimensional network-polymer is formed in the composition.

One example of methods for producing a conventional device with a polymer sustained alignment type is as follows: A device having two substrates, called an array substrate and a color filter substrate, is assembled. The substrates have an alignment film. At least one of the substrates has an electrode layer. Liquid crystal compounds are mixed to give a liquid crystal composition. A polymerizable compound is added to this composition. An additive may be further added as required. The composition is poured into the device. The device is irradiated with light while a voltage is applied to it. Ultraviolet light is desirable. The polymerizable compound is polymerized by irradiation with light. A composition including a polymer is formed by the polymerization. The device with polymer sustained alignment type can be produced by this procedure.

In the procedure, liquid crystal molecules are aligned by the effect of the alignment film and an electric field when a voltage is applied. The molecules of the polymerizable compound are also aligned according to the alignment. A polymer where the alignment is maintained is formed, since the polymerizable compound is polymerized by ultraviolet light under these conditions. The response time of the device is decreased by the effect of the polymer. Image burn-in can also be improved at the same time by the effect of the polymer, since the burn-in is a malfunction of liquid crystal molecules. Incidentally, it may be possible that the polymerizable compound in the composition is polymerized in advance and then this composition is placed between the substrates of a liquid crystal display device.

One example of methods for producing device having no alignment films is as follows: A device having two substrates, called an array substrate and a color filter substrate, is prepared. The substrates have no alignment films. At least one of the substrates has an electrode layer. Liquid crystal compounds are mixed to give a liquid crystal composition. A polymerizable compound and a polar compound are added to this composition. An additive may be further added as required. The composition is poured into the device. The device is irradiated with light under the conditions of an applied voltage. Ultraviolet light is preferable. The polymerizable compound is polymerized by irradiation with light. A layer of the composition including the polymer and the polar compound is formed on the substrate.

In the procedure, the polar compound is arranged on the substrate, since the polar group interacts with the surface of the substrate. The liquid crystal molecules are aligned according to the arrangement. The alignment of liquid crystal molecules is further promoted when a voltage is applied, and the polymerizable compound is also aligned in accordance with this alignment. A polymer where the alignment is maintained is formed, since the polymerizable compound is polymerized by ultraviolet light under these conditions. The alignment of liquid crystal molecules is additionally stabilized by the effect of the polymer, and the response time of the device is decreased. Image burn-in can also be improved at the same time by the effect of the polymer, since the burn-in is a malfunction of liquid crystal molecules.

EXAMPLES

The invention will be explained in more detail by way of examples. The invention is not limited to the examples. The invention includes a mixture of composition (M1) and composition (M2). The invention also includes a mixture prepared by mixing at least two compositions in Examples. Compounds prepared herein were identified by methods such as NMR analysis. The characteristics of the compounds, compositions and devices were measured by the methods described below.

NMR Analysis: A model DRX-500 apparatus made by Bruker BioSpin Corporation was used for measurement. In the measurement of $^1$H-NMR, a sample was dissolved in a deuterated solvent such as $CDCl_3$, and the measurement was carried out under the conditions of room temperature, 500 MHz and the accumulation of 16 scans. Tetramethylsilane was used as an internal standard. In the measurement of $^{19}$F-NMR, $CFCl_3$ was used as the internal standard, and 24 scans were accumulated. In the explanation of the nuclear magnetic resonance spectra, the symbols s, d, t, q, quin, sex, m and br stand for a singlet, a doublet, a triplet, a quartet, a quintet, a sextet, a multiplet and line-broadening, respectively.

Gas Chromatographic Analysis: A gas chromatograph Model GC-14B made by Shimadzu Corporation was used for measurement. The carrier gas was helium (2 milliliters per minute). The sample injector and the detector (FID) were set to 280° C. and 300° C., respectively. A capillary column DB-1 (length 30 meters, bore 0.32 millimeter, film thickness 0.25 micrometers, dimethylpolysiloxane as the stationary phase, non-polar) made by Agilent Technologies, Inc. was used for the separation of component compounds. After the column had been kept at 200° C. for 2 minutes, it was further heated to 280° C. at the rate of 5° C. per minute. A sample was dissolved in acetone (0.1% by weight), and 1 microliter of the solution was injected into the sample injector. A recorder used was Model C-R5A Chromatopac Integrator made by Shimadzu Corporation or its equivalent. The resulting gas chromatogram showed the retention time of peaks and the peak areas corresponding to the component compounds.

Solvents for diluting the sample may also be chloroform, hexane and so forth. The following capillary columns may also be used in order to separate the component compounds: HP-1 made by Agilent Technologies Inc. (length 30 meters, bore 0.32 millimeter, film thickness 0.25 micrometers), Rtx-1 made by Restek Corporation (length 30 meters, bore 0.32 millimeter, film thickness 0.25 micrometers), and BP-1 made by SGE International Pty. Ltd. (length 30 meters, bore 0.32 millimeter, film thickness 0.25 micrometers). A capillary column CBP1-M50-025 (length 50 meters, bore 0.25 millimeter, film thickness 0.25 micrometers) made by Shimadzu Corporation may also be used for the purpose of avoiding an overlap of peaks of the compounds.

The ratio of the liquid crystal compounds included in the composition may be calculated according to the following method. A mixture of the liquid crystal compounds was analyzed by gas chromatography (FID). The ratio of peak areas in the gas chromatogram corresponds to the ratio of the liquid crystal compounds. When the capillary columns described above are used, the correction coefficient of respective liquid crystal compounds may be regarded as 1 (one). Accordingly, the ratio (percentage by weight) of the liquid crystal compounds can be calculated from the ratio of peak areas.

Samples for measurement: A composition itself was used as a sample when the characteristics of the composition or the device were measured. When the characteristics of a compound were measured, a sample for measurement was prepared by mixing this compound (15% by weight) with mother liquid crystals (85% by weight). The characteristic values of the compound were calculated from the values obtained from measurements by an extrapolation method: (Extrapolated value)=(Measured value of sample)−0.85×(Measured value of mother liquid crystals)/0.15. When a smectic phase (or crystals) deposited at 25° C. at this ratio, the ratio of the compound to the mother liquid crystals was changed in the order of (10% by weight: 90% by weight), (5% by weight: 95% by weight) and (1% by weight: 99% by weight). The values of the maximum temperature, the optical anisotropy, the viscosity and the dielectric anisotropy regarding the compound were obtained by means of this extrapolation method.

The mother liquid crystals described below were used. The ratio of the component compounds were expressed as a percentage by weight.

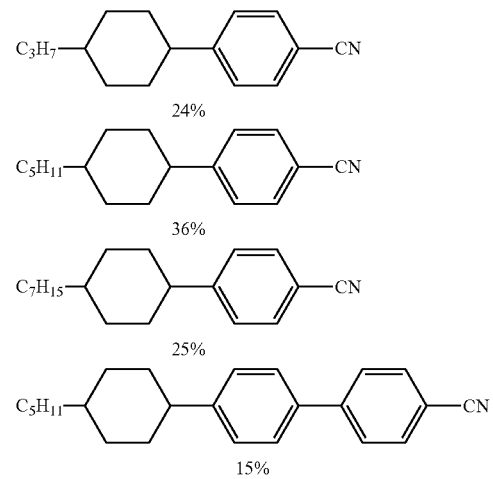

Measurement methods: The characteristics of compounds were measured according to the following methods. Most are methods described in the JEITA standards (JEITA-ED-2521B) which was deliberated and established by Japan Electronics and Information Technology Industries Association (abbreviated to JEITA), or the modified methods. No thin film transistors (TFT) were attached to a TN device used for measurement.

(1) Maximum Temperature of a Nematic Phase (NI; ° C.): A sample was placed on a hot plate in a melting point apparatus equipped with a polarizing microscope and was heated at the rate of 1° C. per minute. The temperature was measured when a part of the sample began to change from a nematic phase to an isotropic liquid. The upper limit of the temperature range of a nematic phase is sometimes abbreviated to the "maximum temperature."

(2) Minimum Temperature of a Nematic Phase (Tc; ° C.): A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., Tc was expressed as <−20° C. A lower limit of the temperature range of a nematic phase is sometimes abbreviated to "the minimum temperature."

(3) Viscosity (bulk viscosity; η; measured at 20° C.; mPa·s): An E-type viscometer made by Tokyo Keiki Inc. was used for measurement.

(4) Viscosity (rotational viscosity; γ1; measured at 25° C.; mPa·s): The measurement was carried out according to the method described in M. Imai, et al., Molecular Crystals and Liquid Crystals, Vol. 259, 37 (1995). A sample was poured into a TN device in which the twist angle was 0 degrees and the distance between the two glass substrates (cell gap) was 5 micrometers. A voltage was applied to this device and increased stepwise with an increment of 0.5 volt in the range of 16 to 19.5 volts. After a period of 0.2 seconds with no voltage, a voltage was applied repeatedly under the conditions of a single rectangular wave alone (rectangular pulse; 0.2 seconds) and of no voltage (2 seconds). The peak current and the peak time of the transient current generated by the applied voltage were measured. The value of rotational viscosity was obtained from these measured values and the calculating equation (8) on page 40 of the paper presented by M. Imai, et al. The value of dielectric anisotropy necessary for this calculation was measured by the method described in measurement (6).

(5) Optical anisotropy (refractive index anisotropy; $\Delta n$; measured at 25° C.): The measurement was carried out using an Abbe refractometer with a polarizing plate attached to the ocular, using light at a wavelength of 589 nanometers. The surface of the main prism was rubbed in one direction, and then a sample was placed on the main prism. The refractive index ($n\|$) was measured when the direction of the polarized light was parallel to that of rubbing. The refractive index ($n\perp$) was measured when the direction of polarized light was perpendicular to that of rubbing. The value of the optical anisotropy ($\Delta n$) was calculated from the equation: $\Delta n = n\| - n\perp$.

(6) Dielectric anisotropy ($\Delta\varepsilon$; measured at 25° C.): A sample was poured into a TN device in which the distance between the two glass substrates (cell gap) was 9 micrometers and the twist angle was 80 degrees. Sine waves (10 V, 1 kHz) were applied to this device, and the dielectric constant ($\varepsilon\|$) in the major axis direction of liquid crystal molecules was measured after 2 seconds. Sine waves (0.5 V, 1 kHz) were applied to this device and the dielectric constant ($\varepsilon\perp$) in the minor axis direction of the liquid crystal molecules was measured after 2 seconds. The value of dielectric anisotropy was calculated from the equation: $\Delta\varepsilon = \varepsilon\| - \varepsilon\perp$.

(7) Threshold voltage (Vth; measured at 25° C.; V): An LCD evaluation system Model LCD-5100 made by Otsuka Electronics Co., Ltd. was used for measurement. The light source was a halogen lamp. A sample was poured into a TN device having a normally white mode, in which the distance between the two glass substrates (cell gap) was $4.45/\Delta n$ (micrometers) and the twist angle was 80 degrees. A voltage to be applied to this device (32 Hz, rectangular waves) was stepwise increased in 0.02 V increments from 0 V up to 10 V. During the increase, the device was vertically irradiated with light, and the amount of light passing through the device was measured. A voltage-transmittance curve was prepared, in which the maximum amount of light corresponded to 100% transmittance and the minimum amount of light corresponded to 0% transmittance. The threshold voltage was expressed as voltage at 90% transmittance.

(8) Voltage Holding Ratio (VHR-1; measured at 25° C.; %): A TN device used for measurement had a polyimide-alignment film, and the distance between the two glass substrates (cell gap) was 5 micrometers. A sample was poured into the device, and then this device was sealed with a UV-curable adhesive. A pulse voltage (60 microseconds at 5 V) was applied to this device and the device was charged. A decreasing voltage was measured for 16.7 milliseconds with a high-speed voltmeter, and area A between the voltage curve and the horizontal axis in a unit cycle was obtained. Area B was an area without the decrease. The voltage holding ratio was expressed as a percentage of area A to area B.

(9) Voltage Holding Ratio (VHR-2; measured at 80° C.; %): The voltage holding ratio was measured by the method described above, except that it was measured at 80° C. instead of 25° C. The resulting values were represented by the symbol VHR-2.

(10) Voltage Holding Ratio (VHR-3; measured at 25° C.; %): The stability to ultraviolet light was evaluated by measuring a voltage holding ratio after irradiation with ultraviolet light. A TN device used for measurement had a polyimide-alignment film and the cell gap was 5 micrometers. A sample was poured into this device, and then the device was irradiated with light for 20 minutes. The light source was an ultra-high-pressure mercury lamp USH-500D (produced by Ushio, Inc.), and the distance between the device and the light source was 20 centimeters. In the measurement of VHR-3, a decreasing voltage was measured for 16.7 milliseconds. A composition having a large VHR-3 has a high stability to ultraviolet light. The value of VHR-3 is preferably 90% or more, and more preferably 95% or more.

(11) Voltage Holding Ratio (VHR-4; measured at 25° C.; %): A TN device into which a sample was poured was heated in a constant-temperature bath at 80° C. for 500 hours, and then the stability to heat was evaluated by measuring the voltage holding ratio. In the measurement of VHR-4, a decreasing voltage was measured for 16.7 milliseconds. A composition having a large VHR-4 has a high stability to heat.

(12) Response Time ($\tau$; measured at 25° C.; millisecond): An LCD evaluation system Model LCD-5100 made by Otsuka Electronics Co., Ltd. was used for measurement. The light source was a halogen lamp. The low-pass filter was set at 5 kHz. A sample was poured into a FFS device having no alignment films, in which the distance between the two glass substrates (cell gap) was 3.5 micrometers. This device was sealed with a UV-curable adhesive. The device was irradiated with ultraviolet light (28 J) of 78 mW/cm$^2$ (405 nanometers) for 359 seconds, while a voltage of 30 V was applied. A multi-metal lamp for UV curing M04-L41 made by Eye Graphics Co., Ltd. was used for irradiation with ultraviolet light. Rectangular waves (120 Hz) were applied to this device. The device was vertically irradiated with light simultaneously, and the amount of light passing through the device was measured. The transmittance was regarded as 100% when the amount of light reached a maximum. The transmittance was regarded as 0% when the amount of light reached a minimum. The maximum voltage of the rectangular waves was adjusted in order that the transmittance was 90%. The minimum voltage of the rectangular waves was adjusted to 2.5 V where the transmittance was 0%. The response time was expressed as the time (fall time; millisecond) for change from 90% transmittance to 10% transmittance.

(13) Elastic constants (K; measured at 25° C.; pN): A LCR meter Model HP 4284-A made by Yokokawa Hewlett-Packard, Ltd. was used for measurement. A sample was poured into a homogeneous device in which the distance between the two glass substrates (cell gap) was 20 micrometers. An electric charge of 0 volts to 20 volts was applied to this device, and the electrostatic capacity and the applied voltage were measured. The measured values of the electric capacity (C) and the applied voltage (V) were fitted to equation (2.98) and equation (2.101) on page 75 of "Ekisho Debaisu Handobukku" (Liquid Crystal Device Handbook, in English; The Nikkan Kogyo Shimbun, Ltd., Japan) and the values of K11 and K33 were obtained from equation (2.99). Next, the value of K22 was calculated from equation (3.18)

on page 171 of the book and the values of K11 and K33 thus obtained. The elastic constant K was expressed as an average of K11, K22 and K33.

(14) Specific Resistance (p; measured at 25° C.; Ω cm): A sample of 1.0 milliliter was poured into a vessel equipped with electrodes. A DC voltage (10 V) was applied to the vessel, and the DC current was measured after 10 seconds. The specific resistance was calculated from the following equation: (specific resistance)=[(voltage)×(electric capacity of vessel)]/[(DC current)×(dielectric constant in vacuum)].

(15) Pretilt Angle (degree): A spectroscopic ellipsometer, Model M-2000U (made by J. A. Woollam Co., Inc.) was used for measurement of a pretilt angle.

(16) Alignment stability (Stability of liquid crystal alignment axis): In the liquid crystal display device, the change of a liquid crystal alignment axis in the side of the electrode was evaluated. A liquid crystal alignment angle [φ (before)] before stressed in the side of the electrode was measured, and rectangular waves (4.5 V, 60 Hz) were applied to the device for 20 minutes, and no voltages for 1 second, and then a liquid crystal alignment angle [φ (after)] in the side of the electrode was measured after 1 second and 5 minutes. The change (Δφ, deg.) of the liquid crystal alignment angle after 1 second and 5 minutes was calculated from these values by the following equation:

Δφ(deg.)=φ(after)−φ(before)

These measurements were carried out by referring J. Hilfiker, B. Johs, C. Herzinger, J. F. Elman, E. Montbach, D. Bryant, and P. J. Bos, Thin Solid Films, 455-456, (2004) 596-600. The smaller value of Δφ means a smaller change ratio of the liquid crystal alignment axis, which means that the stability of liquid crystal alignment axis is better.

Examples of compositions will be shown below. Component compounds described in Examples were expressed in terms of symbols according to the definition in Table 3 described below. In Table 3, the configuration of 1,4-cyclohexylene is trans. In Examples, a parenthesized number next to a symbolized compound represents the chemical formula to which the compound belongs. The symbol (—) means any other liquid crystal compound. The ratio (percentage) of a liquid crystal compound means the percentages by weight (% by weight) based on the weight of the liquid crystal composition. Last, the values of characteristics of the composition are summarized.

TABLE 3

Method of Description of Compounds using Symbols
R—($A_1$)—$Z_1$ ... —$Z_n$—($A_n$)—R'

| 1) Left-terminal Group R— | Symbol |
|---|---|
| $C_nH_{2n+1}$— | n- |
| $C_nH_{2n+1}$O— | nO— |
| $C_nH_{2m+1}OC_nH_{2n}$— | mOn- |
| $CH_2$=CH— | V— |
| $C_nH_{2n+1}$—CH=CH— | nV— |
| $CH_2$=CH—$C_nH_{2n}$— | Vn- |
| $C_mH_{2m+1}$—CH=CH—$C_nH_{2n}$— | mVn- |
| $CF_2$=CH— | VFF— |
| $CF_2$=CH—$C_nH_{2n}$— | VFFn- |
| F—$C_nH_{2n}$— | Fn- |
| 2) Right-terminal Group —R' | Symbol |
| —$C_nH_{2n+1}$ | -n |
| —O$C_nH_{2n+1}$ | —On |
| —CH=$CH_2$ | —V |
| —CH=CH—$C_nH_{2n+1}$ | —Vn |
| —$C_nH_{2n}$—CH=$CH_2$ | -nV |
| —$C_nH_{2n}$—CH=CH—$C_mH_{2m+1}$ | -nVm |

TABLE 3-continued

Method of Description of Compounds using Symbols
R—($A_1$)—$Z_1$ ... —$Z_n$—($A_n$)—R'

| | |
|---|---|
| —CH=$CF_2$ | —VFF |
| —COO$CH_3$ | -EMe |
| —F | —F |
| —Cl | —CL |
| —$OCF_3$ | —OCF3 |
| —$CF_3$ | —CF3 |
| —CN | —C |
| 3) Bonding Group —$Z_n$— | Symbol |
| —$C_2H_4$— | 2 |
| —COO— | E |
| —CH=CH— | V |
| —C≡C— | T |
| —$CF_2$O— | X |
| —$CH_2$O— | 10 |
| 4) Ring —$A_n$— | Symbol |

| Ring | Symbol |
|---|---|
| cyclohexylene | H |
| tetrahydropyran (O top) | Dh |
| tetrahydropyran (O side) | dh |
| phenylene | B |
| fluorophenylene | B(F) |
| 2-fluorophenylene | B(2F) |
| difluorophenylene (F,F) | B(F,F) |
| difluorophenylene (2F,5F) | B(2F,5F) |
| dioxane | G |

TABLE 3-continued

Method of Description of Compounds using Symbols
R—(A₁)—Z₁ ... —Zₙ—(Aₙ)—R'

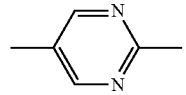 Py

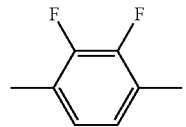 B(2F,3F)

5) Examples of Description

Example 1. V—HHB-1

Example 2. 3-BB(F)B(F,F)—F

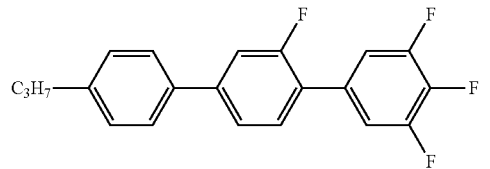

Example 3. 3-HGB(F,F)—F

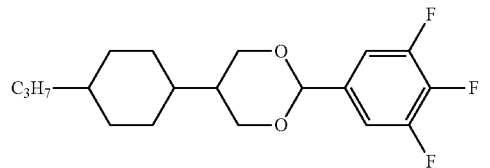

Example 4. 3-HHEBH-5

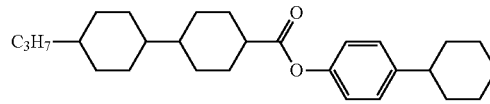

Examples of the Device
1. Starting Materials

A device having no alignment films was produced, and the homeotropic alignment of liquid crystal molecules and the conversion of a polymerizable compound were studied. First, starting materials will be explained. The starting materials were liquid crystal compositions (M1) to (M10), polymerizable compounds (RM-1) to (RM-8) and polar compounds (PC-1) to (PC-33) will be listed in this order.

| Composition M1 | | |
|---|---|---|
| 3-HHB(F,F)-F | (2-12) | 10% |
| 3-HBB(F,F)-F | (2-24) | 40% |
| 2-HHBB(F,F)-F | (2-42) | 2% |
| 3-HHBB(F,F)-F | (2-42) | 5% |
| 4-HHBB(F,F)-F | (2-42) | 4% |
| V-HH-3 | (3-1) | 25% |
| V-HHB-1 | (3-5) | 8% |
| 2-BB(F)B-3 | (3-8) | 6% |

NI = 78.9° C.; Tc <−20° C.; Δn = 0.105; Δε = 5.7; Vth = 1.62 V; η = 15.5 mPa · s.

| Composition M2 | | |
|---|---|---|
| 5-H2B(F)-F | (2-4) | 7% |
| 3-HHB-OCF3 | (2-8) | 10% |
| 3-HHEB-F | (2-17) | 7% |
| 5-HHEB-F | (2-17) | 5% |
| 2-HBEB(F,F)-F | (2-30) | 3% |
| 3-HBEB(F,F)-F | (2-30) | 3% |
| 3-BB(F,F)B(F)-OCF3 | (2-34) | 8% |
| 3-BBB(F,F)-F | (2-35) | 3% |
| 3-BB2B(F,F)-F | (2-39) | 3% |
| V-HH-3 | (3-1) | 31% |
| 1V-HH-4 | (3-1) | 6% |
| V-HHB-1 | (3-5) | 3% |
| 5-HBBH-3 | (3-11) | 6% |
| 5-HB(F)BH-3 | (3-12) | 5% |

NI = 90.5° C.; Tc <−20° C.; Δn = 0.093; Δε = 4.3; Vth = 2.07 V; η = 12.2 mPa · s.

| Composition M3 | | |
|---|---|---|
| 3-HB-CL | (2-1) | 10% |
| 3-HHB-CL | (2-7) | 4% |
| 3-HHB(F)-F | (2-11) | 7% |
| 3-HBB(F,F)-F | (2-24) | 25% |
| 3-HHEBB-F | (2-40) | 3% |
| 3-HH2BB(F,F)-F | (2-44) | 6% |
| 4-HH2BB(F,F)-F | (2-44) | 4% |
| 3-HH-O1 | (3-1) | 15% |
| 1V-HH-3 | (3-1) | 18% |
| 3-HBB-2 | (3-6) | 3% |
| 1-BB(F)B-2V | (3-8) | 5% |

NI = 84.2° C.; Tc <−20° C.; Δn = 0.104; Δε = 4.2; Vth = 1.94 V; η = 15.9 mPa · s.

| Composition M4 | | |
|---|---|---|
| 3-HHB(F,F)-F | (2-12) | 10% |
| 4-HHB(F,F)-F | (2-12) | 6% |
| 5-HHB(F,F)-F | (2-12) | 6% |
| 3-HBB(F,F)-F | (2-24) | 30% |
| 2-HHBB(F,F)-F | (2-42) | 3% |
| 3-HHBB(F,F)-F | (2-42) | 4% |
| 4-HHBB(F,F)-F | (2-42) | 2% |
| 3-HH-V | (3-1) | 25% |
| 1V2-HH-3 | (3-1) | 6% |
| V2-HHB-1 | (3-5) | 4% |
| 3-HHEBH-3 | (3-9) | 4% |

NI = 93.1° C.; Tc <−20° C.; Δn = 0.091; Δε = 5.3; Vth = 1.83 V; η = 14.0 mPa · s.

| Composition M5 | | |
|---|---|---|
| 3-HHB(F)-OCF3 | (2-10) | 7% |
| 3-HBB(F,F)-F | (2-24) | 12% |
| 2-HB(F)B(F,F)-F | (2-25) | 4% |
| 3-HB(F)B(F,F)-F | (2-25) | 12% |
| 3-H2BB(F,F)-F | (2-27) | 5% |
| 3-HHB(F)B(F,F)-F | (2-43) | 4% |
| 5-HHB(F)B(F,F)-F | (2-43) | 3% |
| 3-HH-5 | (3-1) | 20% |
| 2-HH-3 | (3-1) | 4% |
| 3-HB-O2 | (3-2) | 6% |
| 3-HHEH-5 | (3-4) | 3% |
| VFF-HHB-1 | (3-5) | 10% |
| 3-HHB-1 | (3-5) | 5% |
| 1V-HBB-2 | (3-6) | 5% |

NI = 81.1° C.; Tc <−20° C.; Δn = 0.091; Δε = 5.6; Vth = 1.76 V; η = 12.0 mPa · s.

Composition M6

| | | |
|---|---|---|
| 1V2-BB-CL | (2) | 3% |
| 7-HB(F)-F | (2-2) | 5% |
| 7-HB(F,F)-F | (2-3) | 7% |
| 3-HHB(F,F)-F | (2-12) | 10% |
| 3-H2HB(F)-F | (2-13) | 6% |
| 5-H2HB(F)-F | (2-13) | 4% |
| 3-H2HB(F,F)-F | (2-14) | 6% |
| 4-H2HB(F,F)-F | (2-14) | 5% |
| 3-HH2B(F,F)-F | (2-16) | 12% |
| 3-HBB-F | (2-22) | 5% |
| V-HH-5 | (3-1) | 17% |
| V2-HH-2V | (3-1) | 8% |
| V2-BB(F)B-1 | (3-8) | 4% |
| 5-HBB(F)B-3 | (3-13) | 8% |

NI = 75.0° C.; Tc <−20° C.; Δn = 0.088; Δε = 4.5; Vth = 1.89 V; η = 14.0 mPa · s.

Composition M7

| | | |
|---|---|---|
| 3-HGB(F,F)-F | (2-19) | 3% |
| 3-H2GB(F,F)-F | (2-20) | 5% |
| 5-GHB(F,F)-F | (2-21) | 10% |
| 3-HBB(F,F)-F | (2-24) | 10% |
| 2-HHBB(F,F)-F | (2-42) | 3% |
| 3-HHBB(F,F)-F | (2-42) | 4% |
| 2-HH-3 | (3-1) | 20% |
| 3-HH-VFF | (3-1) | 9% |
| 1V-HH-3 | (3-1) | 7% |
| 1V2-BB-1 | (3-3) | 4% |
| V-HHB-1 | (3-5) | 7% |
| 1-BB(F)B-2V | (3-8) | 4% |
| 2-BB(F)B-2V | (3-8) | 6% |
| 3-HHEBH-5 | (3-9) | 4% |
| 1O1-HBBH-5 | (—) | 4% |

NI = 93.0° C.; Tc <−20° C.; Δn = 0.103; Δε = 5.4; Vth = 1.83 V; η = 12.7 mPa · s.

Composition M8

| | | |
|---|---|---|
| 5-HEB-F | (2-5) | 3% |
| 5-HEB(F,F)-F | (2-6) | 5% |
| 3-HHB-F | (2-9) | 5% |
| 2-HHEB(F,F)-F | (2-18) | 4% |
| 3-HHEB(F,F)-F | (2-18) | 7% |
| 3-HBB(F)-F | (2-23) | 9% |
| 5-HBB(F)-F | (2-23) | 6% |
| 5-HBEB-F | (2-29) | 4% |
| 2-BB(F)B(F,F)-F | (2-36) | 4% |
| 3-BB(F)B(F,F)-F | (2-36) | 10% |
| 3-HHBB(F)-F | (2-41) | 4% |
| 5-HHBB(F)-F | (2-41) | 4% |
| 3-HH-O1 | (3-1) | 3% |
| 3-HH-4 | (3-1) | 6% |
| 2-HH-5 | (3-1) | 6% |
| F3-HH-V | (3-1) | 20% |

NI = 77.7° C.; Tc <−20° C.; Δn = 0.097; Δε = 5.7; Vth = 1.68 V; η = 17.1 mPa · s.

Composition M9

| | | |
|---|---|---|
| 3-HHB(F,F)-F | (2-12) | 10% |
| 3-HH2B(F)-F | (2-15) | 8% |
| 3-H2BB(F)-F | (2-26) | 7% |
| 3-HB(F)EB-OCF3 | (2-28) | 8% |
| 3-HH2BB(F,F)-F | (2-44) | 5% |
| 4-HH2BB(F,F)-F | (2-44) | 3% |
| 1V2-HH-V | (3-1) | 6% |
| 1V-HH-V | (3-1) | 8% |
| 7-HB-1 | (3-2) | 3% |
| 1-BB-5 | (3-3) | 9% |
| V2-BB-1 | (3-3) | 4% |
| 1V2-BB-1 | (3-3) | 6% |

Composition M9 -continued

| | | |
|---|---|---|
| 3-HHB-O1 | (3-5) | 5% |
| V2-HHB-1 | (3-5) | 5% |
| 1-BB(F)B-2V | (3-8) | 6% |
| 2-BB(F)B-2V | (3-8) | 3% |
| 3-BB(F)B-2V | (3-8) | 4% |

NI = 90.9° C.; Tc <−20° C.; Δn = 0.131; Δε = 5.0; Vth = 1.84 V; η = 13.6 mPa · s.

Composition M10

| | | |
|---|---|---|
| 3-H2HB(F,F)-F | (2-14) | 6% |
| 3-HBB(F,F)-F | (2-24) | 18% |
| 3-BB(F,F)B-F | (2-33) | 4% |
| 3-BB(F)B(F,F)-F | (2-36) | 10% |
| 3-B2BB(F,F)-F | (2-38) | 5% |
| 3-HHB(F)B(F,F)-F | (2-43) | 4% |
| 3-HH2BB(F,F)-F | (2-44) | 4% |
| V-HH-3 | (3-1) | 25% |
| 1V-HH-3 | (3-1) | 5% |
| 7-HB-1 | (3-2) | 5% |
| V2-HHB-1 | (3-5) | 5% |
| 1-BB(F)B-2V | (3-8) | 5% |
| 5-HBB(F)B-3 | (3-13) | 4% |

NI = 80.2° C.; Tc <−20° C.; Δn = 0.118; Δε = 6.2; Vth = 1.53 V; η = 15.1 mPa · s.

Composition M11

| | | |
|---|---|---|
| 3-HHB-F | (2-9) | 3% |
| 3-GHB(F,F)-F | (2-21) | 4% |
| 3-HBB(F)-F | (2-23) | 3% |
| 3-GB(F)B(F)-F | (2-31) | 8% |
| 3-BB(F)B(F,F)-CF3 | (2-37) | 3% |
| 3-GB(F)B(F)B(F)-F | (2-45) | 2% |
| 4-GBB(F)B(F,F)-F | (2-46) | 3% |
| 3-HH-V | (3-1) | 30% |
| F3-HH-V | (3-1) | 8% |
| 3-HB-O2 | (3-2) | 5% |
| 1-BB-5 | (3-3) | 4% |
| V-HBB-2 | (3-6) | 6% |
| 1-BB(F)B-2V | (3-8) | 4% |
| 2-BB(F)B-2V | (3-8) | 6% |
| 3-BB(F)B-2V | (3-8) | 3% |
| 5-HBBH-3 | (3-11) | 3% |
| 3-dhBB(2F,3F)-O2 | (4-16) | 5% |

NI = 82.4° C.; Tc <−20° C.; Δn = 0.125; Δε = 2.7; Vth = 2.10 V; η = 17.1 mPa · s.

The following polymerizable compounds (RM-1) to (RM-8) were used as the first additive.

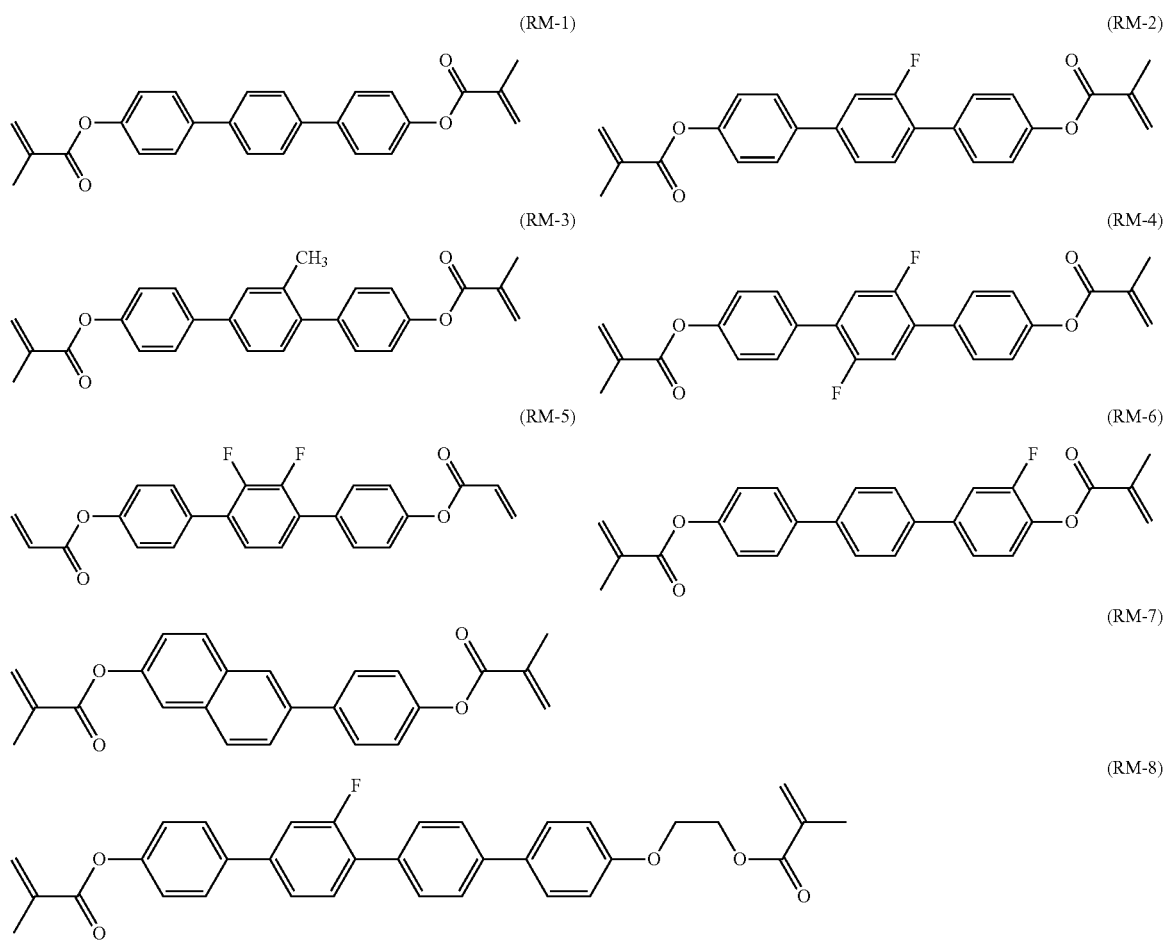
The following polar compounds (PC-1) to (PC-33) were used as the second additive.
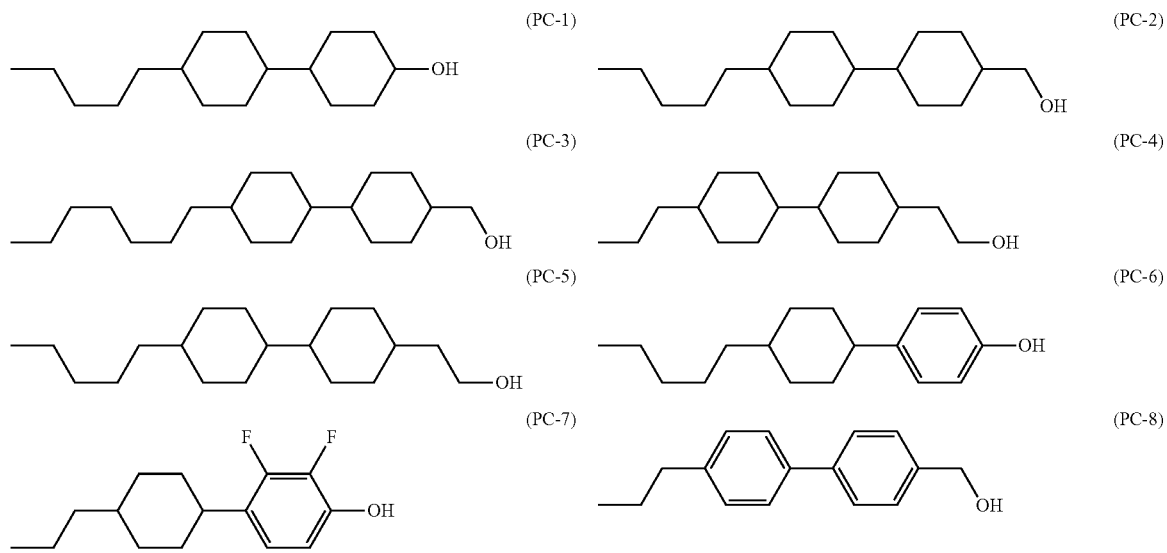

-continued
(PC-9)
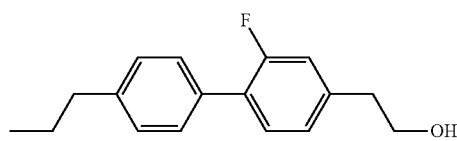
(PC-10)
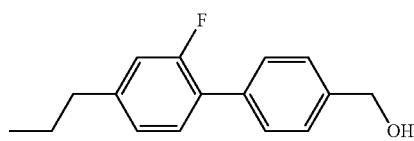
(PC-11)
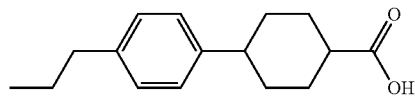
(PC-12)
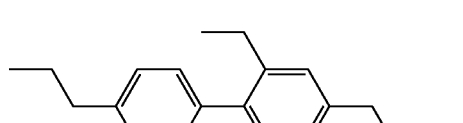
(PC-13)
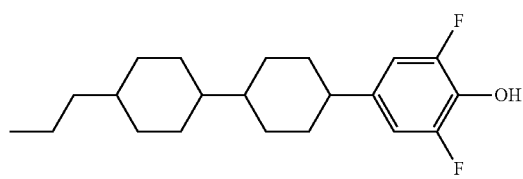
(PC-14)
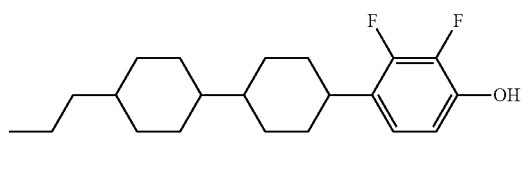
(PC-15)
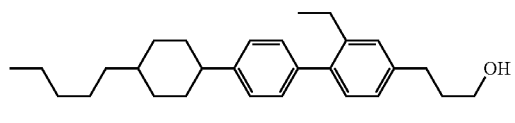
(PC-16)
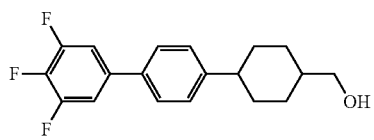
(PC-17)
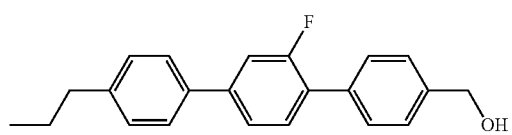
(PC-18)
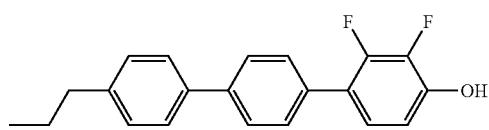
(PC-19)
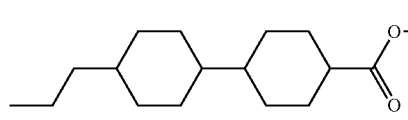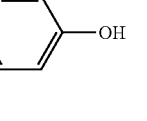
(PC-20)
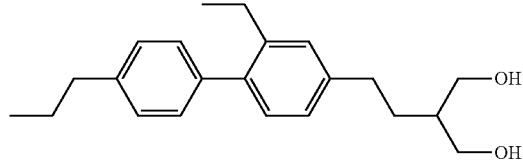
(PC-21)
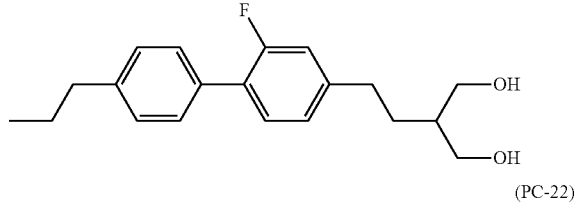
(PC-22)
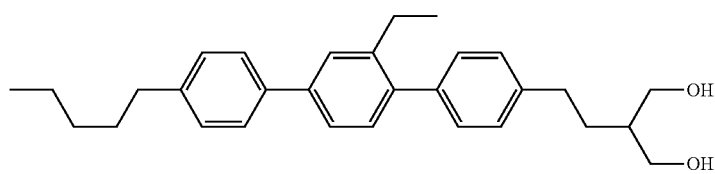
(PC-23)
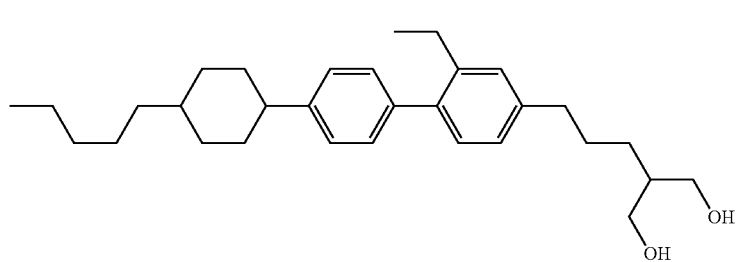

-continued

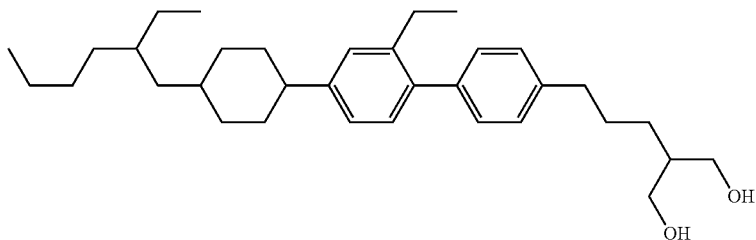
(PC-24)

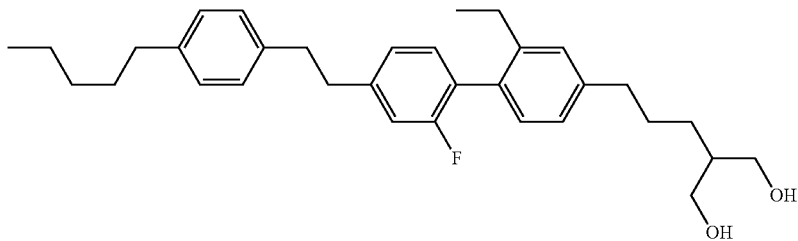
(PC-25)

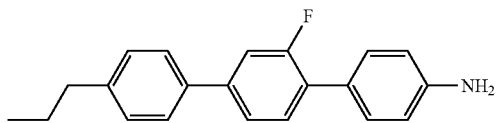
(PC-26)

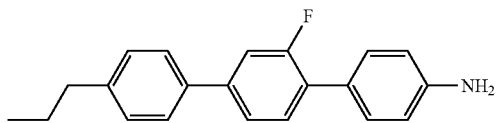
(PC-27)

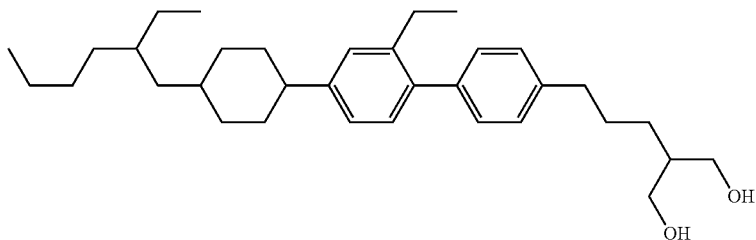
(PC-24)

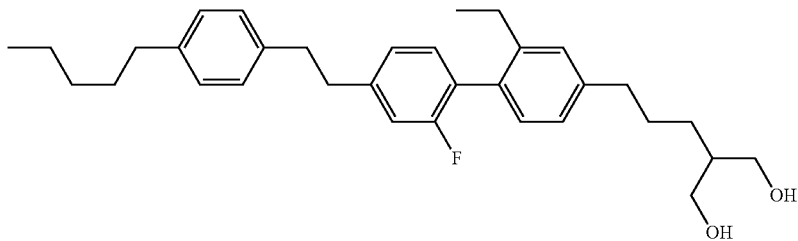
(PC-25)

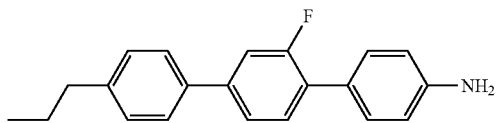
(PC-26)

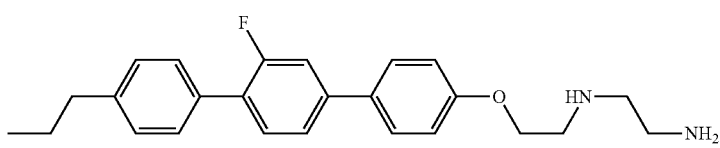
(PC-27)

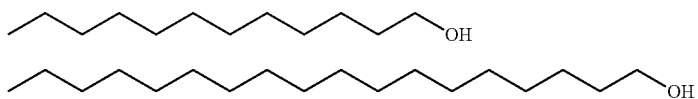
(PC-28)

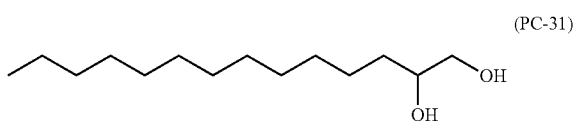
(PC-29)

(PC-30)

(PC-31)

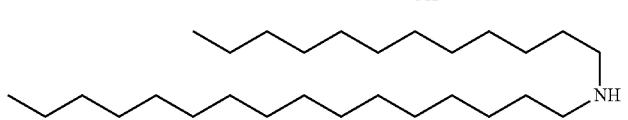
(PC-32)

(PC-33)

2. Homeotropic Alignment of Liquid Crystal Molecules

Run Number 1

Polymerizable compound (RM-1) and polar compound (PC-1) were added to composition (M1) in the ratios of 0.5% by weight and 5% by weight, respectively. The mixture was poured into a device having no alignment films, in which the distance between the two glass substrates (cell gap) was 4.0 micrometers, on a hot stage at 100° C. The polymerizable compound was polymerized by irradiating the device with ultraviolet light (28 J) using an ultra-high-pressure mercury lamp USH-250-BY (produced by Ushio, Inc.). The device was placed on the stage of a polarizing microscope where the polarizer was orthogonal to the analyzer, and irradiated from below with light, and the presence or absence of light leak was observed. The homeotropic alignment was judged as excellent when light did not pass through the device because of a sufficient alignment of liquid crystal molecules. It was judged as poor when light passed through the device was observed.

Run Numbers 2 to 33

A device having no alignment films was produced using a mixture combining the composition, the polymerizable compound and the polar compound. The presence or absence of the light leak was observed in the same manner as with Run Number 1. The results were summarized in Table 4.

TABLE 4

Homeotropic Alignment of Liquid Crystal Molecules

| Run Number | Liquid Crystal Composition | Polymerizable Compound (0.5% by weight) | Polar Compound (5% by weight) | Homeotropic Alignment |
|---|---|---|---|---|
| 1 | M1 | RM-1 | PC-1 | excellent |
| 2 | M2 | RM-2 | PC-2 | excellent |
| 3 | M3 | RM-3 | PC-3 | excellent |
| 4 | M4 | RM-4 | PC-4 | excellent |

TABLE 4-continued

Homeotropic Alignment of Liquid Crystal Molecules

| Run Number | Liquid Crystal Composition | Polymerizable Compound (0.5% by weight) | Polar Compound (5% by weight) | Homeotropic Alignment |
|---|---|---|---|---|
| 5 | M5 | RM-5 | PC-5 | excellent |
| 6 | M6 | RM-6 | PC-6 | excellent |
| 7 | M7 | RM-7 | PC-7 | excellent |
| 8 | M8 | RM-8 | PC-8 | excellent |
| 9 | M9 | RM-1 | PC-9 | excellent |
| 10 | M10 | RM-2 | PC-10 | excellent |
| 11 | M11 | RM-3 | PC-11 | excellent |
| 12 | M1 | RM-4 | PC-12 | excellent |
| 13 | M2 | RM-5 | PC-13 | excellent |
| 14 | M3 | RM-6 | PC-14 | excellent |
| 15 | M4 | RM-7 | PC-15 | excellent |
| 16 | M5 | RM-8 | PC-16 | excellent |
| 17 | M6 | RM-1 | PC-17 | excellent |
| 18 | M7 | RM-2 | PC-18 | excellent |
| 19 | M8 | RM-3 | PC-19 | excellent |
| 20 | M9 | RM-4 | PC-20 | excellent |
| 21 | M10 | RM-5 | PC-21 | excellent |
| 22 | M11 | RM-6 | PC-22 | excellent |
| 23 | M1 | RM-7 | PC-23 | excellent |
| 24 | M2 | RM-8 | PC-24 | excellent |
| 25 | M3 | RM-1 | PC-25 | excellent |
| 26 | M4 | RM-2 | PC-26 | excellent |
| 27 | M5 | RM-3 | PC-27 | excellent |
| 28 | M6 | RM-4 | PC-28 | excellent |
| 29 | M7 | RM-5 | PC-29 | excellent |
| 30 | M8 | RM-6 | PC-30 | excellent |
| 31 | M9 | RM-7 | PC-31 | excellent |
| 32 | M10 | RM-8 | PC-32 | excellent |
| 33 | M11 | RM-1 | PC-33 | excellent |

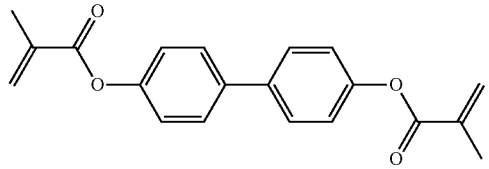

(RM-9)

Polymerization was carried out as follows. A device having no alignment films was produced by the method described in the paragraph of "Homeotropic Alignment of Liquid Crystal Molecules." The device was irradiated with ultraviolet light (28 J) of 78 mW/cm$^2$ (405 nanometers) for 359 seconds, while a voltage of 30 V was applied. A multi-metal lamp M04-L41 for UV curing made by Eye Graphics Co., Ltd. was used for ultraviolet irradiation. The residual amount of a polymerizable compound was measured by HPLC and the conversion was calculated. The results were summarized in Table 5. The conversion in Run number 1 to 8 was in the range of 38% to 46%. In Comparative Example 1, polymerizable compound (RM-1) used in Run number 1 was replaced by polymerizable compound (PM-9), which was then polymerized. In this case, the conversion was 18%. It can be concluded that the composition of the invention is excellent in view of the conversion based on this comparison.

TABLE 5

Conversion of Polymerizable Cpmpounds

| Run Number | Liquid Crystal Composition | Polymerizable Compound (0.5% by weight) | Polar Compound (5% by weight) | Polymerizable Compound Remained (% by weight) | Conversion |
|---|---|---|---|---|---|
| 1 | M1 | RM-1 | PC-1 | 0.29 | 42% |
| 2 | M2 | RM-2 | PC-2 | 0.30 | 40% |
| 3 | M3 | RM-3 | PC-3 | 0.31 | 38% |
| 4 | M4 | RM-4 | PC-4 | 0.27 | 46% |
| 5 | M5 | RM-5 | PC-5 | 0.28 | 44% |
| 6 | M6 | RM-6 | PC-6 | 0.27 | 46% |
| 7 | M7 | RM-7 | PC-7 | 0.29 | 42% |
| 8 | M8 | RM-8 | PC-8 | 0.30 | 40% |
| Comparative Example 1 | M1 | RM-9 | PC-1 | 0.41 | 18% |

3. Conversion of Polymerizable Compound

A polymerizable compound was added to the composition together with a polar compound. The polymerizable compound was consumed by polymerization and gave a polymer. In the extent of conversion of the reaction, the larger is preferable. This is because a smaller amount of the residual amount of the polymerizable compound (the amount of unreacted polymerizable compound) is desirable in view of image burn-in. When a device with a polymer sustained alignment is produced, it is irradiated with ultraviolet light generally in two steps for the purpose of optimizing the pretilt angle of liquid crystal molecules. In the next experiments, the residual amount of a polymerizable compound was measured after irradiation with ultraviolet light in the first step, and the conversion was calculated. Polymerizable compound (RM-9) described below was selected for comparison. This compound is excluded from compound (1) by the definition of the symbols.

The results indicated by Table 4 and Table 5 show that liquid crystal molecules are aligned stably without any alignment films by using a liquid crystal composition including a polymerizable compound and a polar compound, although the type of each component is different. This is a feature of the invention and is worthy of special mention.

INDUSTRIAL APPLICABILITY

The liquid crystal composition of the invention can adjust the alignment of liquid crystal molecules in a device having no alignment films. The composition satisfies at least one of characteristics such as a high maximum temperature, a low minimum temperature, a small viscosity, a suitable optical anisotropy, a large positive dielectric anisotropy, a large specific resistance, a high stability to ultraviolet light, a high stability to heat and a large elastic constant, or is suitably balanced between at least two of the characteristics. A liquid crystal display device including the composition can be used for a liquid crystal projector, a liquid crystal television and so forth, since it has characteristics such as a short response time, a large voltage holding ratio, a low threshold voltage, a large contrast ratio and a long service life.

What is claimed is:

1. A liquid crystal composition having positive dielectric anisotropy and including at least one polymerizable compound represented by formula (1) as a first additive, and at least one polar compound represented by formula (5) as a second additive:

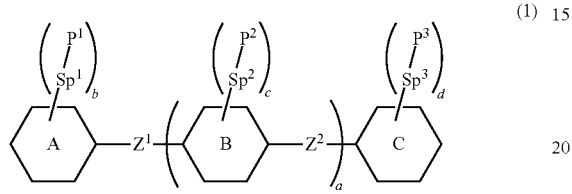
(1)

MES-R$^5$ (5)

in formula (1), ring A and ring C are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; ring B is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by fluorine, chlorine, alkyl having 1 to 12 carbons, alkoxy having 1 to 12 carbons or alkyl having 1 to 12 carbons in which at least one hydrogen has been replaced by fluorine or chlorine; $Z^1$ and $Z^2$ are independently a single bond or alkylene having 1 to 10 carbons, and in the alkylene at least one —CH$_2$— may be replaced by —O—, —CO—, —COO— or —OCO—, and at least one —CH$_2$—CH$_2$— may be replaced by —CH=CH—, —C(CH$_3$)=CH—, —CH=C(CH$_3$)— or —C(CH$_3$)=C(CH$_3$)—, and in these groups at least one hydrogen may be replaced by fluorine or chlorine; P$^1$, P$^2$ and P$^3$ are a polymerizable group; Sp$^1$, Sp$^2$ and Sp$^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH=CH— or —C≡C—, and in these groups at least one hydrogen may be replaced by fluorine or chlorine; a is 0, 1 or 2; and b and d are 1; c is independently 0, 1, 2, 3 or 4, with the proviso that a is 1 or 2 when ring A and ring C are phenyl and that Sp$^1$ and Sp$^3$ are a single bond when a is 1;

in formula (5), MES is a mesogenic group having at least one ring; and R$^5$ is a group represented by any one of formula (A2) to formula (A4):

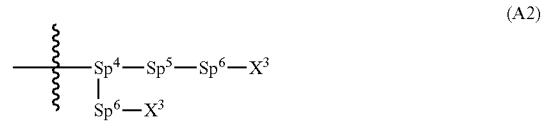
(A2)

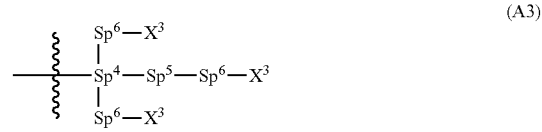
(A3)

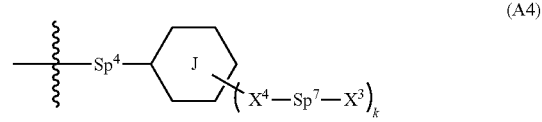
(A4)

in formula (A2) to formula (A4), Sp$^4$, Sp$^6$ and Sp$^7$ are independently a single bond or group (-Sp"-X"—), where Sp" is alkylene having 1 to 20 carbons, and in the alkylene at least one —CH$_2$— may be replaced by —O—, —S—, —NH—, —N(R$^0$)—, —CO—, —CO—O—, —O—CO—, —O—CO—O—, —S—CO—, —CO—S—, —N(R$^0$)—CO—O—, —O—CO—N(R$^0$)—, —N(R$^0$)—CO—N(R$^0$)—, —CH=CH— or —C≡C—, and in these groups at least one hydrogen may be replaced by fluorine, chlorine or —CN, and X" is —O—, —S—, —CO—, —CO—O—, —O—CO—, —O—CO—O—, —CO—N(R$^0$)—, —N(R$^0$)—CO—, —N(R$^0$)—CO—N(R$^0$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, where R$^0$ is hydrogen or alkyl having 1 to 12 carbons, and Y$^2$ and Y$^3$ are independently hydrogen, fluorine, chlorine or —CN; Sp$^1$ is a trivalent group or a tetravalent group (namely, >CH—, >CR$^{11}$—, >N—, >C<); X$^3$ is —OH, —OR$^{11}$, —COOH, —NH$_2$, —NHR$^{11}$, —N(R$^{11}$)$_2$, —SH, —SR$^{11}$,

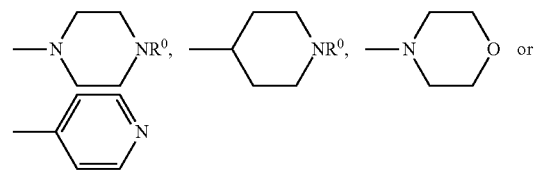

where R$^0$ is hydrogen or alkyl having 1 to 12 carbons; X$^4$ is —O—, —CO—, —NH—, —NR$^{11}$—, —S— or a single bond; R$^{11}$ is alkyl having 1 to 15 carbons, and in the alkyl at least one —CH$_2$— may be replaced by —C≡C—, —CH=CH—, —COO—, —OCO—, —CO— or —O—, and in these groups at least one hydrogen may be replaced by fluorine or chlorine; ring J is an aromatic group having 6 to 25 carbons or an alicyclic group having 3 to 25 carbons, and these groups may be a condensed ring, and in these groups one to three hydrogens may be replaced by R$^L$; R$^L$ is —OH, —(CH$_2$)$_i$—OH, fluorine, chlorine, —CN, —NO$_2$, —NCO, —NCS, —OCN, —SCN, —C(=O)N(R$^0$)$_2$, —C(=O)R$^0$, —N(R)$_2$, —(CH$_2$)$_i$—N(R)$_2$, —SH, —SR$^0$, aryl having 6 to 20 carbons, heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy having 2 to 25 carbons or alkoxycarbonyloxy having 2 to 25 carbons, and in these groups at least one hydrogen may be replaced by fluorine or chlorine, where $R^0$ is hydrogen or alkyl having 1 to 12 carbons, i is 1, 2, 3 or 4; and k is 2, 3, 4 or 5.

2. The liquid crystal composition according to claim 1, wherein the first additive is at least one polymerizable compound selected from the group of compounds represented by formula (1-1) to formula (1-7) and formula (1-9) to formula (1-12):

(1-1)
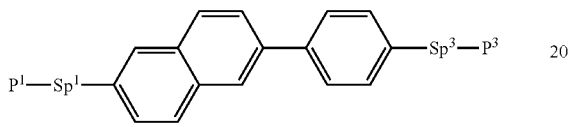

(1-2)
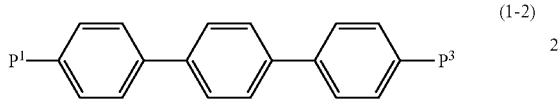

(1-3)
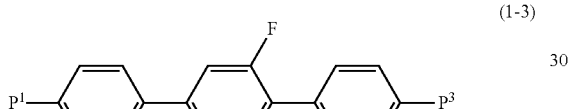

(1-4)
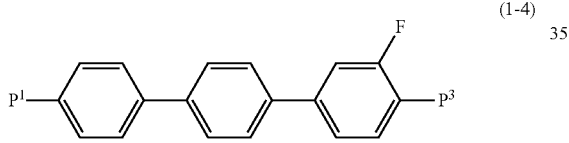

(1-5)
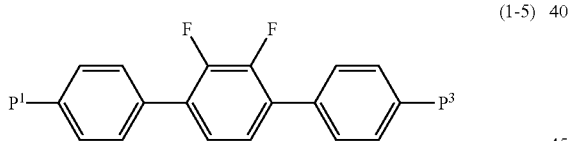

(1-6)
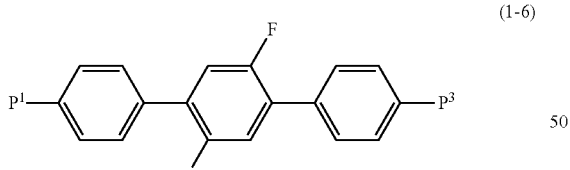

(1-7)
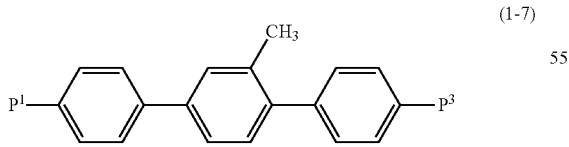

(1-9)
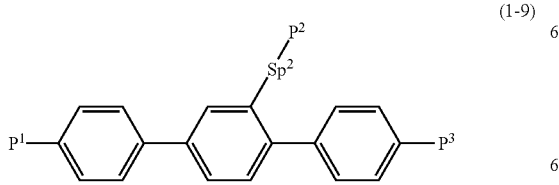

(1-10)
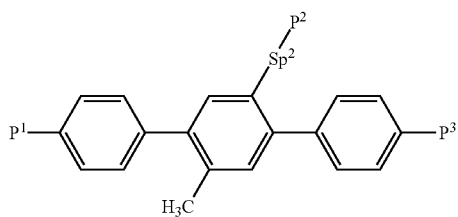

(1-11)
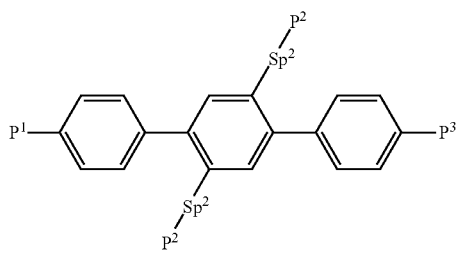

(1-12)
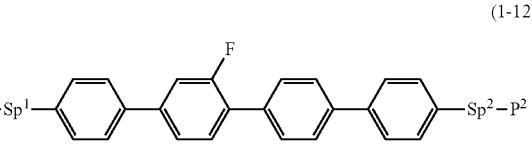

in formula (1-1) to formula (1-7) and formula (1-9) to formula (1-12), $P^1$, $P^2$ and $P^3$ are independently a polymerizable group selected from the group of groups represented by formula (P-1) to formula (P-3), where $M^1$, $M^2$ and $M^3$ are independently hydrogen, fluorine, alkyl having 1 to 5 carbons or alkyl having 1 to 5 carbons in which at least one hydrogen has been replaced by fluorine or chlorine; and (P-1)

(P-2)

(P-3)
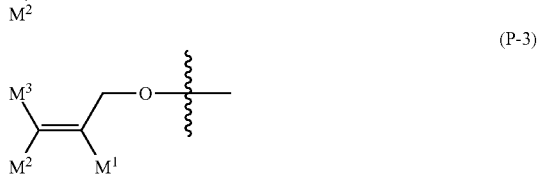

$Sp^1$, $Sp^2$ and $Sp^3$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH=CH— or —C≡C—, and in these groups at least one hydrogen may be replaced by fluorine or chlorine.

3. The liquid crystal composition according to claim 1, wherein the ratio of the first additive is in the range of 0.03% by weight to 10% by weight based on the weight of the liquid crystal composition.

4. The liquid crystal composition according to claim 1, including at least one compound represented by formula (2) as a first component:

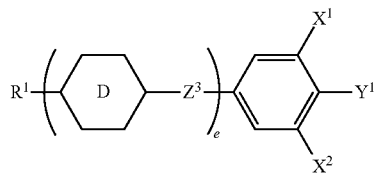
(2)

in formula (2), $R^1$ is alkyl having 1 to 12 carbons, alkoxy having 1 to 12 carbons or alkenyl having 2 to 12 carbons or alkenyl having 2 to 12 carbons in which at least one hydrogen has been replaced by fluorine or chlorine; ring D is 1,4-cyclohexylene, 1,4-phenylene, 2-fluoro-1,4-phenylene, 2,3-difluoro-1,4-phenylene, 2,6-difluoro-1,4-phenylene, 3,5-difluoro-1,4-phenylene, pyrimidine-2,5-diyl, 1,3-dioxane-2,5-diyl or tetrahydropyran-2,5-diyl; $Z^3$ is a single bond, —CH$_2$CH$_2$—, —CH$_2$O—, —OCH$_2$—, —COO—, —COC—, —CF$_2$O— or —OCF$_2$—; $X^1$ and $X^2$ are independently hydrogen or fluorine; $Y^1$ is fluorine, chlorine, alkyl having 1 to 12 carbons in which at least one hydrogen has been replaced by fluorine or chlorine, alkoxy having 1 to 12 carbons in which at least one hydrogen has been replaced by fluorine or chlorine, or alkenyloxy having 2 to 12 carbons in which at least one hydrogen has been replaced by fluorine or chlorine; and e is 1, 2, 3 or 4.

5. The liquid crystal composition according to claim 4, including at least one compound selected from the group of compounds represented by formula (2-1) to formula (2-46) as the first component:

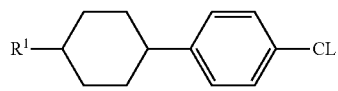
(2-1)

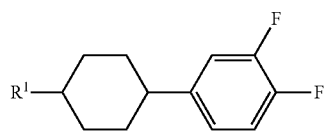
(2-2)

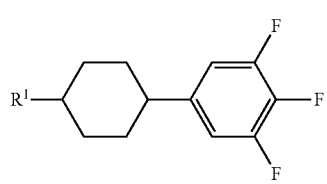
(2-3)

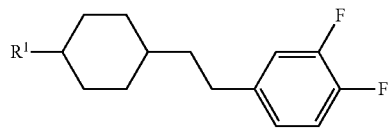
(2-4)

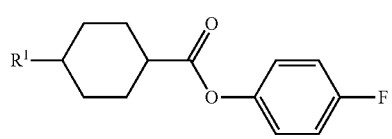
(2-5)

-continued

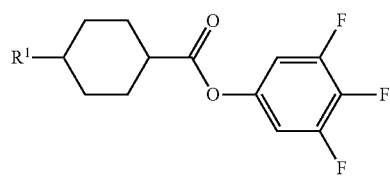
(2-6)

(2-7)

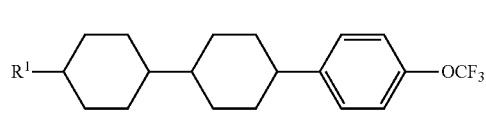
(2-8)

(2-9)

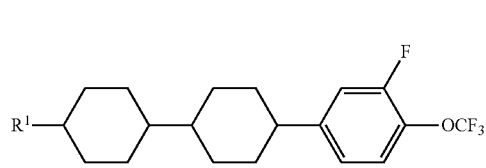
(2-10)

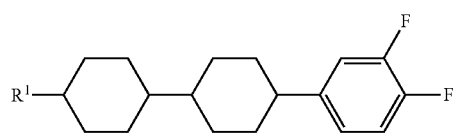
(2-11)

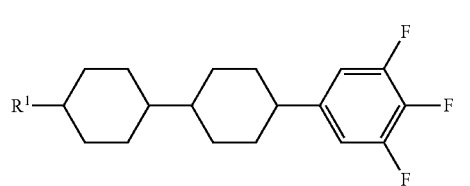
(2-12)

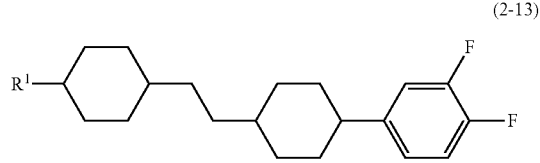
(2-13)

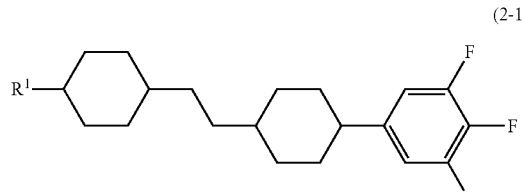
(2-14)

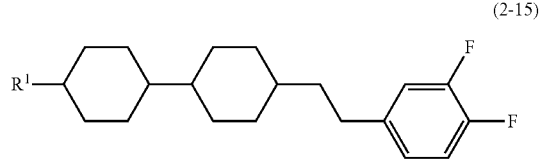
(2-15)

(2-16) 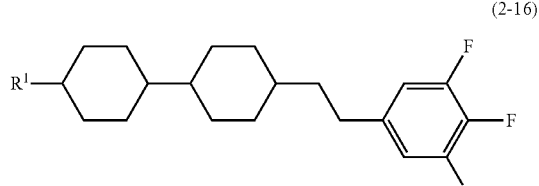
(2-17) 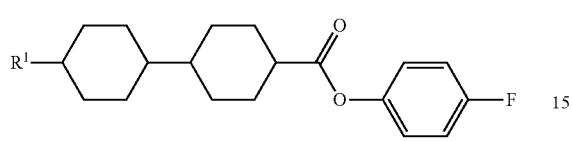
(2-18) 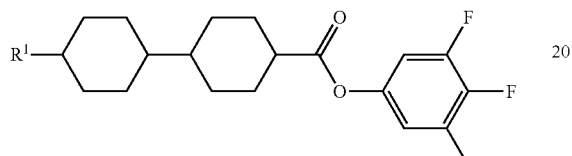
(2-19) 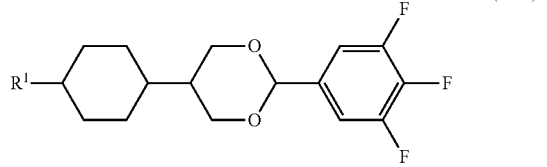
(2-20) 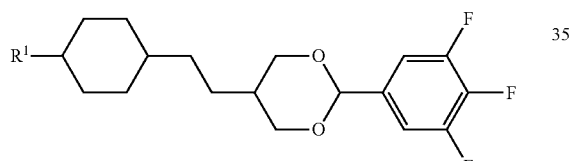
(2-21) 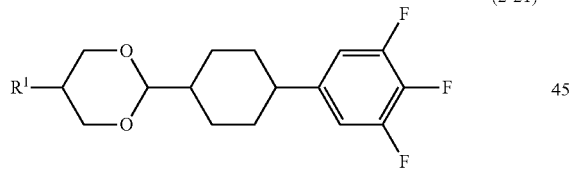
(2-22) 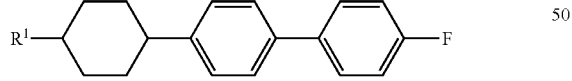
(2-23) 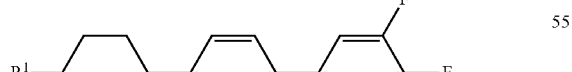
(2-24) 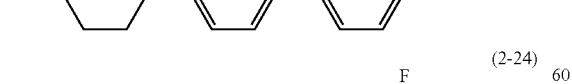
(2-25) 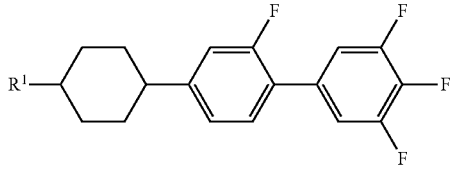
(2-26) 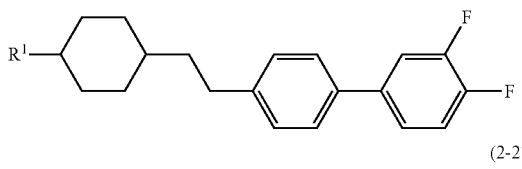
(2-27) 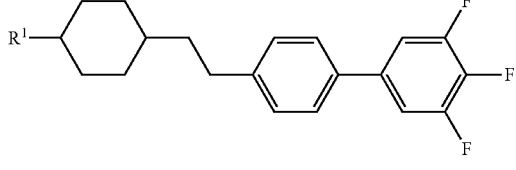
(2-28) 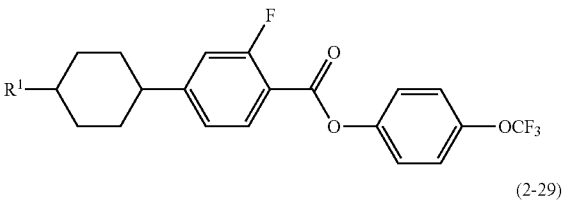
(2-29) 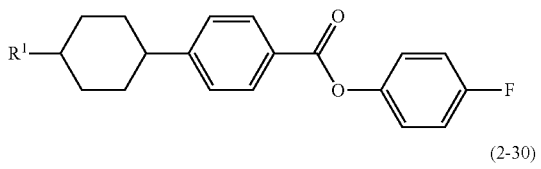
(2-30) 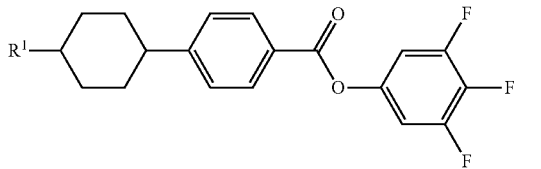
(2-31) 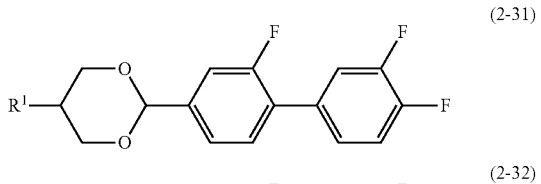
(2-32) 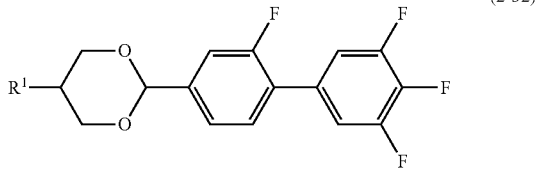
(2-33) 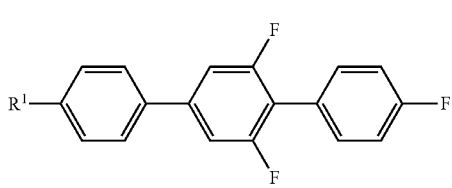

(2-34) 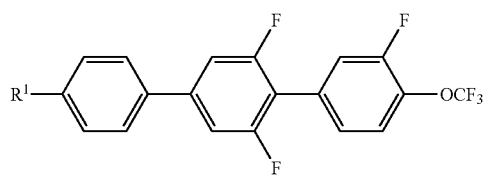

(2-35) 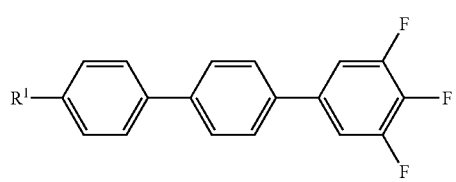

(2-36) 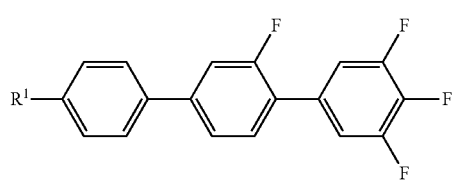

(2-37) 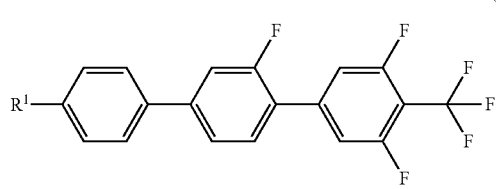

(2-38) 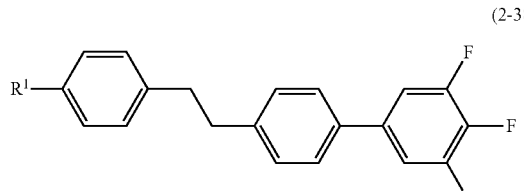

(2-39) 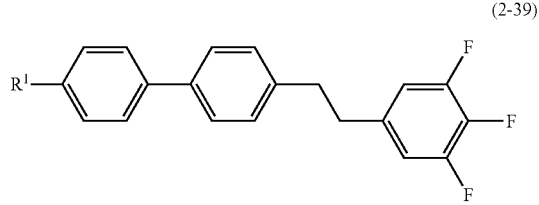

(2-40) 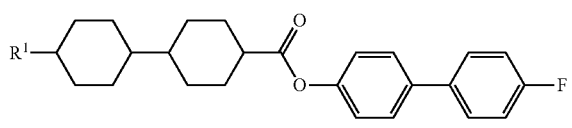

(2-41) 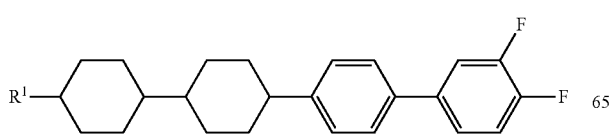

(2-42) 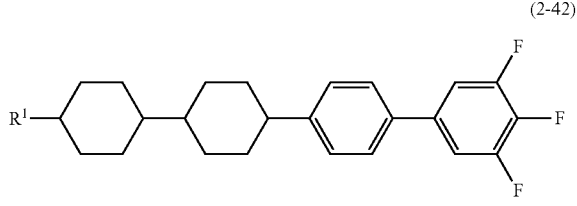

(2-43) 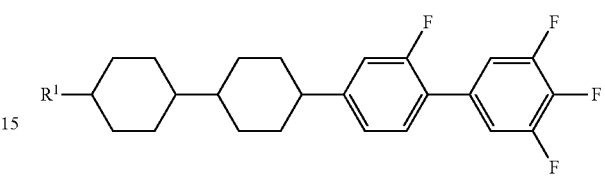

(2-44) 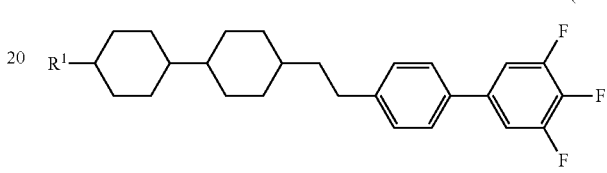

(2-45) 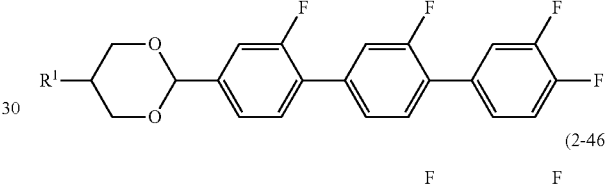

(2-46)

in formula (2-1) to formula (2-46), $R^1$ is alkyl having 1 to 12 carbons, alkoxy having 1 to 12 carbons, alkenyl having 2 to 12 carbons or alkenyl having 2 to 12 carbons in which at least one hydrogen has been replaced by fluorine or chlorine.

6. The liquid crystal composition according to claim 4, wherein the ratio of the first component is in the range of 10% by weight to 90% by weight based on the weight of the liquid crystal composition.

7. The liquid crystal composition according to claim 1, including at least one compound represented by formula (3) as a second component:

(3) 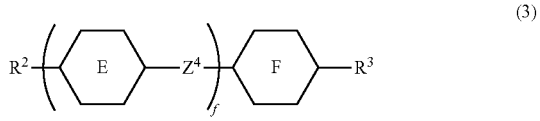

in formula (3), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine; ring E and ring F are independently 1,4-cyclohexylene, 1,4-phenylene, 2-fluoro-1,4-phenylene or 2,5-difluoro-1,4-phenylene; $Z^4$ is a single bond, —CH$_2$CH$_2$—, —CH$_2$O—, —OCH$_2$—, —COO— or —OCO—; and f is 1, 2 or 3.

8. The liquid crystal composition according to claim 7, including at least one compound selected from the group of compounds represented by formula (3-1) to formula (3-13) as the second component:

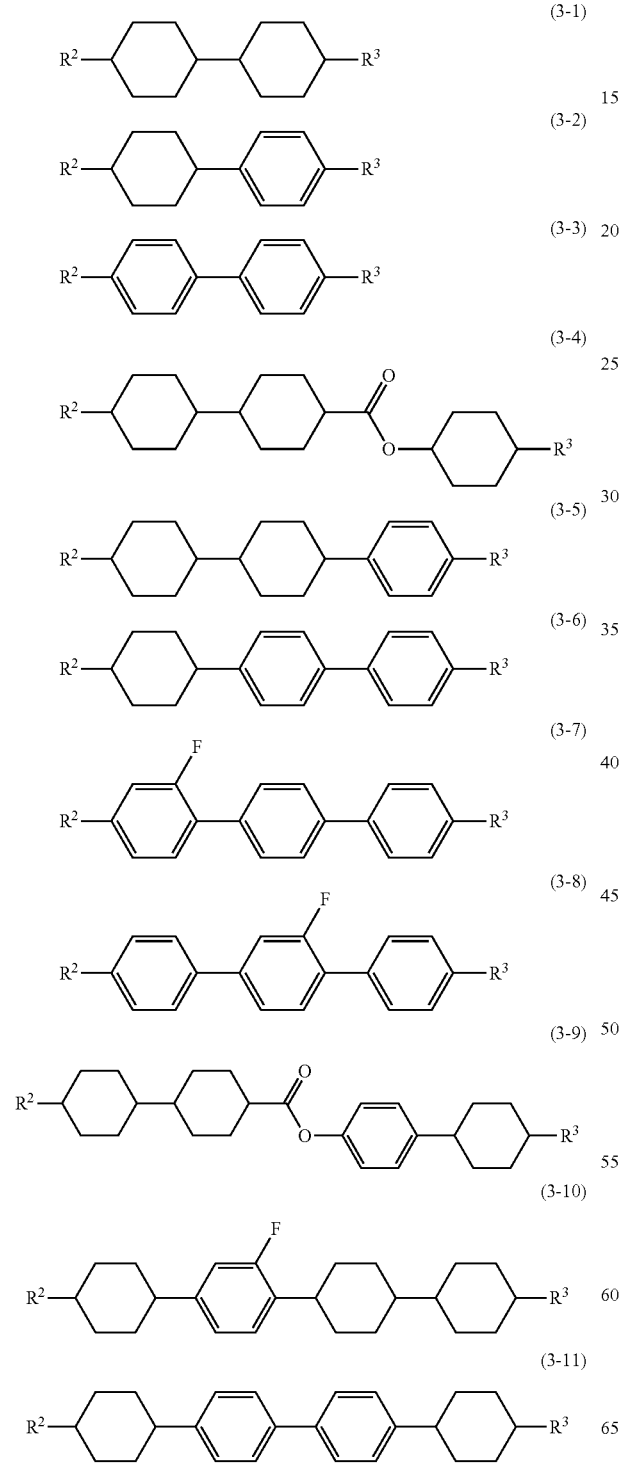
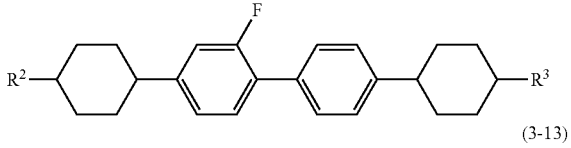
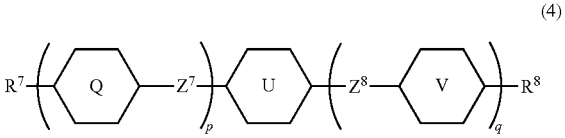

in formula (3-1) to formula (3-13), $R^2$ and $R^3$ are independently alkyl having 1 to 12 carbons, alkoxy having 1 to 12 carbons, alkenyl having 2 to 12 carbons, alkyl having 1 to 12 carbons in which at least one hydrogen has been replaced by fluorine or chlorine, or alkenyl having 2 to 12 carbons in which at least one hydrogen has been replaced by fluorine or chlorine.

9. The liquid crystal composition according to claim 7, wherein the ratio of the second component is in the range of 10% by weight to 90% by weight based on the weight of the liquid crystal composition.

10. The liquid crystal composition according to claim 1, including at least one compound represented by formula (4) as a third component:

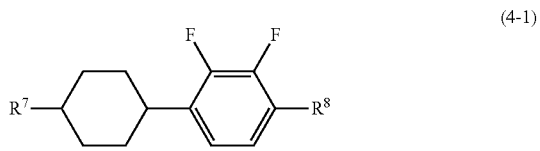

in formula (4), $R^7$ and $R^8$ are independently alkyl having 1 to 12 carbons, alkoxy having 1 to 12 carbons, alkenyl having 2 to 12 carbons or alkenyloxy having 2 to 12 carbons; ring Q and ring V are independently 1,4-cyclohexylene, 1,4-cyclohexenylene, 1,4-phenylene, 1,4-phenylene in which at least one hydrogen has been replaced by fluorine or chlorine or tetrahydropyran-2,5-diyl; ring U is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^7$ and $Z^8$ are independently a single bond, —CH$_2$CH$_2$—, —CH$_2$O—, —OCH$_2$—, —COO— or —OCO—; p is 1, 2 or 3, q is 0 or 1; and the sum of p and q is 3 or less.

11. The liquid crystal composition according to claim 10, including at least one compound selected from the group of compounds represented by formula (4-1) to formula (4-21) as the third component:

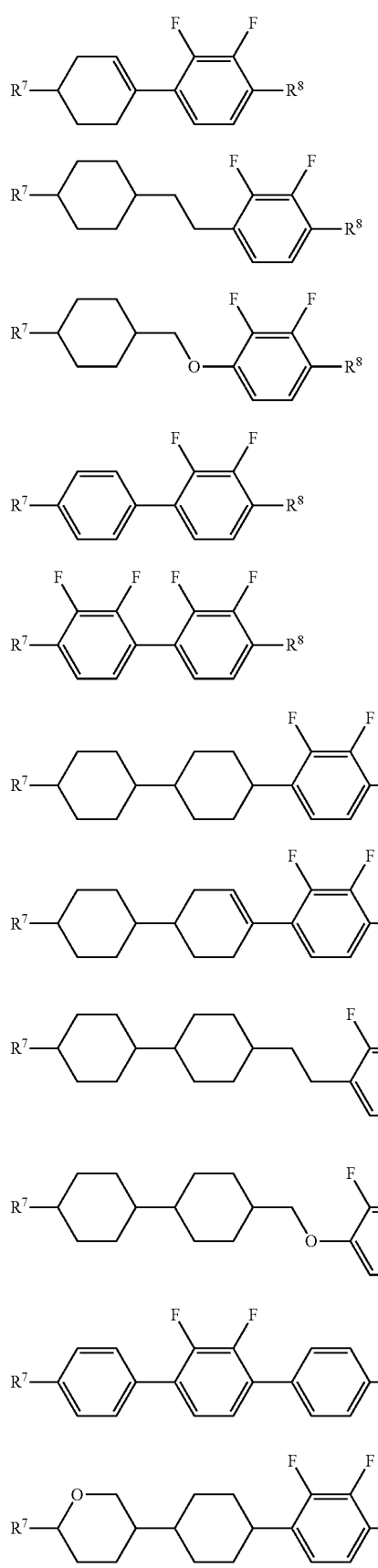
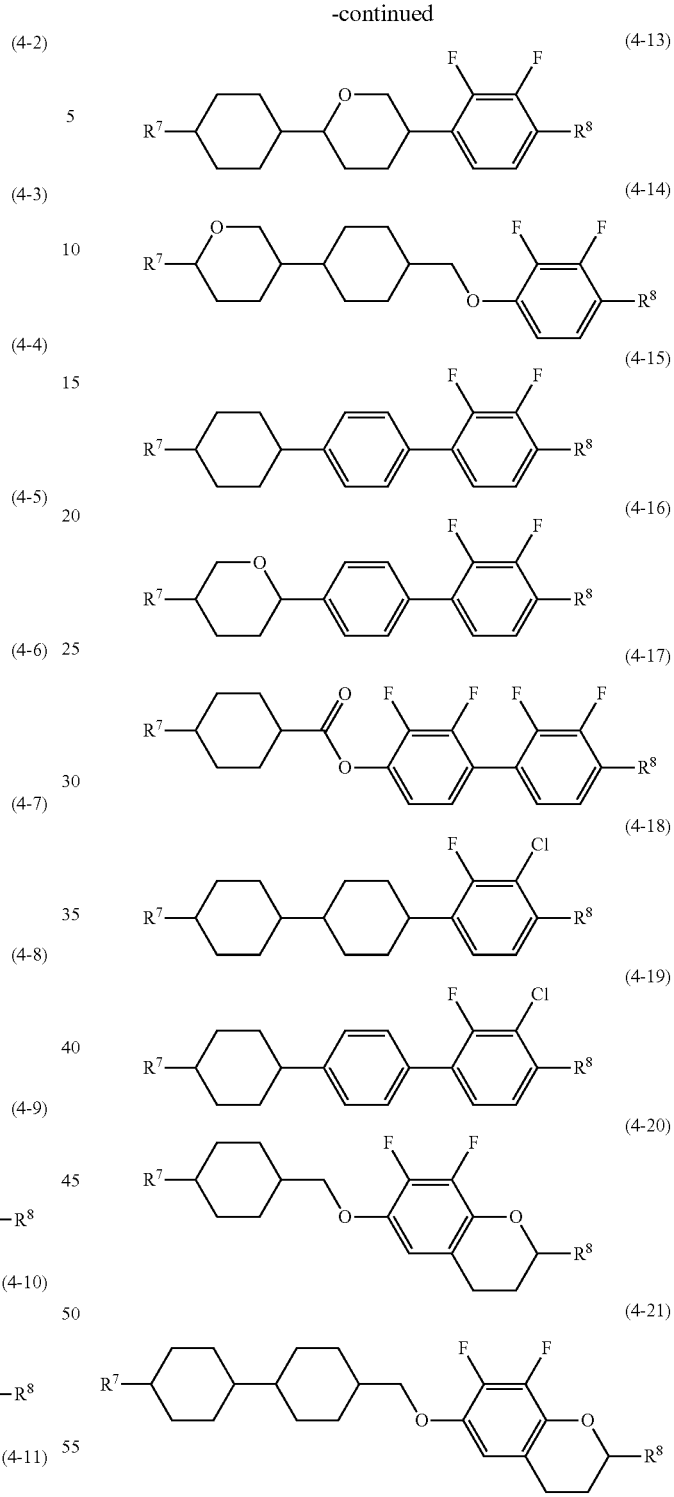
in formula (4-1) to formula (4-21), $R^7$ and $R^8$ are independently alkyl having 1 to 12 carbons, alkoxy having 1 to 12 carbons, alkenyl having 2 to 12 carbons or alkenyloxy having 2 to 12 carbons.
12. The liquid crystal composition according to claim 10, wherein the ratio of the third component is in the range of 3% by weight to 25% by weight based on the weight of the liquid crystal composition.

13. The liquid crystal composition according to claim 1, including at least one compound represented by formula (5-1) as the second additive:

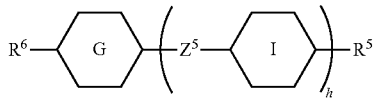
(5-1)

in formula (5-1), ring G and ring I are independently an aromatic group having 6 to 25 carbons, a heteroaromatic group having 5 to 25 carbons, an alicyclic group having 3 to 25 carbons or a heteroalicyclic group having 4 to 25 carbons and these groups may be a condensed ring, and in these groups at least one hydrogen may be replaced by group T, where group T is —OH, —$(CH_2)_i$—OH, halogen, —CN, —$NO_2$, —NCO, —NCS, —OCN, —SCN, —C(=O)N($R^O$)$_2$, —C(=O)R, —N($R^O$)$_2$, —$(CH_2)_i$—N($R^O$)$_2$, aryl having 6 to 20 carbons, heteroaryl having 6 to 20 carbons, alkyl having 1 to 25 carbons, alkoxy having 1 to 25 carbons, alkylcarbonyl having 2 to 25 carbons, alkoxycarbonyl having 2 to 25 carbons, alkylcarbonyloxy having 2 to 25 carbons or alkoxycarbonyloxy having 2 to 25 carbons, in these groups at least one hydrogen may be replaced by fluorine or chlorine, where $R^O$ is hydrogen or alkyl having 1 to 12 carbons, i is 1, 2, 3 or 4; $Z^5$ is —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_i$—, —CF$_2$CH$_2$—, —CH$_2$CF$_2$—, —(CF$_2$)$_i$—, —CH=CH—, —CF=CF—, —C≡C—, —CH=CH—COO—, —OCO—CH=CH—, —C($R^O$)$_2$ or a single bond, where $R^O$ is hydrogen or alkyl having 1 to 12 carbons, and i is 1, 2, 3 or 4; $R^5$ is alkyl having 1 to 25 carbons, and in the alkyl at least one —CH$_2$— may be replaced by —$NR^O$—, —O—, —S—, —CO—, —COO—, —OCO—, —OCOO— or cycloalkylene having 3 to 8 carbons, where $R^O$ is hydrogen or alkyl having 1 to 12 carbons, at least one tertiary carbon (>CH—) may be replaced by nitrogen (>N—), and at least one hydrogen may be replaced by fluorine or chlorine; $R^6$ is hydrogen, halogen, alkyl having 1 to 25 carbons, and in the alkyl at least one —CH$_2$— may be replaced by —$NR^O$—, —O—, —S—, —CO—, —CO—O—, —O—CO—, —O—CO—O— or cycloalkylene having 3 to 8 carbons, and at least one tertiary carbon (>CH—) may be replaced by nitrogen (>N—), and in these groups at least one hydrogen may be replaced by fluorine or chlorine, where $R^O$ is hydrogen or alkyl having 1 to 12 carbons; and h is 0, 1, 2, 3, 4 or 5.

14. The liquid crystal composition according to claim 13, wherein the second additive is at least one compound selected from the group of compounds represented by formula (5-1-2) to formula (5-1-4):

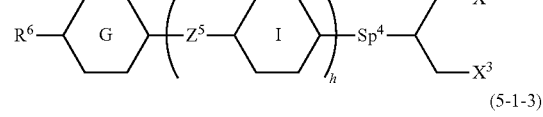
(5-1-2)

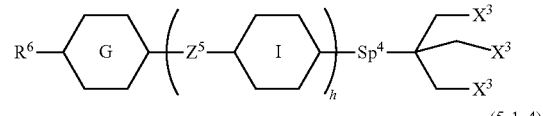
(5-1-3)

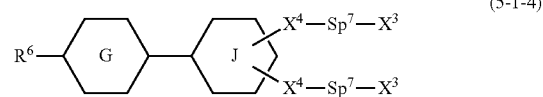
(5-1-4)

in formula (5-1-2) to formula (5-1-4), ring G and ring I are independently 1,4-cyclohexylene, 1,4-phenylene, 2-fluoro-1,4-phenylene, 2-fluoro-1,3-phenylene, 2-ethyl-1,4-phenylene, 2,6-diethyl-1,4-phenylene, 2-trifluoromethyl-1,4-phenylene, 2,3-difluoro-1,4-phenylene, 2,5-difluoro-1,4-phenylene, 2,6-difluoro-1,4-phenylene or 2,3,5,6-tetrafluoro-1,4-phenylene; ring J is cyclohexyl or phenyl; $Z^5$ is a single bond, —CH$_2$CH$_2$—, —COO— or —OCO—; Sp$^4$ is a single bond, ethylene, propylene or methyleneoxy; Sp$^7$ is a single bond or alkylene having 1 to 5 carbons, and in the alkylene —CH$_2$— may be replaced by —O— or —NH—; $R^6$ is alkyl having 1 to 8 carbons or fluorine; h is 0, 1, 2, 3, 4 or 5; $X^3$ is —OH, —COOH, —SH, —OCH$_3$ or —NH$_2$; and $X^4$ is a single bond or —O—.

15. The liquid crystal composition according to claim 1, wherein the ratio of the second additive is less than 10% by weight based on the weight of the liquid crystal composition.

16. A liquid crystal display device including the liquid crystal composition according to claim 1.

17. A liquid crystal display device having no alignment films and including a liquid crystal composition according to claim 1, where the polymerizable compound in the liquid crystal composition has been polymerized.

* * * * *